United States Patent
Shim

(10) Patent No.: US 9,644,886 B2
(45) Date of Patent: May 9, 2017

(54) REFRIGERATOR AND DIAGNOSTIC SYSTEM FOR THE SAME

(75) Inventor: Jai Hwan Shim, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 1289 days.

(21) Appl. No.: 13/522,066

(22) PCT Filed: Jan. 14, 2011

(86) PCT No.: PCT/KR2011/000311
§ 371 (c)(1),
(2), (4) Date: Dec. 11, 2012

(87) PCT Pub. No.: WO2011/087329
PCT Pub. Date: Jul. 21, 2011

(65) Prior Publication Data
US 2013/0067940 A1    Mar. 21, 2013

(30) Foreign Application Priority Data

Jan. 15, 2010   (KR) .......................... 10-2010-0003898

(51) Int. Cl.
*F25C 1/00*    (2006.01)
*F25B 49/00*   (2006.01)
(Continued)

(52) U.S. Cl.
CPC ............ *F25D 29/00* (2013.01); *F25B 49/005* (2013.01); *F25D 29/008* (2013.01);
(Continued)

(58) Field of Classification Search
CPC ............ F25B 49/005; F25D 2400/361; F25D 2700/02; F25D 2700/12; F25D 29/00; F25D 29/008
(Continued)

(56) References Cited

U.S. PATENT DOCUMENTS 3,910,322 A    10/1975  Hardesty et al.
4,146,754 A     3/1979  Rose
(Continued)

FOREIGN PATENT DOCUMENTS

CA    2 722 912    11/2009
CN    1212304      3/1999
(Continued)

OTHER PUBLICATIONS

U.S. Appl. No. 12/432,111, filed Apr. 29, 2009, Leshui Zhang.
(Continued)

*Primary Examiner* — Henry Crenshaw
(74) *Attorney, Agent, or Firm* — KED & Associates, LLP

(57) ABSTRACT

Provided are a refrigerator and a diagnostic system for the same. The refrigerator includes a selection unit, a control unit, a modulator, and a sound output unit. The selection unit receives a diagnosis performance command. The control unit generates a control signal including product information when the selection unit receives the diagnosis performance command. The modulator generates a frequency signal according to the control signal generated by the control unit. The sound output unit outputs a sound including the product information according to the frequency signal generated by the modulating unit.

13 Claims, 32 Drawing Sheets

(51) Int. Cl.
  *F25D 21/00* (2006.01)
  *G06F 7/00* (2006.01)
  *F25D 29/00* (2006.01)
  *H04L 12/28* (2006.01)
(52) U.S. Cl.
  CPC .... *H04L 12/2827* (2013.01); *F25D 2400/361* (2013.01); *F25D 2700/02* (2013.01); *F25D 2700/12* (2013.01); *H04L 2012/285* (2013.01)
(58) Field of Classification Search
  USPC .............. 62/125, 150, 389; 701/36; 702/39
  See application file for complete search history.

(56) References Cited

U.S. PATENT DOCUMENTS

| | | | |
|---|---|---|---|
| 4,241,337 A * | 12/1980 | Prada | F25D 29/008 200/61.69 |
| 4,766,505 A | 8/1988 | Nakano et al. | |
| 4,797,656 A | 1/1989 | Keppler | |
| 4,897,659 A | 1/1990 | Mellon | |
| 4,897,857 A | 1/1990 | Wakatsuki et al. | |
| 4,916,439 A | 4/1990 | Estes et al. | |
| 4,977,394 A | 12/1990 | Manson et al. | |
| 5,103,214 A | 4/1992 | Curran et al. | |
| 5,210,784 A | 5/1993 | Wang et al. | |
| 5,268,666 A | 12/1993 | Michel et al. | |
| 5,287,084 A * | 2/1994 | Sone | G10K 9/13 340/388.4 |
| 5,452,344 A | 9/1995 | Larson | |
| 5,506,892 A | 4/1996 | Kojima et al. | |
| 5,586,174 A | 12/1996 | Bogner et al. | |
| 5,664,218 A | 9/1997 | Kim et al. | |
| 5,757,643 A | 5/1998 | Kuroda et al. | |
| 5,774,529 A | 6/1998 | Johannsen et al. | |
| 5,787,724 A * | 8/1998 | Pohl | B67D 1/0858 16/386 |
| 5,864,828 A | 1/1999 | Atkins | |
| 5,939,992 A | 8/1999 | Devries et al. | |
| 5,940,915 A | 8/1999 | Nam | |
| 5,987,105 A * | 11/1999 | Jenkins | G08B 13/1418 340/679 |
| 6,121,593 A | 9/2000 | Mansbery et al. | |
| 6,157,313 A | 12/2000 | Emmermann | |
| 6,370,890 B2 * | 4/2002 | Roh | 62/126 |
| 6,424,252 B1 | 7/2002 | Adler | |
| 6,727,814 B2 | 4/2004 | Saltzstein et al. | |
| 6,759,954 B1 | 7/2004 | Myron et al. | |
| 6,763,458 B1 | 7/2004 | Watanabe et al. | |
| 6,778,868 B2 | 8/2004 | Imamura et al. | |
| 6,784,801 B2 | 8/2004 | Watanabe et al. | |
| 6,870,480 B2 | 3/2005 | Suzuki et al. | |
| 6,873,255 B2 | 3/2005 | Gallagher | |
| 6,906,617 B1 | 6/2005 | Van der Meulen | |
| 7,010,612 B1 | 3/2006 | Si et al. | |
| 7,135,982 B2 | 11/2006 | Lee | |
| 7,174,264 B2 | 2/2007 | Yasukawa et al. | |
| 7,208,916 B1 * | 4/2007 | Boatwright | H01M 10/486 320/150 |
| 7,243,174 B2 | 7/2007 | Sheahan et al. | |
| 7,266,164 B2 | 9/2007 | Jeon et al. | |
| 7,280,643 B2 | 10/2007 | Howard et al. | |
| 7,337,457 B2 | 2/2008 | Pack et al. | |
| 7,363,031 B1 | 4/2008 | Aisa | |
| 7,383,644 B2 | 6/2008 | Lyu et al. | |
| 7,439,439 B2 | 10/2008 | Hayes et al. | |
| 7,509,824 B2 | 3/2009 | Park et al. | |
| 7,558,700 B2 | 7/2009 | Yamashita et al. | |
| 7,574,269 B2 | 8/2009 | Cenedese et al. | |
| 7,631,063 B1 | 12/2009 | Ho et al. | |
| 7,648,476 B2 | 1/2010 | Bock et al. | |
| 7,653,512 B2 | 1/2010 | Cheung et al. | |
| 7,750,227 B2 | 7/2010 | Hayes et al. | |
| 7,843,819 B1 | 11/2010 | Beneviste | |
| 7,965,632 B2 | 6/2011 | Sugaya | |
| 8,027,752 B2 | 9/2011 | Castaldo et al. | |
| 8,040,234 B2 | 10/2011 | Ebrom et al. | |
| 8,045,636 B1 | 10/2011 | Lee et al. | |
| 8,132,049 B2 | 3/2012 | Yasukawa et al. | |
| 8,204,189 B2 | 6/2012 | Rhodes et al. | |
| 8,325,054 B2 | 12/2012 | Kim et al. | |
| 8,346,508 B2 | 1/2013 | Kim et al. | |
| 8,391,255 B2 | 3/2013 | Ribiere et al. | |
| 8,428,910 B2 | 4/2013 | Papadimitriou et al. | |
| 8,739,057 B2 | 5/2014 | Cheong | |
| 2002/0029575 A1 | 3/2002 | Okamoto | |
| 2002/0032491 A1 | 3/2002 | Imamura et al. | |
| 2002/0078742 A1 | 6/2002 | Kim | |
| 2002/0097161 A1 | 7/2002 | Deeds | |
| 2002/0116959 A1 | 8/2002 | Ohta et al. | |
| 2002/0120728 A1 | 8/2002 | Braatz et al. | |
| 2003/0000240 A1 * | 1/2003 | Pahl | A23G 9/045 62/389 |
| 2003/0028345 A1 | 2/2003 | Watkins et al. | |
| 2003/0058101 A1 | 3/2003 | Watanabe et al. | |
| 2003/0110363 A1 | 6/2003 | Bachot et al. | |
| 2003/0128850 A1 | 7/2003 | Kimura et al. | |
| 2003/0144010 A1 | 7/2003 | Dollinger | |
| 2003/0167782 A1 | 9/2003 | Roh et al. | |
| 2003/0196492 A1 | 10/2003 | Remboski et al. | |
| 2004/0032853 A1 | 2/2004 | D'Amico et al. | |
| 2004/0132444 A1 | 7/2004 | Herrmann | |
| 2004/0158333 A1 | 8/2004 | Ha et al. | |
| 2004/0211228 A1 | 10/2004 | Nishio et al. | |
| 2004/0249903 A1 | 12/2004 | Ha et al. | |
| 2004/0261468 A1 | 12/2004 | Lueckenbach | |
| 2005/0015890 A1 | 1/2005 | Kim et al. | |
| 2005/0028034 A1 | 2/2005 | Gantman et al. | |
| 2005/0029976 A1 | 2/2005 | Terry et al. | |
| 2005/0062600 A1 * | 3/2005 | Olsen | G05D 23/1902 340/506 |
| 2005/0086979 A1 | 4/2005 | Son et al. | |
| 2005/0129200 A1 | 6/2005 | Forrest et al. | |
| 2005/0134472 A1 | 6/2005 | Jang et al. | |
| 2005/0162909 A1 | 7/2005 | Wooldridge | |
| 2005/0222859 A1 | 10/2005 | Ha | |
| 2006/0048405 A1 | 3/2006 | Baek et al. | |
| 2006/0066758 A1 | 3/2006 | Higashihara | |
| 2006/0089818 A1 | 4/2006 | Norell et al. | |
| 2006/0136544 A1 | 6/2006 | Atsmon et al. | |
| 2006/0168740 A1 | 8/2006 | Ha et al. | |
| 2006/0259199 A1 | 11/2006 | Gjerde et al. | |
| 2007/0097622 A1 * | 5/2007 | Leech | G06F 1/20 361/679.54 |
| 2007/0113595 A1 | 5/2007 | Harwood et al. | |
| 2007/0114293 A1 * | 5/2007 | Gugenheim | F24F 11/0012 236/49.3 |
| 2007/0137265 A1 | 6/2007 | Shikamori et al. | |
| 2007/0175883 A1 | 8/2007 | Miu et al. | |
| 2007/0189323 A1 | 8/2007 | Swoboda et al. | |
| 2007/0219756 A1 | 9/2007 | Frankel et al. | |
| 2007/0254604 A1 | 11/2007 | Kim | |
| 2007/0272286 A1 | 11/2007 | Curtius et al. | |
| 2008/0007520 A1 * | 1/2008 | Lee | F25D 29/00 345/156 |
| 2008/0036619 A1 | 2/2008 | Rhodes et al. | |
| 2008/0037011 A1 * | 2/2008 | Rooke | G01M 11/0207 356/124 |
| 2008/0072383 A1 | 3/2008 | Bextermoller et al. | |
| 2008/0122648 A1 | 5/2008 | Ebrom et al. | |
| 2008/0181058 A1 | 7/2008 | Hayakawa | |
| 2009/0036778 A1 | 2/2009 | Cohen et al. | |
| 2009/0067102 A1 | 3/2009 | Cline et al. | |
| 2009/0077167 A1 * | 3/2009 | Baum | G06F 17/30017 709/203 |
| 2009/0160637 A1 | 6/2009 | Maeng | |
| 2009/0165471 A1 * | 7/2009 | Rafalovich | F25C 5/187 62/66 |
| 2009/0165475 A1 * | 7/2009 | Wasserman | F25D 11/02 62/125 |
| 2009/0169434 A1 | 7/2009 | Ogusu | |
| 2009/0217682 A1 | 9/2009 | Son | |

(56) References Cited

U.S. PATENT DOCUMENTS

| | | | |
|---|---|---|---|
| 2009/0248245 A1* | 10/2009 | Sumiya | G01D 11/28 701/36 |
| 2009/0257354 A1 | 10/2009 | Hannel | |
| 2009/0282308 A1 | 11/2009 | Gutsche et al. | |
| 2009/0289536 A1* | 11/2009 | Park | F25D 23/028 312/405 |
| 2009/0323913 A1* | 12/2009 | Lee | H04L 12/12 379/106.01 |
| 2009/0323914 A1 | 12/2009 | Lee et al. | |
| 2010/0023938 A1 | 1/2010 | Lee et al. | |
| 2010/0027770 A1 | 2/2010 | Park et al. | |
| 2010/0037401 A1 | 2/2010 | Bae et al. | |
| 2010/0116060 A1 | 5/2010 | Murayama | |
| 2010/0262865 A1 | 10/2010 | Kim | |
| 2010/0318324 A1 | 12/2010 | Kim et al. | |
| 2011/0018729 A1 | 1/2011 | Kim et al. | |
| 2011/0022358 A1 | 1/2011 | Han et al. | |
| 2011/0054845 A1 | 3/2011 | Han et al. | |
| 2011/0060553 A1 | 3/2011 | Han et al. | |
| 2011/0074589 A1 | 3/2011 | Han | |
| 2011/0200189 A1 | 8/2011 | True et al. | |

FOREIGN PATENT DOCUMENTS

| | | |
|---|---|---|
| CN | 1343862 | 4/2002 |
| CN | 1393672 | 1/2003 |
| CN | 1409886 | 4/2003 |
| CN | 1424843 | 6/2003 |
| CN | 1497915 | 5/2004 |
| CN | 1606282 | 4/2005 |
| CN | 1690685 | 11/2005 |
| CN | 2797999 | 7/2006 |
| CN | 101202639 | 6/2008 |
| CN | 101447119 | 6/2009 |
| CN | 101680693 | 3/2010 |
| CN | 102017519 | 4/2011 |
| CN | 102017520 | 4/2011 |
| CN | 102017593 | 4/2011 |
| CN | 102388572 | 3/2012 |
| CN | 102388574 | 3/2012 |
| CN | 102498691 | 6/2012 |
| CN | 102915004 | 2/2013 |
| CN | 103053136 | 4/2013 |
| EP | 0 038 687 | 10/1981 |
| EP | 0 510 519 | 10/1992 |
| EP | 0 617 557 | 9/1994 |
| EP | 0 691 060 | 1/1996 |
| EP | 0 742 308 | 11/1996 |
| EP | 0 846 991 | 6/1998 |
| EP | 0 851 054 | 7/1998 |
| EP | 0 887 989 | 12/1998 |
| EP | 1 186 694 | 3/2002 |
| EP | 1 186 695 | 3/2002 |
| EP | 2 180 648 | 4/2010 |
| JP | 04-241563 | 8/1992 |
| JP | H04241563 * | 8/1992 |
| JP | 04-358497 | 11/1992 |
| JP | 4-358497 | 12/1992 |
| JP | 07-239176 | 9/1995 |
| JP | 10-133767 | 5/1998 |
| JP | 11-127257 | 5/1999 |
| JP | 11-127254 | 11/1999 |
| JP | 2001-345949 | 12/2001 |
| JP | 2001-353395 | 12/2001 |
| JP | 2002-000988 | 1/2002 |
| JP | 2002-011274 | 1/2002 |
| JP | 2002-031471 | 1/2002 |
| JP | 2002-045590 | 2/2002 |
| JP | 2002-85887 | 3/2002 |
| JP | 2002-162149 | 6/2002 |
| JP | 2002-279091 | 9/2002 |
| JP | 2003-172578 | 6/2003 |
| JP | 2004-085071 | 3/2004 |
| JP | 2004-15125 * | 7/2004 |
| JP | 2004-215125 | 7/2004 |
| JP | 2005-061757 | 3/2005 |
| JP | 2005-273943 | 10/2005 |
| JP | 2007-267956 | 10/2007 |
| JP | 2008-003562 | 1/2008 |
| KR | 10-1991-0020404 | 12/1991 |
| KR | 10-1996-0003308 | 1/1996 |
| KR | 10-1997-0019443 | 4/1997 |
| KR | 10-0127232 | 10/1997 |
| KR | 10-0143209 | 8/1998 |
| KR | 10-1999-020285 | 3/1999 |
| KR | 20-1999-0040564 U | 12/1999 |
| KR | 20-0162050 | 12/1999 |
| KR | 10-2000-0018678 | 4/2000 |
| KR | 10-2001-0063913 | 5/2001 |
| KR | 10-2001-0055394 | 7/2001 |
| KR | 10-2002-0020831 | 3/2002 |
| KR | 10-2003-0000189 | 3/2002 |
| KR | 10-2002-0030426 | 4/2002 |
| KR | 10-2002-0039959 | 5/2002 |
| KR | 10-2004-0050767 | 6/2004 |
| KR | 10-2004-0095017 | 11/2004 |
| KR | 10-2004-0103352 | 12/2004 |
| KR | 10-2005-0062747 | 6/2005 |
| KR | 10-2005-0097282 | 10/2005 |
| KR | 10-2006-0056973 | 5/2006 |
| KR | 10-2006-0103014 | 9/2006 |
| KR | 10-0641974 | 11/2006 |
| KR | 10-2007-0013090 | 1/2007 |
| KR | 10-2008-0068447 | 7/2008 |
| KR | 10-0887575 | 3/2009 |
| KR | 10-2009-0115066 | 11/2009 |
| KR | 10-2010-0112950 | 10/2010 |
| KR | 10-2011-0010375 | 2/2011 |
| KR | 10-2011-0010378 | 2/2011 |
| WO | WO 01/11575 | 2/2001 |
| WO | WO 01/50669 A1 | 7/2001 |
| WO | WO 2005/106096 | 11/2005 |
| WO | WO 2008/010670 | 1/2008 |
| WO | WO 2008/117981 | 10/2008 |
| WO | WO 2009/134090 | 11/2009 |
| WO | WO 2011/087329 | 7/2011 |

OTHER PUBLICATIONS

U.S. Appl. No. 12/757,339, filed Apr. 9, 2010, Vishak Ganesh.
U.S. Appl. No. 12/757,232, filed Apr. 9, 2010, Mohamed Charioui.
U.S. Appl. No. 12/432,184, filed Apr. 29, 2009, Minh Chau Nguyen.
U.S. Appl. No. 13/382,334, filed Jan. 5, 2012, Scott T. Baderman.
U.S. Appl. No. 13/808,403, filed Jan. 4, 2013.
U.S. Appl. No. 12/842,649, filed Jul. 23, 2010, Xiuqin Sun.
U.S. Appl. No. 12/846,013, filed Jul. 29, 2010, Shirley Lu.
U.S. Appl. No. 12/847,272, filed Jul. 30, 2010, Manuel L. Barbee.
U.S. Appl. No. 12/847,406, filed Jul. 30, 2010, Manuel L. Barbee.
U.S. Appl. No. 12/847,284, filed Jul. 30, 2010, Manuel L. Barbee.
U.S. Appl. No. 12/847,306, filed Jul. 30, 2010, Manuel L. Barbee.
U.S. Appl. No. 13/562,704, filed Jul. 31, 2012.
U.S. Appl. No. 13/588,164, filed Aug. 17, 2012.
U.S. Appl. No. 13/922,669, filed Jun. 20, 2013.
U.S. Appl. No. 13/933,467, filed Jul. 2, 2013.
Japanese Office Action dated Oct. 29, 2013.
U.S. Office Action issued in U.S. Appl. No. 12/847,272 dated Dec. 2, 2013.
U.S. Office Action issued in U.S. Appl. No. 12/847,284 dated Dec. 4, 2013.
U.S. Office Action issued in U.S. Appl. No. 12/847,406 dated Dec. 17, 2013.
U.S. Office Action issued in U.S. Appl. No. 12/847,306 dated Dec. 17, 2013.
Chinese Office Action dated Oct. 30, 2014.
Japanese Office Action dated Nov. 18, 2014.
Chinese Office Action dated Dec. 3, 2014.
U.S. Notice of Allowance issued in U.S. Appl. No. 13/922,669 dated Dec. 31, 2014.
U.S. Office Action issued in U.S. Appl. No. 12/432,111 dated Nov. 15, 2012.

(56) References Cited

OTHER PUBLICATIONS

Chinese Office Action dated Nov. 16, 2012.
U.S. Office Action issued in U.S. Appl. No. 12/431,910 dated Dec. 5, 2012.
U.S. Office Action issued in U.S. Appl. No. 12/757,213 dated Dec. 13, 2012.
U.S. Office Action issued in U.S. Appl. No. 12/432,132 dated Dec. 19, 2012.
U.S. Office Action issued in U.S. Appl. No. 12/850,240 dated Dec. 27, 2012.
U.S. Office Action issued in U.S. Appl. No. 12/846,013 dated Dec. 28, 2012.
U.S. Notice of Allowance issued in U.S. Appl. No. 12/847,303 dated Jan. 11, 2013.
U.S. Office Action issued in U.S. Appl. No. 12/431,903 dated Jan. 2, 2013.
U.S. Office Action issued in U.S. Appl. No. 12/757,246 dated Jan. 17, 2013.
Chinese Office Action dated Dec. 16, 2013.(translation).
European Office Action dated Jan. 7, 2014. (11803799.3).
European Office Action dated Jan. 7, 2014. (11803798.5).
Australian Office Action dated Jan. 13, 2014.
Korean Office Action dated Jan. 28, 2014.
Japanese Office Action dated Feb. 4, 2014.
U.S. Appl. No. 12/431,893, filed Apr. 29, 2009, Leshui Zhang.
U.S. Appl. No. 12/431,903, filed Apr. 29, 2009, Leshui Zhang.
U.S. Appl. No. 12/431,910, filed Apr. 29, 2009, Leshui Zhang.
U.S. Appl. No. 12/432,132, filed Apr. 29, 2009, Leshui Zhang.
U.S. Appl. No. 12/551,827, filed Sep. 1, 2009, Leshui Zhang.
U.S. Appl. No. 12/568,022, filed Sep. 28, 2009, Phung Nguyen.
U.S. Appl. No. 12/757,205, filed Apr. 9, 2010, Alexander Satanovsky.
U.S. Appl. No. 12/757,213, filed Apr. 9, 2010, Philip A. Guyton.
U.S. Appl. No. 12/757,246, filed Apr. 9, 2010, Vishak Ganesh.
U.S. Appl. No. 12/603,810, filed Oct. 22, 2009, Renee Dorsey.
U.S. Appl. No. 12/842,679, filed Jul. 23, 2010, Tai T. Nguyen.
U.S. Appl. No. 12/846,040, filed Jul. 29, 2010, Mark A. Fleischer.
U.S. Appl. No. 12/847,303, filed Jul. 30, 2010, Kerri L. McNally.
U.S. Appl. No. 12/850,240, filed Aug. 4, 2010, Omer S. Khan.
European Search Report dated Dec. 17, 2012.
European Search Report dated Jan. 2, 2013.
Ethem M Sözer; "Simulation and Rapid Prototyping Environment for Underwater Acoustic Communications: Reconfigurable Modem"; OCEANS-Europe 2005; MIT Sea Grant College Program; Cambridge, MA, 02139; IEEE; pp. 80-85 (XP10838461A).
U.S. Office Action issued in U.S. Appl. No. 12/757,339 dated Jan. 31, 2013.
European Search Report dated Jan. 31, 2013. (10761908.2).
European Search Report dated Jan. 31, 2013. (10797292.9).
Japanese Office Action dated Feb. 12, 2013. (with translation).
U.S. Office Action issued in U.S. Appl. No. 12/603,810 dated Feb. 13, 2013.
U.S. Office Action issued in U.S. Appl. No. 12/551,827 dated Mar. 11, 2013.
U.S. Office Action issued in U.S. Appl. No. 12/842,649 dated Mar. 22, 2013.
Korean Office Action dated Feb. 26, 2014.
Korean Office Action dated Feb. 28, 2014.
Chinese Office Action dated Mar. 4, 2014.
Chinese Office Action dated Mar. 5, 2014.
U.S. Office Action issued in U.S. Appl. No. 13/588,164 dated Apr. 3, 2015.
U.S. Final Office Action issued in U.S. Appl. No. 13/562,704 dated Apr. 9, 2015.
Russian Office Action issued in Application No. 2013130254 dated Jan. 23, 2015.
U.S. Office Action issued in U.S. Appl. No. 12/757,232 dated Apr. 18, 2013.
U.S. Office Action issued in U.S. Appl. No. 12/846,013 dated May 7, 2013.
U.S. Notice of Allowance issued in U.S. Appl. No. 12/603,810 dated Jun. 12, 2013.
U.S. Office Action issued U.S. Appl. No. 12/432,111 dated Jun. 12, 2013.
U.S. Office Action issued in U.S. Appl. No. 12/847,272 dated Jun. 27, 2013.
U.S. Office Action issued in U.S. Appl. No. 12/757,213 dated Jun. 28, 2013.
U.S. Office Action issued in U.S. Appl. No. 12/847,284 dated Jun. 28, 2013.
U.S. Office Action issued in U.S. Appl. No. 12/847,406 dated Jul. 9, 2013.
U.S. Office Action issued in U.S. Appl. No. 12/847,306 dated Jul. 9, 2013.
U.S. Office Action. issued in U.S. Appl. No. 12/432,184 dated May 22, 2014.
Korean Office Action dated May 26, 2014.
U.S. Notice of Allowance issued in U.S. Appl. No. 12/757,339 dated May 28, 2014.
U.S. Office Action issued in U.S. Appl. No. 13/382,334 dated Jun. 5, 2014.
Milica Stojanovic; "Recent Advances in High-Speed underwater Acoustic Communications"; IEEE Journal of Oceanice Engineering, IEEE Service Center; Piscataway, NJ; vol. 21, No. 2; Apr. 1, 1996; pp. 125-136 (XP011042321).
Creber, R. K. et al.; "Performance of Undersea Acoustic Networking Using RTS/CTS Handshaking and ARQ Retransmission"; Oceans, 2001 MTS/IEEE Conference and Exhibition; Nov. 5-8, 2001; Piscataway, NJ; IEEE, vol. 4; Nov. 5, 2001; pp. 2083-2086 (XP010566758).
International Search Report dated Dec. 18, 2009 issued in Application No. PCT/KR2009/002288.
International Search Report dated Dec. 21, 2009 issued in Application No. PCT/KR2009/002199.
International Search Report dated Jan. 4, 2010 issued in Application No. PCT/KR2009/002211.
International Search Report dated Aug. 23, 2010 issued in Application No. PCT/KR2010/000319.
International Search Report dated Dec. 1, 2010 issued in Application No. PCT/KR2010/002222.
International Search Report dated Dec. 1, 2010 issued in Application No. PCT/KR2010/002211.
International Search Report dated Apr. 25, 2011 issued in Application No. PCT/KR 2010/004407.
International Search Report dated May 26, 2011 issued in Application No. PCT/KR2010/005108.
International Search Report issued in Application No. PCT/KR2011/000311 dated Jul. 28, 2011.
European Search Report dated Oct. 14, 2011 issued in Application No. 09 73 8950.
United States Office Action dated Dec. 27, 2011 issued in U.S. Appl. No. 12/432,184.
United States Office Action dated Feb. 10, 2012 issued in U.S. Appl. No. 12/568,022.
United States Office Action dated Feb. 14, 2012 issued in U.S. Appl. No. 12/431,910.
United States Office Action dated Mar. 1, 2012 issued in U.S. Appl. No. 12/846,040.
Russian Office Action dated Feb. 7, 2012. (with translation).
U.S. Office Action issued in U.S. Appl. No. 12/431,903 dated Mar. 8, 2012.
U.S. Office Action issued in U.S. Appl. No. 12/431,893 dated Mar. 19, 2012.
U.S. Office Action issued in U.S. Appl. No. 12/432,132 dated Mar. 20, 2012.
U.S. Office Action issued in U.S. Appl. No. 12/757,205 dated Apr. 2, 2012.
U.S. Office Action issued in U.S. Appl. No. 12/432,111 dated May 2, 2012.
European Search Report dated May 8, 2012.
U.S. Office Action issued in U.S. Appl. No. 12/757,246 dated May 18, 2012.

(56) References Cited

OTHER PUBLICATIONS

U.S. Office Action issued in U.S. Appl. No. 12/757,339 dated May 22, 2012.
U.S. Notice of Allowance issued in U.S. Appl. No. 12/568,022 dated Jun. 11, 2012.
U.S. Office Action issued in U.S. Appl. No. 12/757,213 dated Jun. 25, 2012.
U.S. Office Action issued in Application No. 12/603,810 dated Jul. 5, 2012.
U.S. Office Action issued in U.S. Appl. No. 12/431,910 dated Jul. 23, 2012.
U.S. Office Action issued in U.S. Appl. No. 12/431,893 dated Jul. 31, 2012.
Notice of Allowance issued in U.S. Appl. No. 12/842,679 dated Aug. 1, 2012.
U.S. Office Action issued in U.S. Appl. No. 12/431,903 dated Aug. 2, 2012.
U.S. Office Action issued in U.S. Appl. No. 12/432,184 dated Aug. 7, 2012.
U.S. Office Action issued in U.S. Appl. No. 12/432,132 dated Aug. 15, 2012.
U.S. Office Action issued in U.S. Appl. No. 12/551,827 dated Aug. 16, 2012.
Russian Office Action issued in Application No. 2010144513/08 dated Jun. 27, 2012.
Notice of Allowance issued in U.S. Appl. No. 12/846,040 dated Aug. 17, 2012.
Chinese Office Action dated Jun. 27, 2013.
U.S. Office Action issued in U.S. Appl. No. 12/431,893 dated Jul. 30, 2013.
U.S. Office Action issued in U.S. Appl. No. 12/757,339 dated Sep. 6, 2013.
U.S. Appl. No. 12/847,303, filed Jul. 30, 2010, Kerri, L. McNally.
U.S. Appl. No. 13/522,066, filed Jul. 13, 2012.
Korean Office Action dated Aug. 13, 2012.
Japanese Office Action dated Sep. 11, 2012.
Notice of Allowance issued in U.S. Appl. No. 12/757,205 dated Sep. 14, 2012.
U.S. Office Action issued in U.S. Appl. No. 12/847,303 dated Sep. 14, 2012.
U.S. Office Action issued in U.S. Appl. No. 12/757,232 dated Sep. 18, 2012.
U.S. Office Action issued in U.S. Appl. No. 12/842,649 dated Aug. 15, 2014.
U.S. Notice of Allowance issued in U.S. Appl. No. 13/382,334 dated Nov. 12, 2014.
U.S. Appl. No. 13 /922,669, filed Jun. 20, 2013.
Korean Notice of Allowance dated Aug. 30, 2013.
U.S. Office Action issued in U.S. Appl. No. 12/842,649 dated Oct. 8, 2013.
Chinese Office Action dated Oct. 10, 2013.
U.S. Notice of Allowance issued in U.S. Appl. No. 12/846,013 dated Nov. 5, 2013.
Australian Office Action dated Sep. 22, 2014.
Chinese Office Action dated Oct. 8, 2014.
U.S. Office Action issued in U.S. Appl. No. 13/562,704 dated Nov. 19, 2014.
U.S. Notice of Allowance issued in U.S. Appl. No. 12/842,649 dated Dec. 10, 2014.
European Search Report dated Mar. 23, 2016.
Chinese Office Action dated Feb. 3, 2016.
European Search Report dated Feb. 5, 2016.
U.S. Office Action issued in U.S. Appl. No. 13/933,467 dated Feb. 16, 2016.
U.S. Office Action issued in U.S. Appl. No. 13/588,164 dated Mar. 17, 2016.
U.S. Office Action issued in U.S. Appl. No. 13/808,403 dated Apr. 7, 2016.
U.S. Appl. No. 13/808,414, filed Jan. 4, 2013.
U.S. Appl. No. 13/808 403, filed Jan. 4, 2013.
U.S. Appl. No. 13/562,704, filed Jul. 31, 2012, Abul K. Azad, MD.
U.S. Appl. No. 13/588,164, filed Aug. 17, 2012, Stephanie E. Bloss.
U.S. Appl. No. 13/933,467, filed Jul. 2, 2013, Duc Chi Ho.
European Search Report dated Jun. 20, 2016.
U.S. Office Action issued in U.S. Appl. No. 13/808,403 dated Aug. 4, 2016.
U.S. Office Action issued in U.S. Appl. No. 13/588,164 dated Aug. 5, 2016.

\* cited by examiner

Fig. 6]
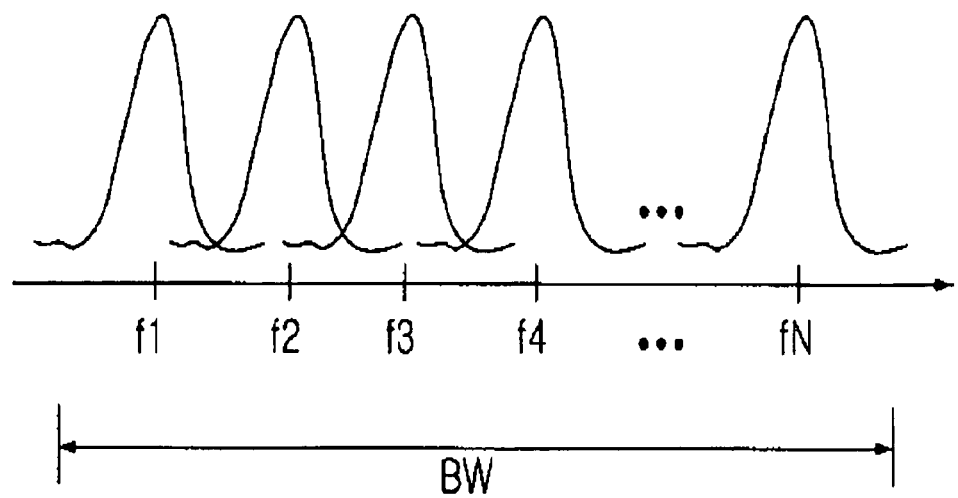
Fig. 7
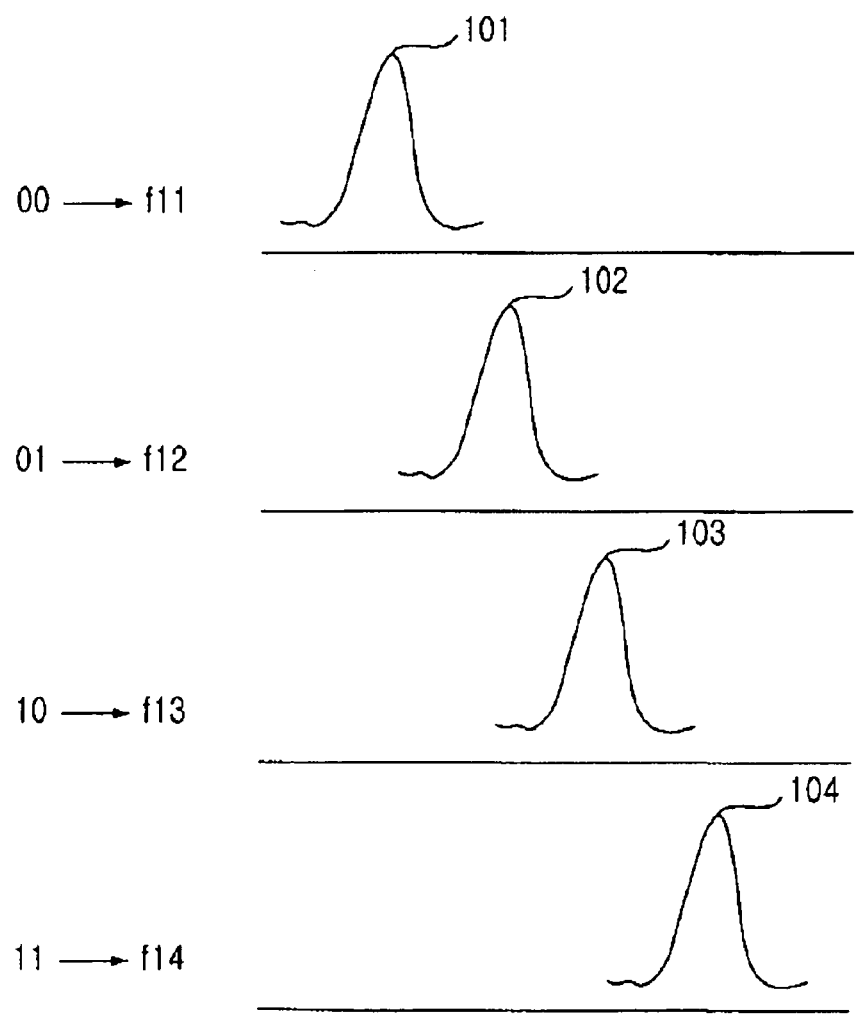

(b)
Error-free code words: aaaabbbbccccddddeeeeffffgggg
Interleaved: abcdefgabcdefgabcdefgabcdefg
Transmission with a burst error: abcdefgabcd____bcdefgabcdefg
Received code words after deinterleaving: aa_abbbbccccdddde_eef_ffg_gg (a)

| Version | Product ID | Diagnosis Data |
|---|---|---|
| 1 Byte | 7 Byte | 52 Byte |

(b)

| Version | Protocol Name |
|---|---|
| 0x01 | Smart Diagnosis for Refrigerator v1.0 |

Fig. 21
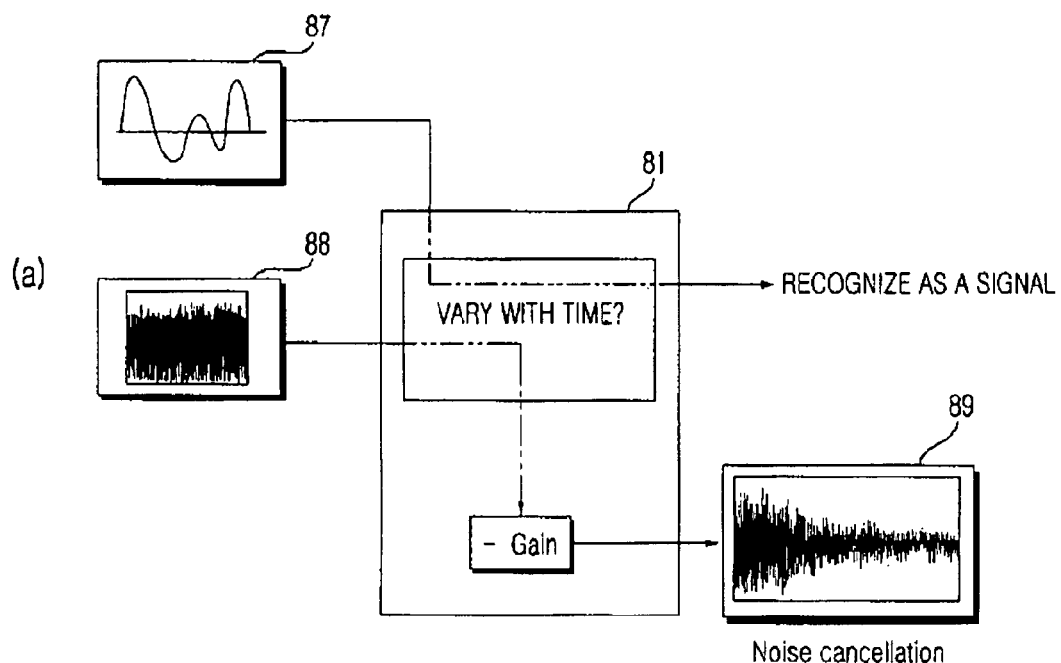
(a)
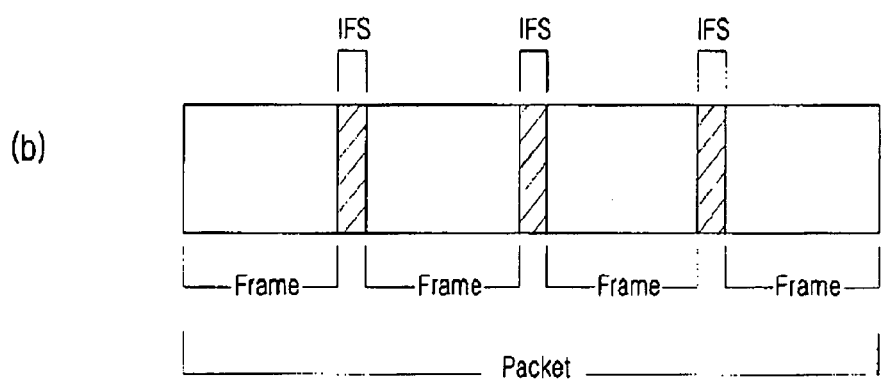
(b)

Fig. 24
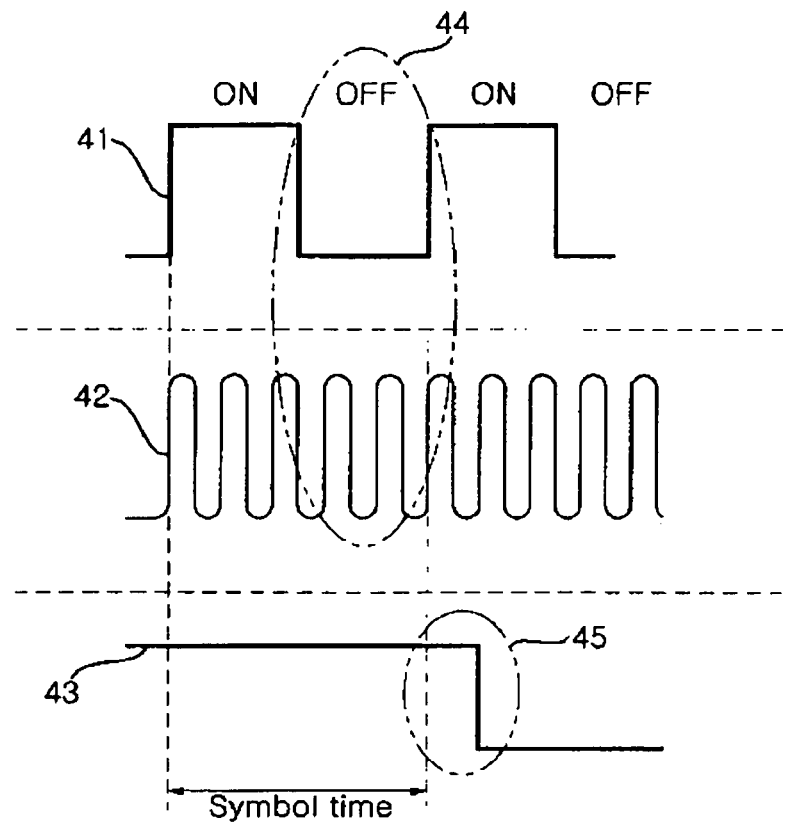
(a)
(b)

Fig. 25
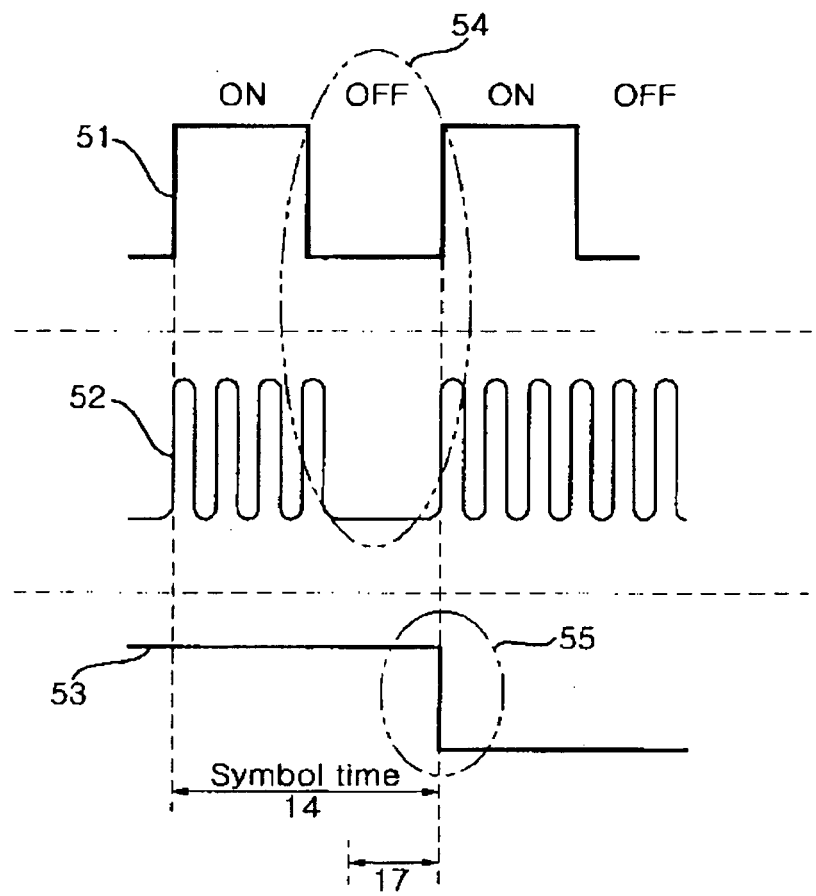
(a)
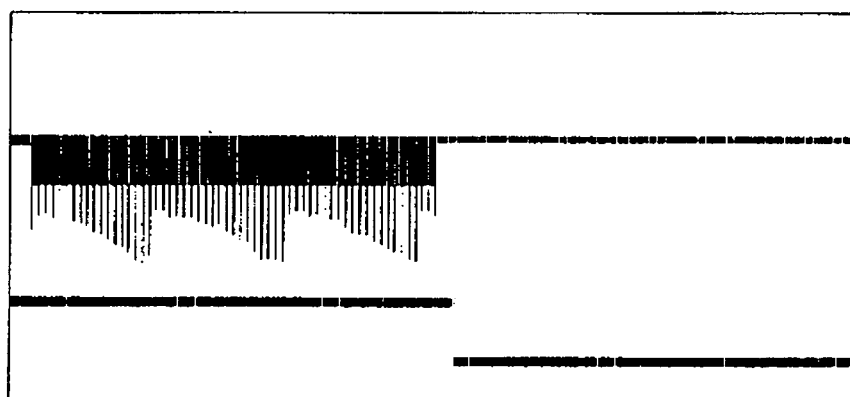
(b)

REFRIGERATOR AND DIAGNOSTIC SYSTEM FOR THE SAME

TECHNICAL FIELD

The present invention relates to a refrigerator, and more particularly, to a refrigerator that outputs product information as a certain sound to facilitate state check and after-sale service of the refrigerator.

BACKGROUND ART

While operating, a refrigerator stores values set for its operation, information generated during its operation, failure information, and so forth. Particularly, a refrigerator may output a certain alarm signal when it fails, so that a user recognizes the state of the refrigerator. Such a refrigerator does not inform only operation completion or failure occurrence, but also output specific failure information by means of output devices such as displays and lamps.

When a refrigerator fails, a user may call upon a service center for an advice or a visit of a service technician as part of after-sale service.

In this case, since a refrigerator usually outputs simple failure information or code values unfamiliar to a user, it is difficult for the user to deal with the failure of the refrigerator and deliver the state of the refrigerator to the service center even when the user is connected to the service center. Accordingly, when a service technician visits a user's home, much time and cost may be spent for repair because the service technician has not been exactly informed of the state of the refrigerator in advance. For example, if components necessary for the repair of the refrigerator are not prepared in advance, the service technician has to revisit the user's home. This causes a waste of time.

Accordingly, a method for exactly delivering failure information of a refrigerator to a service center without explaining in detail to the service center is required.

DISCLOSURE OF INVENTION

Technical Problem

Thus, an object of the present invention is to provide a refrigerator that outputs product information as a certain sound to facilitate exact diagnosis of the refrigerator.

Solution To Problem

According to an aspect of the present invention, there is provided a refrigerator including: a selection unit receiving a diagnosis performance command; a control unit generating a control signal comprising product information when the selection unit receives the diagnosis performance command; a modulator generating a frequency signal according to the control signal generated by the control unit; and a sound output unit outputting a sound comprising the product information according to the frequency signal generated by the modulating unit.

According to another aspect of the present invention, there is provided a refrigerator diagnostic system including: a refrigerator outputting a sound comprising product information; a terminal receiving the sound outputted from the refrigerator by the medium of air, and transmitting the received sound through a communication network; and a diagnostic server receiving the sound transmitted from the terminal and extracting the product information from the received sound to perform a diagnosis of the refrigerator.

Advantageous Effects of Invention

A refrigerator according to an embodiment of the present invention has an advantage in that a user can take appropriate actions to repair the refrigerator without explaining in detail the operation state of the refrigerator to a service center because the refrigerator can output product information as a sound and perform failure diagnosis based on the outputted sound.

Also, a refrigerator according to an embodiment of the present invention has an effect of improving esthetic feeling and usability upon entrance into failure diagnosis of the refrigerator by including a sound output unit for outputting a sound including production information in a hinge unit that is coupled to a door of the refrigerator.

Also, a refrigerator according to an embodiment of the present invention has an effect of improving overall esthetic feeling of the refrigerator by including a sound output unit for outputting a signal sound including product information in a hinge unit of a refrigerator door to cover the sound output unit with the door when the door is closed.

Also, a refrigerator according to an embodiment of the present invention has an effect of enabling detail data transmission necessary for diagnosis because it can shorten the time taken to output a sound as the length of the sound including product information is reduced, reduce a data transmission time and a transmission data size according to the transmission of the sound, and transmit much more data for a certain time, by converting the product information into a control signal using a plurality of frequency signals.

Also, a refrigerator according to an embodiment of the present invention has an effect of easily providing after-sale service for a customer through state check and diagnosis of the refrigerator in a diagnostic system through a communication network because it can output an effective and exact sound, prevent noise or signal error generated during the signal conversion, and facilitate information transmission due to stable signal conversion and exact sound output, by configuring product information with a plurality of frames and coding the product information by frame unit according to a certain manner to output the coded data as a sound including the product information.

Further more, a refrigerator according to an embodiment of the present invention has an effect of reducing the time taken to output or transmit a sound by controlling the signal and frequency characteristics constituting the sound including product information, improving the recognition rate and the transmission rate of the sound by enabling exact data transmission necessary for failure diagnosis, and improving the accuracy of the failure diagnosis by facilitating the failure diagnosis of home appliances using a sound.

In addition, a refrigerator according to an embodiment of the present invention has an effect of exactly transmitting product information even when there is an obstacle in a transmission process of a sound due to a signal interference caused by an ambient environment, by changing the frequency or amplitude of the sound including the product information to re-output it.

BRIEF DESCRIPTION OF DRAWINGS

FIG. 6 is a diagram illustrating the type of frequencies outputted from a sound output unit of the refrigerator of FIG. 3;

FIG. 7 is a diagram illustrating an exemplary data conversion into a plurality of frequency in a refrigerator according to an embodiment;

FIG. 10 is a diagram illustrating another exemplary signal conversion using a plurality of frequencies;

FIG. 21 is a diagram illustrating Inter Frame Space (IFS) setting of a control signal;

FIG. 21(a) is a diagram illustrating a process of recognizing noise from a terminal, and FIG. 21(b) is a diagram illustrating a frame including IFS to avoid a noise reduction;

FIG. 24 is a diagram illustrating an exemplary output signal form when a signal is converted without a dead time;

FIG. 25 is a diagram illustrating an exemplary signal form when a sound signal of a control signal is converted by applying a dead time in a refrigerator;

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
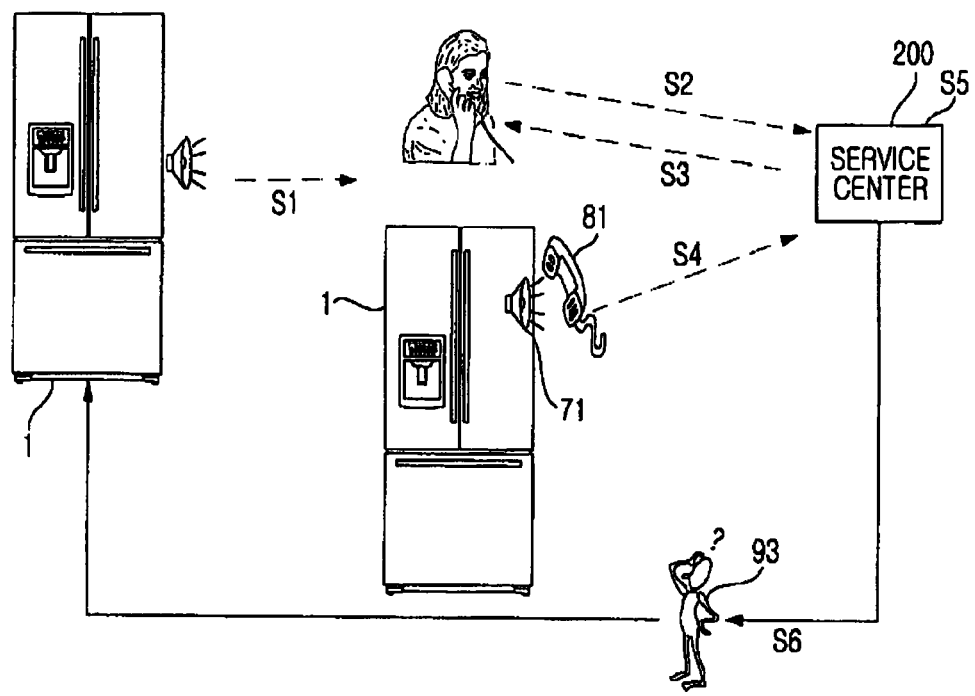
FIG. 1 is a diagram illustrating the configuration of a refrigerator and a diagnosis system including the refrigerator according to an embodiment.

FIG. 1 is a diagram illustrating the configuration of a refrigerator and a diagnosis system including the refrigerator according to an embodiment Referring to FIG. 1, the refrigerator 1 may be included in the diagnostic system to undergo a diagnosis of the state and failure thereof from a service center 200. The service center 200 may include a diagnostic server having information on the refrigerator 1 and a diagnostic program.

The diagnostic system of the refrigerator 1 is configured in such a manner that, when a refrigerator 1 in each home outputs information about the operation thereof as a sound, the sound, which includes product information, is transmitted to a service center 200 over a telephone network so that the service center 200 may diagnose the state of the refrigerator 1 to determine whether the refrigerator 1 is out of order.

The refrigerator 1 includes a display unit for displaying certain data. The display unit is a light emitter such as a light emitting diode (LED), a liquid crystal display (LCD) or an organic electro-luminescent (EL) display, and visually displays state information or failure information of the refrigerator 1. The refrigerator 1 further includes a sound output unit 71 for outputting a sound. The sound output unit 71 reproduces and outputs information about the operation, state or failure of the refrigerator 1 as a certain sound.

When the refrigerator 1 malfunctions or operates abnormally, it informs a user of occurrence of a failure through a display unit or a sound output unit (S1).

The user verifies the product information of the refrigerator 1 displayed on the display unit of the refrigerator 1 to control the operation of the refrigerator 1 or ask the service center 200 for repair of the refrigerator 1. In this case, the user may contact the service center 200 to notify the service center 200 that a failure has occurred in the refrigerator 1 and ask for an advice on the failure (S2).

When the user connects to the service center 200 and manipulates a selector of an input device in the refrigerator 1 in response to a request from the service center 200 (S3), the refrigerator 1 converts the product information into a certain sound and outputs the sound through the sound output unit 71. The sound including the product information, which has been output in this manner, is transmitted to the service center 200 over a communication network (S4).

In this case, while the user is notifying the service center 200 of model information and failure symptoms of the refrigerator 1, the user may place a telephone 81 close to a sounding portion of the refrigerator 1, that is, the sound output unit during the calling with the service center 200 to transmit the sound including the product information of the refrigerator 1 to the service center 200. In this manner, the user may transmit the sound including the product information of the refrigerator 1 to the service center 200 using his/her telephone or mobile phone to request an after-sale service (A/S) for the refrigerator 1.

When the service center 200 receives the sound outputted from the refrigerator 1 over a communication network connected thereto, for example, a telephone network, the service center 200 checks the product state of the refrigerator 1 based on the received sound to diagnose whether the refrigerator 1 is out of order (S5).

According to a result of the diagnosis, the service center 200 dispatches a service technician 93 to the user's home to provide a service suitable for the product state and failure diagnosis of the refrigerator 1 (S6). In step S6, the diagnosis result may be transmitted to a terminal of the service technician 93. According to circumstances, the service center 200 may connect with the user through the communication network to provide the diagnosis result to the user in the form of a voice through a customer service agent or in the form of certain data. Also, the diagnosis result may be transmitted to the user's email address or mobile phone.

The refrigerator 1 is configured as described below, outputting the product information as a certain sound.

Figure 2:
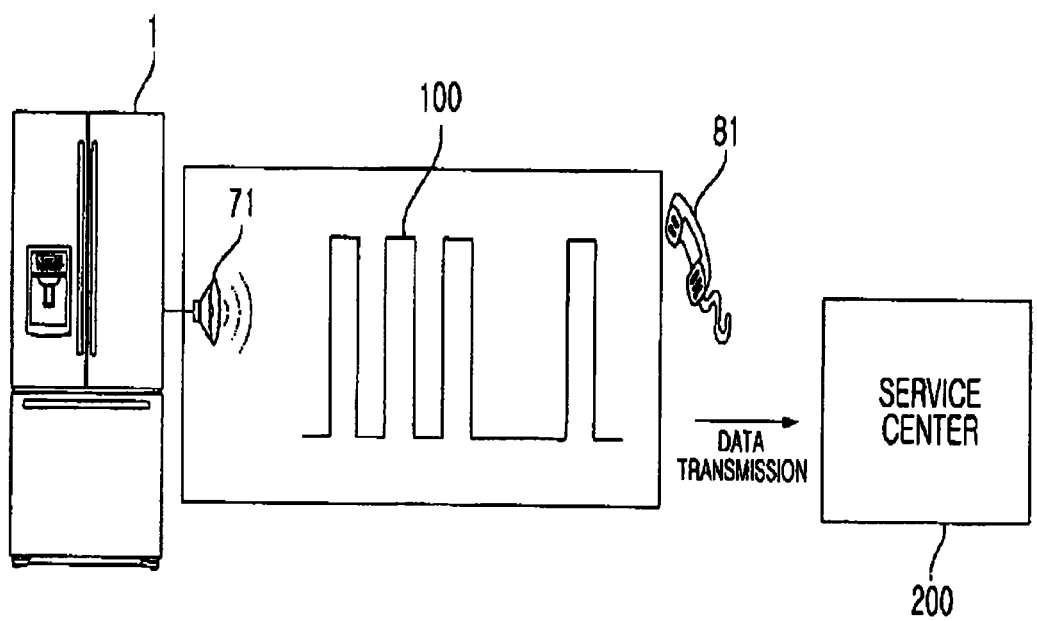
FIG. 2 is a diagram illustrating a refrigerator and a relation between the refrigerator and a service center according to an embodiment.

FIG. 2 is a diagram illustrating a refrigerator and a relation between the refrigerator and a service center according to an embodiment.

Referring to FIG. 2, when a failure occurs in a refrigerator 1, failure information is displayed on a display unit, or a certain alarm sound is outputted. Accordingly, a user connects to a service center 200, and manipulates a selection unit according to an instruction of the service center 200.

As the user manipulates the selection unit, the refrigerator 1 receives a signal output command, converts the production information into a sound signal through a modulator, and outputs the sound signal as a certain signal sound 100 through a sound output unit 71.

In this case, the signal sound 100 output through the sound output unit 71 is transmitted to the service center 200 through a terminal 81 connected to a certain communication network. In this case, examples of the communication networks include a telephone network or a mobile communication network. Examples of the terminal 81 include telephones or mobile terminals.

The service center 200 acquires operation and failure information of the refrigerator 1 through an analysis of the signal sound 100. Accordingly, the service center 200 delivers a countermeasure against the malfunction of the refrigerator 1, and dispatches a service technician.

Figure 3:
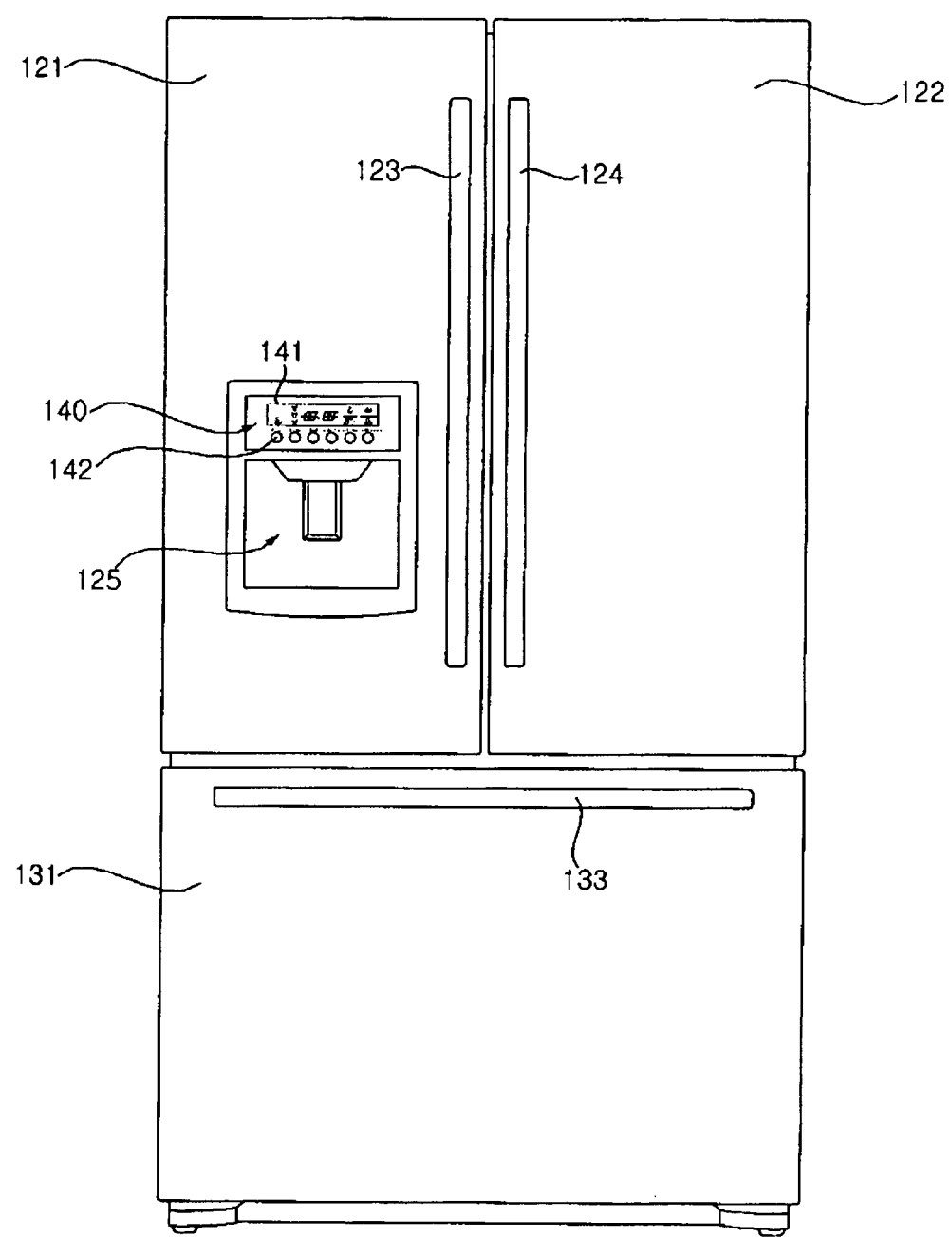
FIG. 3 is a front view illustrating a refrigerator according to an embodiment.
Figure 4:
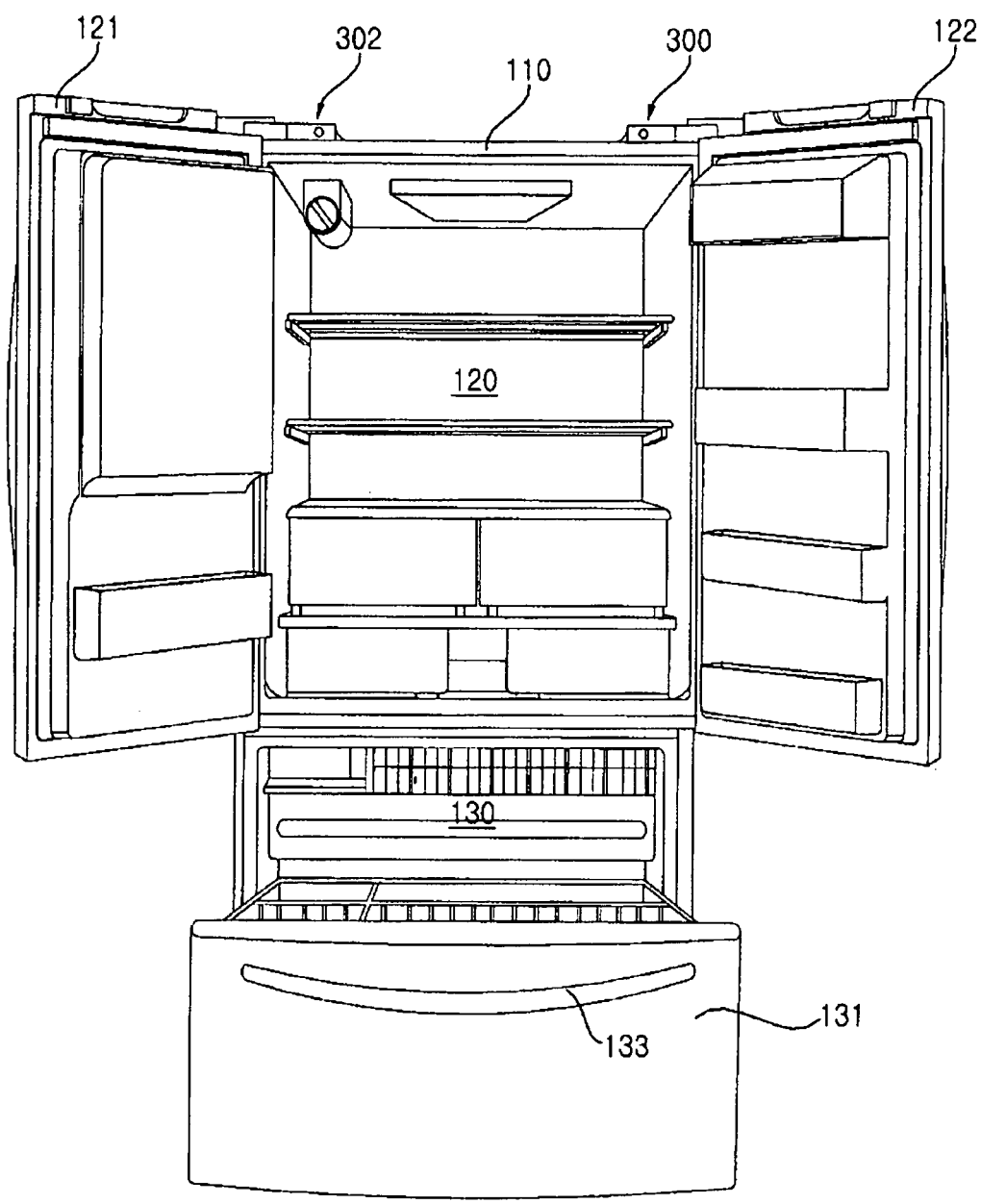
FIG. 4 is a diagram illustrating the refrigerator of FIG. 3 with its doors opened.
Figure 5:
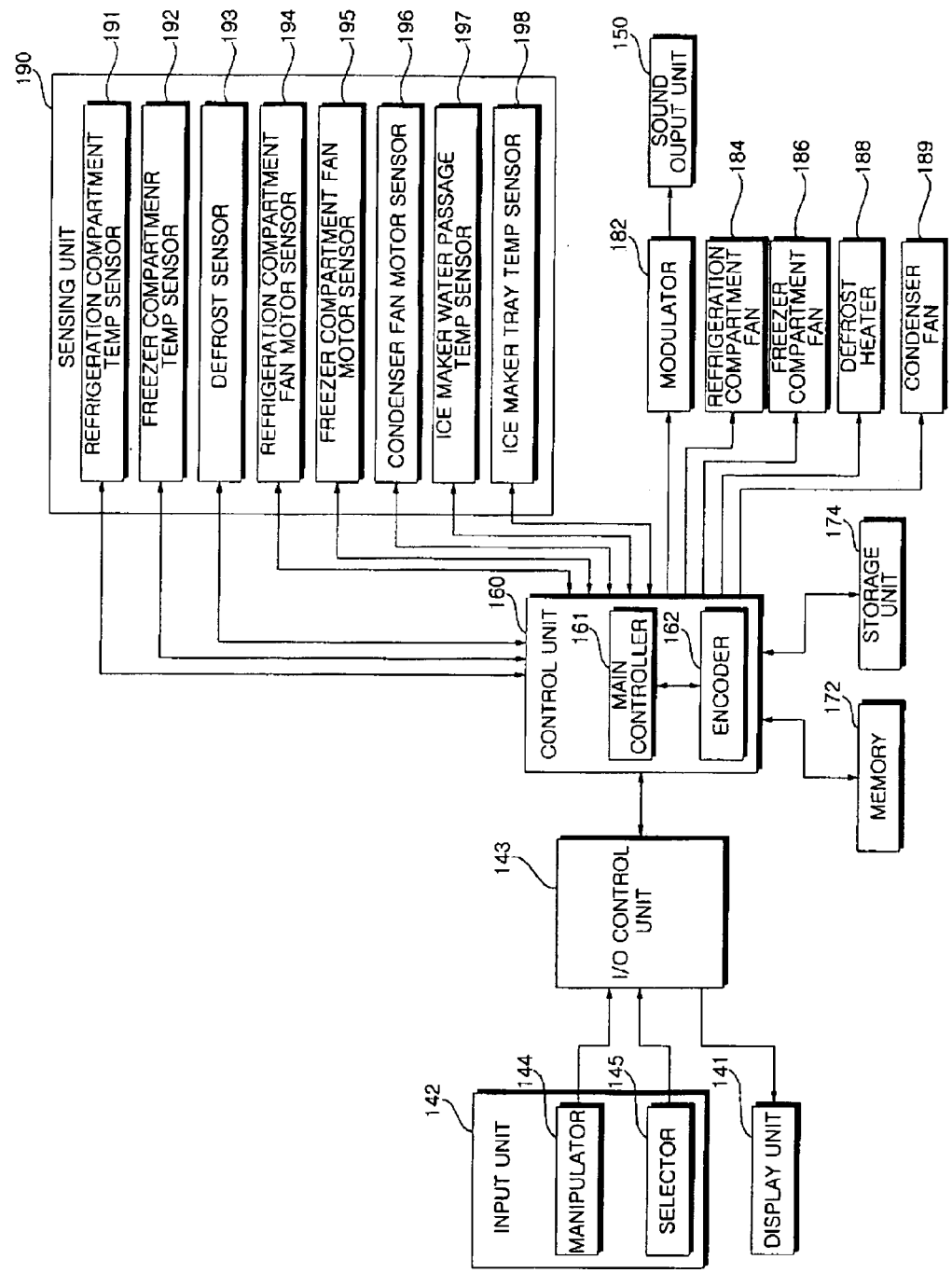
FIG. 5 is a block diagram illustrating a core figuration of a refrigerator according to an embodiment.

FIG. 3 is a front view illustrating a refrigerator according to an embodiment. FIG. 4 is a diagram illustrating the refrigerator of FIG. 3 with its doors opened. FIG. 5 is a block diagram illustrating a core figuration of a refrigerator according to an embodiment.

Referring to FIGS. 3 through 5, a refrigerator 1 has an external appearance defined by a case 110 defining an internal space divided into a refrigeration compartment 120 and a freezer compartment 130, and refrigeration compartment doors 121 and 122 opening and closing the refrigeration compartment 120, and a freezer compartment door 131 opening and closing the freezer compartment 130.

The refrigeration compartment doors 121 and 122 include a left refrigeration compartment door 121 pivotably connected to the left side of the case 110 and a right refrigeration compartment door 122 pivotably connected to the right side of the case 110, and are opened and closed by a user. The freezer compartment door 131 is coupled slidably along the case 110, and holds food. The freezer compartment door 131 is pushed toward the inner side of the case 110 to close the freezer compartment 130, and is drawn from the case 110 to open the freezer compartment 130.

In the present embodiment, the refrigerator 1 is described as a refrigerator of a three-door type, in which three doors open and close the refrigeration compartment 120 and the freezer compartment 130, the refrigeration compartment 120 is provided in the upper portion of the case 110, and the freezer compartment 130 is provided in the lower portion of the case 110 under the refrigeration compartment 120. However, the embodiments are not limited to the above configuration. For example, the refrigerator 1 may be a refrigerator of a two-door type, in which the case 110 is divided into left and right portions thereof, one is provided with a freezer compartment, and the other is provided with a refrigeration compartment. Also, doors may be pivotably provided at the both sides of the case 110 to selectively open and close the freezer compartment and the refrigeration compartment. In addition, the refrigerator 1 may be a refrigerator of a four-door type, which has a similar structure to that of the present invention, but further includes an additional freezer compartment that is opened and closed by a door of a sliding type.

Refrigeration compartment door grips 123 and 124 are provided on the refrigeration compartment doors 121 and 122 to be opened and closed by a user. A freezer compartment door grip 133 is provided on the freezer compartment door 131 to be opened and closed by a user.

A dispenser 125 may be provided on the front surface of the refrigeration compartment doors 121 or 122 to allow a user to easily take out ice or water from the dispenser 125. A control panel 140 may be provided over the dispenser 125 to control the operation of the refrigerator 1 and output the state of the refrigerator 1 on an image and/or sound through a display unit 141.

The control panel 140 may include a display unit 141, which is a light emitter such as a light emitting diode (LED), a liquid crystal display (LCD) or an organic electroluminescent (EL) display, which visually displays displaying state information or failure information of the refrigerator 1, a sound output unit including a buzzer or a speaker to output a sound, and an input unit 142 implemented with a mechanical button or a capacitive/resistive touch button that receive various operation commands from a user.

The refrigerator 1 may perform refrigeration and freezing through a thermal exchange with ambient air using a phase change of refrigerant that is achieved in a cyclic process involving compression, expansion, evaporation, and condensation of refrigerant circulating along a refrigerant pipe. To this end, the refrigerator 1 includes a compressor (not shown) for compressing refrigerant, an expansion valve (not shown) for expanding refrigerant, a thermal exchanger (not shown) serving as an evaporator for evaporating refrigerant, and a thermal exchanger (not shown) serving as a condenser for condensing refrigerant.

Also, the refrigerator 1 further includes a refrigeration compartment fan 184 for blowing cooled air to the refrigeration compartment 120, a freezer compartment fan 186 for blowing cooled air to the freezer compartment 130, and a sensing unit 190 for sensing the operation state of various components constituting the refrigerator 1.

The sensing unit 190 includes at least one sensing means for sensing temperature, pressure, voltage, current, water level, and rotational speed, and applies sensed or measured data to a control unit 160.

More specifically, the sensing unit 190 may include a refrigeration compartment temperature sensor 191 for sensing the temperature of the refrigeration compartment 120 and a freezer compartment temperature sensor 192 for sensing the temperature of the freezer compartment 130, a defrost sensor 193 for sensing frost covered on the surface of the evaporator to determine whether to perform a defrost operation, a refrigeration compartment fan motor sensor 194 for sensing whether the refrigerator compartment fan 184 normally operates or not, a freezer compartment fan motor sensor 195 for sensing whether the freezer compartment fan 186 normally operates or not, and a condenser fan motor sensor 196 for sensing whether a condenser fan 189 for emitting a heat generated in the condenser upon heat-exchange with refrigerant normally operates or not.

Also, the refrigerator 1 may include an ice maker for making ice, which may include a water passage through which water necessary for ice flows and an ice tray in which water supplied through the water passage gathers and freezes to ice having a certain shape. In this case, the sensing unit 190 may further include an ice maker water passage temperature sensor 197 for measuring the temperature of water in the water passage, and an ice maker tray temperature sensor 198 for measuring the temperature in the ice tray. Ice frozen by the ice maker may be supplied through the dispenser 125.

The control unit 160 analyzes the state information of the refrigerator 1 based on information collected through various sensors constituting the sensing unit 190. An input/output control unit 143 controls the state information analyzed by the control unit 150 to be displayed on the display unit 141.

More specifically, the input/output control unit 143 mediates between the control unit 160 and the input unit 142 and the display unit 141 provided in the control panel 140. The input/output control unit 143 allows various control commands inputted through the input unit 142 by a user to be delivered to the control unit 160, and allows symbols, texts, and/or images such as icons to be displayed on the display unit 141 in response to the inputted control command, or, when information sensed by the sensing unit 190 is delivered through the control unit 160, allows state information based thereon to be displayed on the display unit 141.

The input unit 142 includes at least one input means for inputting a certain signal or data into the refrigerator 1 by a user. The input unit 142 includes a manipulator 144 receiving various control commands about operations of the refrigerator 1 and a selector 145 receiving a smart diagnostic mode command for failure diagnosis of the refrigerator 1.

The selector 145 includes at least one input means. When smart diagnostic mode is selected, a signal output command may be applied to the control unit 160 such that the product information is outputted as a certain sound through the sound output unit 150.

As the refrigerator enters smart diagnostic mode, the selector 145 allows the sound output unit 150 to turn on/off. That is, when a signal output command is inputted through the selector 145, the product information is outputted as a certain sound in response to the control signal of the control unit 160. In this case, the sound output unit 150 may operate to output a sound including the product information.

When the control commands are inputted through the manipulator 144, data such as operation course and operation setting are applied to the control unit 160 according to the operation of the refrigerator 1. Also, the manipulator 144 may receive settings regarding the sound output. That is, the manipulator 144 makes it possible to set a sound output method and the volume of an outputted sound.

The input unit 142 such as the selector 145 and the manipulator 144 may be configured with buttons, dome switches, resistive/capacitive touch pads, jog wheels, jog switches, finger mice, rotary switches, jog dials, and other devices that generate certain input data by manipulations such as pushing, rotating, pressing, and contact.

On the other hand, the selector 145 may be configured with a certain input means separately from the manipulator 144. The selector 145 may perform a specific function by a button combination of two or more buttons or a typical on/off manner, but may perform different functions according to a specific push pattern such as continuous pushing for a certain time or repeated pushing in a certain time.

For example, the refrigerator 1 includes a lock button (142f of FIG. 34) for locking the operation buttons, and a freezer compartment temperature setting button (142c of FIG. 34) for setting the temperature of the freezer compartment 120. After the refrigerator 1 enters a lock mode in which the operation buttons are locked by pushing the lock button 142f in a state where the refrigeration door 122 is opened, the refrigerator 1 enters smart diagnostic mode by pushing a specific button (e.g., the freezer compartment temperature setting button 142c) for a predetermine duration (e.g., about 3 seconds).

Thus, the refrigerator 1 may enter smart diagnostic mode only when a user obviously intends to enter smart diagnostic mode.

A memory 172 stores control data for controlling the operation of the refrigerator 1 and reference data used during the operation control of the refrigerator 1.

In this case, the memory 172 includes a data storage such as a read only memory (ROM) or electrically erasable programmable ROM (EEPROM) for storing control data on the refrigerator 1.

The storage unit 174 is a buffer for the control unit 160 that temporarily stores data. The storage unit 174 may be, for example, a dynamic random access memory (DRAM) or static RAM (SRAM). In some cases, the storage unit 174 may be incorporated into the control unit 160 or memory 172.

That is, the memory 172 stores the product information including the operation information, the usage information, and the failure information. The storage unit 174 stores temporary data on the operation information and the failure information that are generated during the operation of the refrigerator 1. The product information may include frequency of usage of the refrigerator 1, refrigeration courses such as quick-freezing, optional setting information, error codes, sensor measurement values, data calculated by the control unit, operation information of the respective units, user setting information and/or operation state information.

More specifically, the memory 172 stores operation state data generated during the operation of the refrigerator 1, operation information such as setting data inputted by the manipulator 144 such that the refrigerator 1 performs a certain operation, frequency of performance of a specific operation by the refrigerator 1, usage information including the model information of the refrigerator 1, and failure information including the malfunction cause and/or malfunctioning components of the refrigerator 1

When the refrigerator 1 operates, the failure information may include various pieces of information including failure information generated during the respective operations, mechanical failure information of the refrigerator 1, error codes corresponding to the failure information, information of the control unit 160, and values sensed by the sensing unit 190.

The usage information may include various information including the number of uses of the refrigerator 1 by the user, a course set by the user, and/or optional setting information set in the refrigerator 1. That is, the usage information may include contents inputted to the refrigerator 1 by the user or information initially set in the refrigerator 1.

When a signal for smart diagnostic mode entry is inputted from the selector 145, the control unit 160 fetches the product information stored in the memory 172 or storage unit 174 to generate a control signal of a certain format and apply the control signal to the modulator 182. Also, as the selector 145 is manipulated, the control unit 160 controls the sound output unit 150 to operate.

The control unit 160 includes a main controller 161 for controlling a flow of data inputted or outputted to or from the refrigerator 1, and generating a control command according to data inputted from the sensing unit 190 to control the refrigerator 1 to operate, and an encoder 162 for converting the product information into a control signal of a certain format to output sounds according to the input of the selector 145.

When the refrigerator 1 enters smart diagnostic mode according to the input of the selector 145, the main controller 161 outputs a startup sound informing the initiation of smart diagnostic mode through the sound output unit 150 and displays certain data indicating the execution of smart diagnostic mode on the display unit 141. In this case, the I/O control unit 143 may intervene between the main controller 161 and the display unit 141 as described above.

Also, when the control signal generated in the encoder 162 is applied to the modulator 182 to be outputted through the sound output unit 150, the main controller 161 controls the sound output unit 150 to output a certain indication sound before and after the output of the sound. According to embodiments, the indication sound may be omitted.

The refrigerator 1 may include two or more sound output units 150. In this case, the sound output units 150 may include a first sound output unit for outputting the product information or the failure information of the refrigerator 1 and a second sound output unit for outputting various announcement messages to a user according to the operation state of the refrigerator 1. The first sound output unit and/or the second sound output unit may be implemented with a sound output means such as a buzzer or a speaker. The configuration and arrangement of the sound output means constituting each sound output unit will be described later.

In the present embodiment, as described above, the refrigerator 1 enters smart diagnostic mode by pushing the freezer compartment temperature setting button that is a specific operation button, for a predetermined duration (e.g., about 3 seconds), in a state where the operation buttons are locked by the lock button. Accordingly, operations of buttons except the power button and the freezer compartment temperature setting button, the function of which is restricted with smart diagnosis performance, may be restricted before the release of the lock button.

The encoder 162 fetches the product information stored in the memory 172 to encode the product information according to a certain encoding scheme, and adds a preamble and an error check bit to the resulting data signal to generate a control signal of a certain format. The encoder 162 generates a control signal including a plurality of symbols by encoding the product information.

In the course of generating the control signal, the encoder 162 may divide the control signal into a plurality of frames by a certain size and packetize the frames into a packet. Also, the encoder 162 may set an inter-frame space (IFS) between the frames of the control signal such that no sound is outputted for a certain time. Also, during signal conversion, the encoder 162 may set a dead time in a symbol at a section in which a data value is changed, in order to remove a reverb effect that affects a next signal conversion due to the principle of charging and discharging of a capacitor.

Assuming that the length of each of the symbols constituting the control signal is a symbol time, and the fundamental length of a frequency signal constituting a sound with respect to the sound outputted from the sound output unit 150 according to each symbol is also a symbol time, the encoder 162 may set a dead time within the symbol time with respect to one symbol. In this case, the length of the dead time varies with the length of the symbol time.

As stated above, the product information includes operation information including operation settings and operation state, usage information, and failure information about a malfunction. The product information is data including a combination of 0 or 1, which is a digital signal of a format readable by the control unit 160

The control unit 160 generates a control signal of a certain format by classifying data of the product information, incorporating specific data about the operation of the refrigerator 1 into the classified data and dividing the resulting data by a certain size or combining the resulting data, and applies the generated control signal to the modulator 182.

Also, the control unit 160 may change the number of symbols corresponding to output frequency signals according to the number of frequencies used in the modulator 182.

In this case, the control unit 160 changes the number of symbols of the control signal corresponding to the number of frequency signals according to the number of frequencies used in the modulator 182. That is, in the case where the number of frequencies used is $2^n$, n symbols of the control signal correspond to one frequency signal.

For example, the control unit 160 may control the modulator 182 to convert one symbol of the control signal into one frequency signal when the modulator 182 uses two frequencies to control the sound output unit 150 to output a sound, two symbols of the control signal into one frequency signal when using four frequencies, and three symbols of the control signal into one frequency signal when using eight frequencies.

In this case, a symbol time may also be changed according to the number of symbols corresponding to one frequency signal.

The modulator 182 applies a drive signal to the sound output unit 150 in response to the control signal from the control unit 160 such that the sound output unit 150 outputs a sound. The sound outputted in this manner includes product information.

The modulator 182 applies the drive signal to the sound output unit 150 such that a specified frequency signal corresponding to one of the symbols constituting the control signal is outputted for a symbol time.

In this case, the modulator 182 performs a control operation such that the sound is outputted through a plurality of frequency bands in accordance with the control signal while changing the number of symbols for each frequency signal based on the number of used frequencies in accordance with setting of the control unit 160.

That is, as described above, one frequency signal may be outputted per symbol for a specified time when two frequencies are used, and one frequency signal may be outputted per 2 symbols for the specified time when four frequencies are used.

When four frequencies are used, the modulator 182 controls the sound output unit 150 in response to a control command from the control unit 160 such that one frequency signal is outputted per two symbols of the control signal, so that a sound including a combination of a plurality of frequency signals is outputted. When eight frequencies are used, the modulator 182 performs a control operation such that one frequency signal is outputted per three symbols of the control signal.

As a result, the frequency band and length of a sound outputted from the sound output unit 150 are changed according to the number of frequencies used in the modulator 182. Whenever the number of frequencies used is doubled, the total length of the outputted sound (total sound output time) is reduced by ½.

That is, in the case where the modulator 182 controls the sound output unit 150 using frequencies of a number corresponding to $2^n$, one frequency signal is outputted per n symbols of the control signal and the length of a sound is reduced to $(½)^n$.

The modulator 182 includes frequency oscillators (not shown) for generating as many oscillation frequencies as the number of available frequencies and controls the sound output unit 150 to output frequency signals from frequency oscillators that are specified in accordance with the control signal.

The modulator 182 converts the control signal from the control unit 160 into the sound using one of frequency-shift keying, amplitude-shift keying, or phase-shift keying while controlling the sound output unit 150 to output the sound in accordance with the control signal.

Frequency-shift keying converts the control signal into a signal having a frequency corresponding to a data value of the control signal, amplitude-shift keying converts the control signal by changing the amplitude of the control signal according to the data value, and phase-shift keying converts the control signal by changing the phase of the control signal according to the data value.

Binary frequency-shift keying (BFSK), which is a type of frequency-shift keying, converts the control signal into a signal of a first frequency when the control signal has a data value of 0 and into a signal of a second frequency when it has a data value of 1. For instance, BFSK converts a data value 0 into a signal of a frequency of about 2.6 KHz and converts a data value 1 into a signal of a frequency of about 2.8 KHz, as will be described later with reference to FIG. 7.

Amplitude-shift keying may convert the control signal into a signal of a frequency of about 2.6 kHz with an amplitude of 1 when the control signal has a data value of 0 and an amplitude of 2 when it has a data value of 1.

While the modulator 182 has been described as using frequency-shift keying as an example, the modulation scheme used may be changed. Also, the frequency bands used are merely an example and may be changed.

If a dead time is set in the control signal, the modulator 182 discontinues modulation in a section in which the dead time is set in the control signal. The modulator 182 modulates the control signal using pulse width modulation (PWM) and switches an oscillation frequency for modulation off during the section, in which the dead time is set, to temporarily discontinue the frequency signal modulation during the dead time. This removes inter-symbol reverberation of the sound outputted from the sound output unit 150.

The sound output unit 150 is activated or deactivated according to a control command from the control unit 160. The sound output unit 150 outputs a certain sound including product information by outputting a frequency signal corresponding to the control signal for a specified time under the control of the modulator 182.

Here, one or more, preferably, two or more of sound output units 160 may be provided. For example, when two sound output units are provided, one of the two sound output units may output a sound including product information and the other may output an alarm sound or an effect sound corresponding to state information of the refrigerator 1 and may also output an indication sound before smart diagnostic mode is entered or before the sound is outputted.

The sound output unit 150 is deactivated after completely outputting the control signal as the certain sound in accordance with the output of the modulator 182. When the selector 145 is manipulated again, the sound output unit 150 is reactivated to output the certain sound including product information through the above-described process.

While a sound output unit 150 such as a speaker or a buzzer may be used as the sound output unit 150, a speaker having a wide reproduction frequency range is desirable in order to use a plurality of frequency bands.

When smart diagnostic mode is entered, the sound output unit 150 outputs a startup sound indicating the start of smart diagnostic mode according to a control command from the main controller 161 and also outputs respective certain indication sounds at the start and end of outputting a sound including product information.

In response to a control command from the main controller 161, the display unit 141 displays, on a screen, information such as information received from the selector 145 and the manipulator 144, operating state information of the refrigerator 1, and information associated with completion of the operation of the refrigerator 1. When the refrigerator 1 operates abnormally, the display unit 141 also displays failure information about the malfunction on the screen.

The display unit 141 displays information indicating smart diagnostic mode when smart diagnostic mode has been started in response to a control command from the main controller 161. When the sound output unit 150 outputs a sound, the display unit 141 displays the progress of the sound output in the form of at least one of text, image, and numeral.

The refrigerator 1 may include an output unit such as an illuminating or flickering lamp, a vibrator, or the like, which will not be described herein, in addition to the sound output unit 150 and the display unit 141.

The refrigerator 1 with the above-described configuration outputs a certain sound and delivers product information thereof to the service center 200 in the following manner.

Hereinafter, an exemplary conversion of the product information into a sound signal by the modulator 182 of the refrigerator 1 will be described below.

FIG. 6 is a waveform diagram illustrating types of frequencies outputted from the sound output unit of the refrigerator of FIG. 3.

The modulator 182 controls the operation of the sound output unit 150 through modulation of a control signal based on a plurality of frequencies f1 to fN such that a sound having a combination of the plurality of frequencies is outputted, as shown in FIG. 6.

In this case, the number of symbols corresponding to one frequency signal is changed depending on the number of frequencies used, and the length of a sound output is changed accordingly. Here, a time taken for one frequency signal to be outputted is determined in consideration of a minimum time required for one frequency signal to be outputted as a sound through the sound output unit 150, a time taken for one frequency signal to be recognized as a sound by the portable terminal 81, and sampling in the portable terminal 81.

Owing to the use of the plurality of frequencies, the modulator 182 includes frequency oscillators of a number corresponding to the number of the frequencies used, and controls the sound output unit 150 to output specified frequency signals corresponding to the control signal.

Here, the plurality of frequencies used are selected such that they have a frequency separation of a certain band or more therebetween to prevent inter-frequency interference. Also, the plurality of frequencies used are selected such that a bandwidth BW thereof is within the range of a reproducible frequency band of the sound output unit 150.

FIG. 7 is a waveform diagram illustrating an example of conversion of data into signals of a plurality of frequencies in a refrigerator 1 of the present invention Referring to FIG. 7, when four frequencies are used in the modulator 182, a corresponding frequency signal is outputted per 2 bits of a control signal.

The modulator 182 outputs, through the sound output unit 150, a first frequency f11 201 when the control signal is '00', a second frequency f12 202 when '01', a third frequency f13 203 when '10', and a fourth frequency f14 204 when '11'.

In this case, the modulator 182 includes frequency oscillators for generating the first to fourth frequencies, respectively, and generates a synchronous signal to each frequency oscillator, so that a corresponding frequency signal is outputted per 2 bits of a control signal from the control unit 160 to the sound output unit 150.

Figure 8:
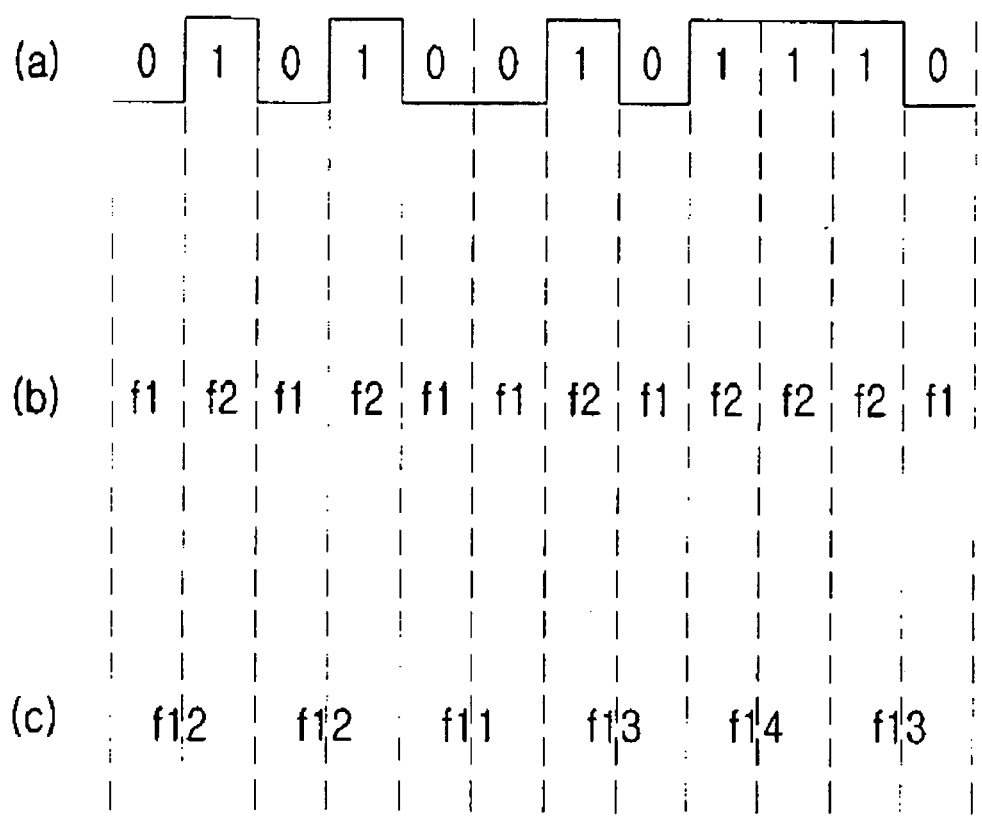
FIG. 8 is a diagram illustrating an exemplary signal conversion using the frequency of FIGS. 6 and 7.

FIG. 8(*a*) shows an example of the control signal, FIG. 8(*b*) shows an example of signal conversion in use of two frequencies, and FIG. 8(*c*) shows an example of signal conversion in use of four frequencies.

In the case where the control signal is '010100101110' as shown in FIG. 8(*a*) and two frequencies are used, the modulator 182 outputs a first frequency f1 for 0 of the control signal and a second frequency f2 for 1 of the control signal. As a result, a frequency signal combination as shown in FIG. 8(*b*) is outputted as a sound through the sound output unit 150.

In the case where the first to fourth frequencies f11 to f14 are used as stated above with reference to FIG. 7, two symbols of the control signal are converted into one frequency signal and the converted frequency signal is outputted as a sound. Accordingly, the modulator 182 outputs, through the sound output unit 150, the first frequency f11 for 00 of the control signal, the second frequency f12 for 01, the third frequency f13 for 10, and the fourth frequency f14 for 11. Consequently, the respective frequencies f12, f12, f11, f13, f14 and f13 corresponding to the control signal of FIG. 8(*a*) are outputted through the sound output unit 150, as shown in FIG. 8(*c*).

The length of an actually output sound varies depending on the number of frequencies used. That is, one symbol, one bit, corresponds to one frequency signal in FIG. 8(*b*), whereas two symbols, two bits, correspond to one frequency signal in FIG. 8(*c*).

That is, in the case of FIG. 8(*b*) using the two frequencies, a total of 12 frequency signals each having a certain length, corresponding to a control signal including 12 symbols, are outputted as a sound, and, in the case of FIG. 8(*c*) using the four frequencies, a total of 6 frequency signals each having a certain length, corresponding to the control signal, are outputted as the sound.

Figure 9:
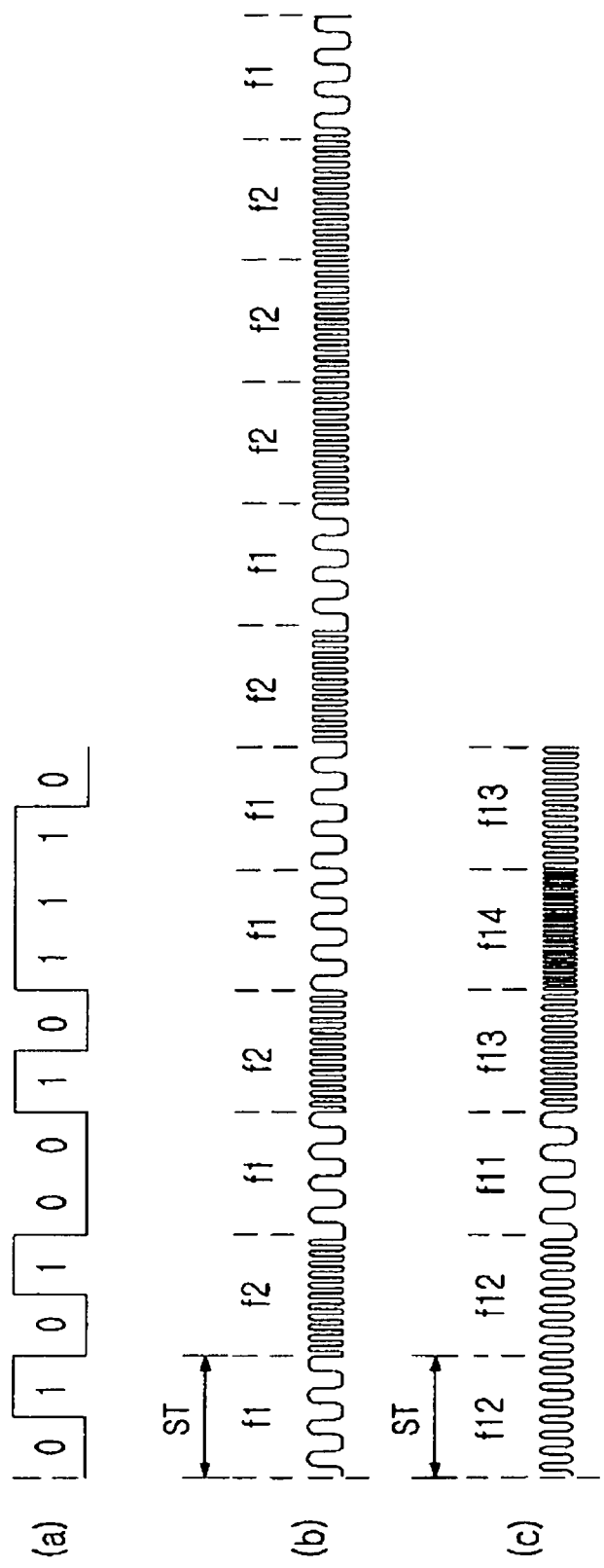
FIG. 9 shows waveforms of the frequency signals of FIG. 8.

In the case where the sound corresponding to the control signal is outputted using the plurality of frequencies as shown in FIG. 8, it is outputted through the sound output unit 150 as shown in FIG. 9. FIG. 9 shows waveforms of the frequency signals of FIG. 8.

Referring to FIG. 9, because one frequency signal is outputted per 2 symbols (2 bits) of a control signal when four frequencies are used, the control signal of FIG. 9(*a*) is modulated into a frequency signal combination as shown in FIG. 9(*c*), which is then output as a sound through the sound output unit 150.

When the sound is provided with six frequency signals by employing four frequencies with respect to the same control signal as shown in FIG. 9(*c*), it has a shorter length than that when provided with twelve frequency signals by employing two frequencies with respect to the same control signal as shown in FIG. 9(*b*). Because a time taken for one frequency signal to be outputted is constant, the length of the sound outputted from the sound output unit 150 in the case of FIG. 9(*b*) is increased to twice that in the case of FIG. 9(*c*), and the output time thereof is thus increased to twice that in the case of FIG. 9(*c*).

That is, because each frequency signal is outputted through the sound output unit 150 for a specified output time ST, the length of the sound when four frequencies are used is reduced to ½ that when two frequencies are used.

Here, an output time ST taken for one frequency signal to be outputted is set in consideration of at least one of a minimum time required for one frequency signal to be outputted as a sound through the sound output unit 150, a time taken for one frequency signal to be input, recognized and output as a sound by the portable terminal 81 for transmission through the portable terminal 81, a sampling time in the portable terminal 81, a noise recognition time in the portable terminal 81, and a transmission rate in transmission over the communication network.

Preferably, the output time ST may be set to a certain value or more such that the diagnostic server of the service center can accurately perform data conversion in a process of recognizing and analyzing a sound.

That is, when the output time ST of one frequency signal is short, the frequency signal may not be outputted as a sound through the sound output unit 150, may not be recognized as a sound by the portable terminal 81 or may be distorted when sampled by the portable terminal 81, so as not to be recognized by the diagnostic server. Also, the frequency signal may be recognized by the portable terminal 81, not as a sound from the refrigerator 1, but as noise, or may be accompanied by an error or noise during transmission over the communication network. Also, when the output time ST of one frequency signal is long, the total length of a sound is increased. In this context, it is desirable to set the output time ST in consideration of all the above conditions.

For these reasons, it is desirable that the output time of one frequency signal be set within the range of about 3 ms to about 30 ms. It is desirable that the number of pulses included in one frequency signal be set to 8 or more. FIG. 9 schematically illustrates a comparison between output sounds based on the number of frequencies.

Figure 10:
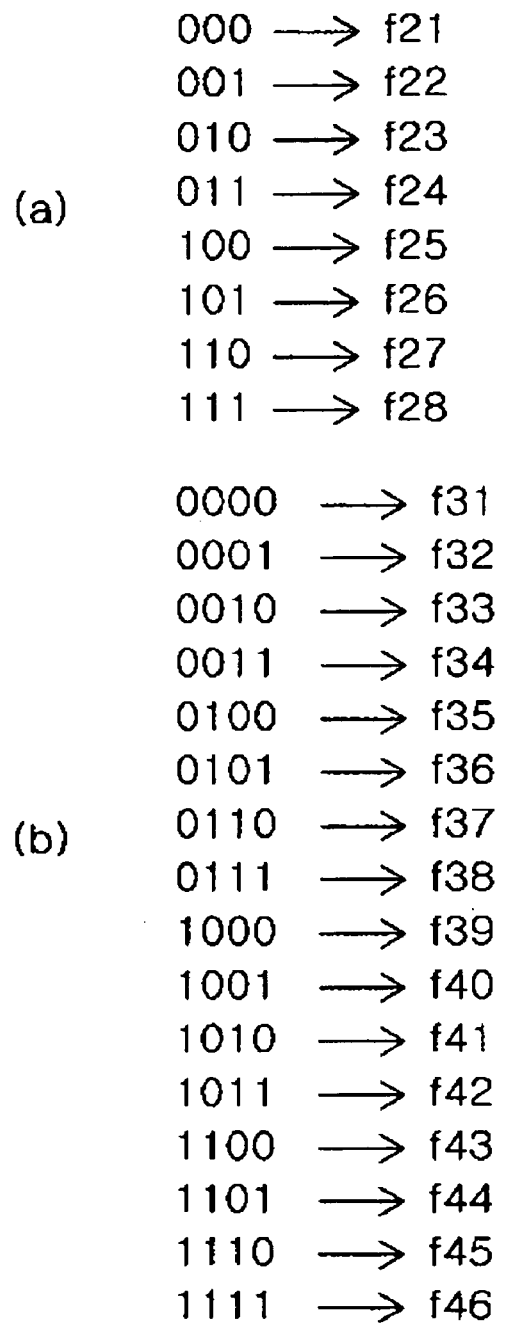

FIG. 10 illustrates another example of signal conversion using a plurality of frequencies.

Referring to FIG. 10, 8 or more frequencies may be used to output a sound. For example, in order to output a sound including product information, the modulator 182 may use 8 frequencies as shown in FIG. 10(*a*) or 16 frequencies as shown in FIG. 10(*b*).

When 8 frequencies are used as shown in FIG. 10(*a*), one frequency signal corresponding to three symbols (3 bits) of a control signal is outputted.

As a result, the modulator 182 applies a corresponding frequency signal per three symbols (3 bits) of the control signal to the sound output unit 150 such that the frequency signal is outputted as a sound for a specified time.

For example, the modulator 182 may output a frequency 21 f21 for 000 of the control signal, a frequency 22 f22 for 001, a frequency 23 f23 for 010, a frequency 24 f24 for 011, a frequency 25 f25 for 100, a frequency 26 f26 for 101, a frequency 27 f27 for 110, and a frequency 28 f28 for 111.

The modulator 182 outputs a specified frequency signal, corresponding to the control signal as stated above, through the sound output unit 150 for a specified output time ST.

For example, in the case where a control signal including 120 symbols is modulated into a sound using eight frequencies, one frequency signal is outputted per 3 symbols and a total of 40 frequency signals corresponding to the control signal are thus output as the sound.

When an output time ST taken for one frequency signal to be outputted is about 12 ms, the total sound output time is about 480 ms because 40 frequency signals are generated for 120 symbols. In the case of a control signal including 240 symbols, the total sound output time is about 960 ms.

When 16 frequencies are used as shown in FIG. 10(*b*), one frequency signal corresponding to four symbols is outputted as a sound.

For example, a frequency 31 f31 corresponding to 0000 of the control signal, a frequency 32 f32 corresponding to 0001, a frequency 33 f33 corresponding to 0010, a frequency 34 f34 corresponding to 0011, a frequency 35 f35 corresponding to 0100, a frequency 36 f36 corresponding to 0101, a frequency 37 f37 corresponding to 0110, and a frequency 38 f38 corresponding to 0111 may be each output through the sound output unit 150 for a specified output time ST.

Also, a frequency 39 f39 corresponding to 1000 of the control signal, a frequency 40 f40 corresponding to 1001, a frequency 41 f41 corresponding to 1010, a frequency 42 f42 corresponding to 1011, a frequency 43 f43 corresponding to 1100, a frequency 44 f44 corresponding to 1101, a frequency 45 f45 corresponding to 1110, and a frequency 46 f46 corresponding to 1111 may be each output through the sound output unit 150 for the specified output time ST.

In this case, when the control signal consists of 120 symbols, 4 symbols are converted into one frequency signal and a total of 30 frequency signals corresponding to the control signal are thus output as a sound. As a result, when an output time ST taken for one frequency signal to be outputted is about 12 ms, the total sound output time of the control signal of 120 symbols is about 360 ms. In the case of a control signal including 240 symbols, the total sound output time is about 720 ms.

Figure 11:
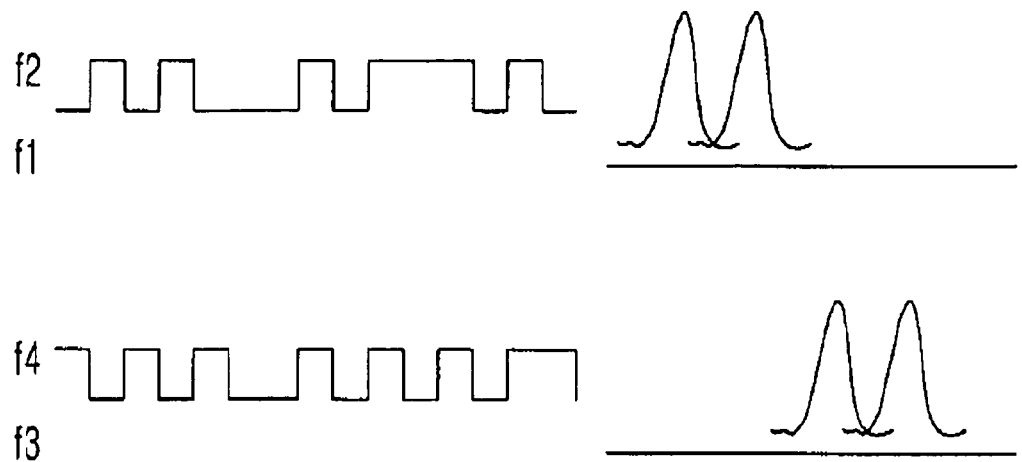
FIG. 11 is a diagram illustrating another exemplary frequency conversion according to data in a refrigerator according to an embodiment of the present invention.
Figure 12:
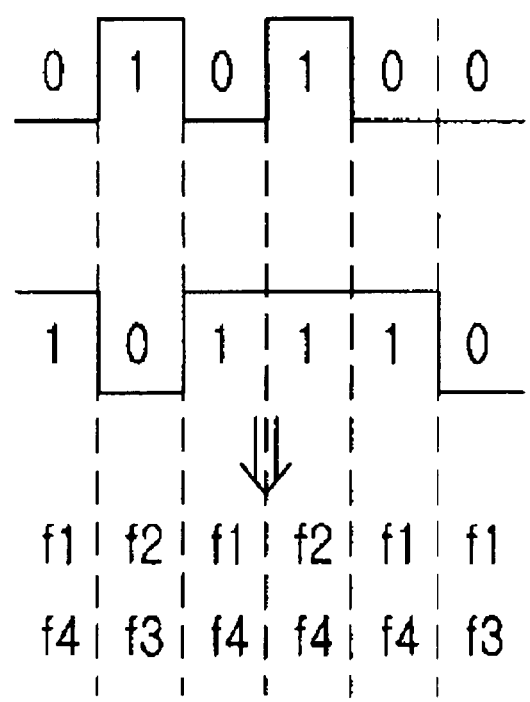
FIG. 12 is a diagram illustrating an exemplary signal conversion according to the frequency conversion of FIG. 11.

FIG. 11 is a waveform diagram illustrating another example of data to frequency conversion in the refrigerator 1 of the present invention, and FIG. 12 is a waveform diagram illustrating an example of a signal conversion based on the frequency conversion of FIG. 11.

Referring to FIG. 11, when the modulator controls the sound output unit to output a sound, it uses four frequencies and outputs one or more thereof simultaneously.

For example, in the case of a control signal including 2 symbols (2 bits), a frequency 1 f1 and a frequency 2 f2 are used for the first symbol such that the frequency 1 f1 is outputted for 0 and the frequency 2 f2 is outputted for 1, and a frequency 3 f3 and a frequency 4 f4 are used for the second symbol such that the frequency 3 f3 is outputted for 0 and the frequency 4 f4 is outputted for 1. Preferably, the frequencies 1 and 2 and the frequencies 3 and 4 may belong to such bands that they can be readily identified even though output simultaneously.

As shown in FIG. 12, in the case where the control signal is 011001110100, the frequency 1 f1 and the frequency 4 f4 are outputted for 01 on a 2-symbol basis because the first symbol is 0 and the second symbol is 1. Therefore, the frequencies 1 and 4 are outputted at the same time.

That is, when 011001110100 are divided 2 bits by 2 bits and each of 01, 10, 01, 11, 01 and 00 is expressed by the frequencies 1 and 2 and the frequencies 3 and 4, frequency signals can be outputted as shown in FIG. 12.

Figure 13:
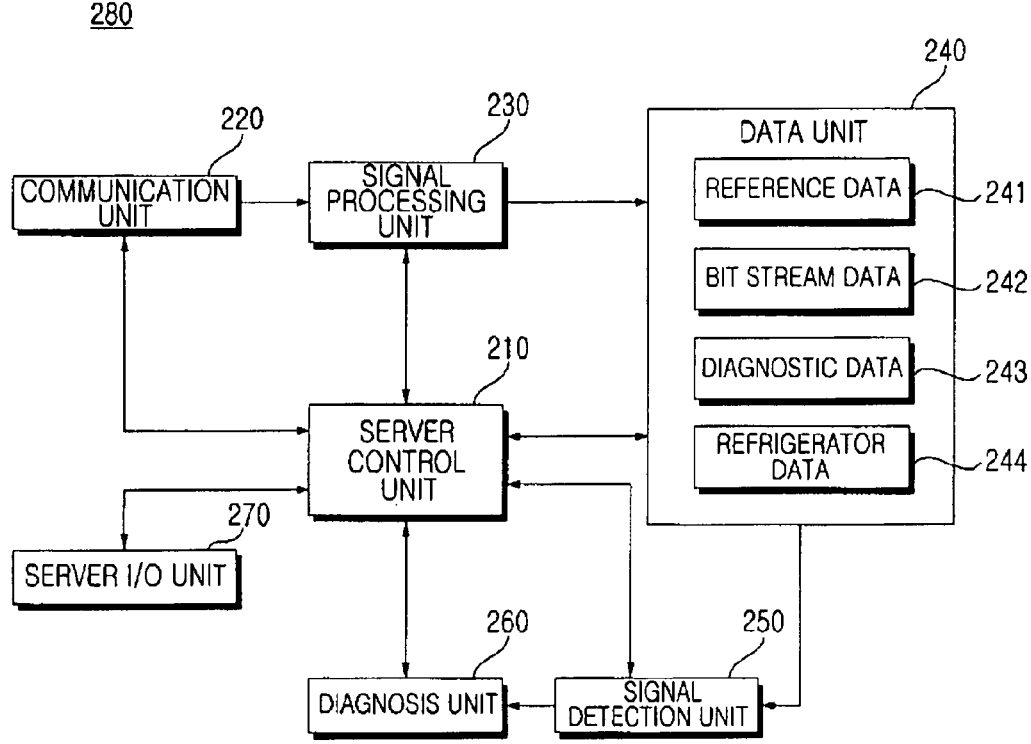
FIG. 13 is a block diagram illustrating the configuration of a diagnostic server of a service center.

FIG. 13 is a block diagram illustrating the configuration of a diagnostic server of a service center.

The refrigerator 1 as configured above outputs a certain signal sound to deliver its product information to the service center 200 as described below.

When the product information of the refrigerator 1 is outputted as a signal sound to be transmitted to the service center 200 through, for example, a telephone network, the product information is inputted to the diagnostic server 280 provided in the service center 200 to perform diagnosis on the refrigerator 1.

The diagnostic server 280 may include a communication unit 220, a signal processing unit 230, a data unit 240, a server I/O unit 270, a signal detection unit 250, a diagnosis unit 260, and a server control unit 210 controlling the overall operations of the diagnostic server 280.

The server I/O unit 270 includes input means such as buttons, keys, touchpads, and switches that are operated by a user, and includes a display means for displaying the operation information and diagnosis result of the diagnostic server. Also, the server I/O unit 270 includes an external input device and a connection interface for a portable memory unit.

When the input means is manipulated, the server I/O unit 270 may apply a signal to the server control unit 210, so that the diagnostic server may receive a signal sound of the refrigerator 1 from a telephone or portable terminal of a user that is connected through a telephone network.

The communication unit 220 transmits and receives data in connection with a computer network of the service center, and may be connected to an external network such as Internet for communication. Particularly, the communication unit 220 receives signal sound data through the telephone network, upon input of a recording command or receiving command through the input means, according to the control command of the server control unit 210

The data unit 240 stores bit stream data 242 including control data for the operation of the diagnostic server and signal sound data received from the refrigerator, reference data 241 for detecting the product information of the refrigerator from the signal sound data, and diagnosis data 243 for diagnosing the occurrence and cause of a failure. Also, the data unit 240 stores refrigerator data 244 including the product information of the refrigerator 1 that is detected from the bit stream data 242.

Here, the reference data 241, the bit stream data 242, the diagnosis data 243, and the refrigerator data 244 of the data unit 240 are inputted, managed, and updated by the server control unit 210.

The signal processing unit 230 converts analog signal sound data to store the bit stream data 242. In this case, the signal conversion in the signal processing unit 230 is an inverse conversion with respect to the signal conversion in the refrigerator 1. The refrigerator 1 and the diagnostic server 280 may convert data through the same signal conversion system by a mutual agreement therebetween. The signal processing unit 230 may convert a signal sound that is an analog signal of a certain frequency band into a digital signal through the inverse conversion using one of frequency-shift keying (FSK), amplitude-shift keying (ASK), and phase-shift keying (PSK).

The signal detection unit 250 first detects a preamble informing the start of data from the bit stream converted by the signal processing unit 230. Then, the signal detection unit 250 detects data including the product information based on a detected preamble, and stores the detected data in the data unit 240 as the refrigerator data 244.

The signal detection unit 250 detects the preamble and the data based on the size of the preamble included in the reference data 241 and the size of the data, and stores the detected preamble and data in the data unit 240 as the refrigerator data 244.

The diagnosis unit 260 analyzes the data detected by the signal detection unit 250, and determines the state of the refrigerator 1 and the occurrence of a failure of the refrigerator 1. Then, the diagnosis unit 260 analyzes the cause of the failure to output a diagnosis result.

As an amount of product information is included in the signal sound outputted from the refrigerator 1, the diagnosis unit 260 analyzes each data item including in the product information, and diagnose the refrigerator 1 according to a correlation between the data items. In this case, the diagnosis unit 260 performs the diagnosis using a diagnosis algorithm included in the diagnosis data 243 and reference values according to the diagnosis.

The server control unit 210 controls the transmission and reception of data through the communication unit 220 and the flow of data through the server I/O unit 270. The signal sound including the product information of the refrigerator 1 is converted by the signal processing unit 230. The operation of the signal detection unit 250 is controlled to detect data.

Also, the server control unit 210 applies a control command to each unit such that the diagnosis unit 260 performs a failure diagnosis on the refrigerator 1, using the detected data.

Figure 14:
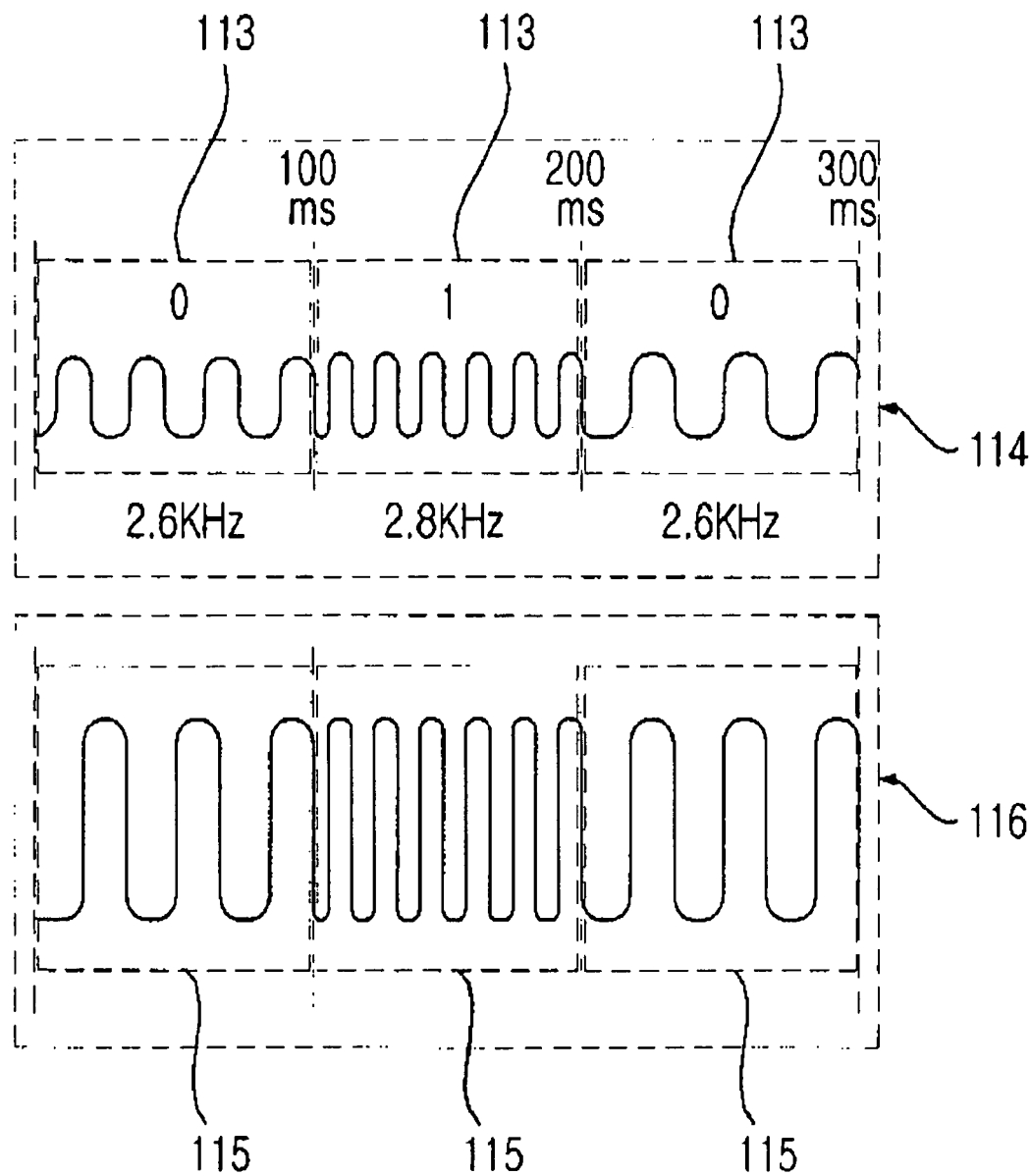
FIG. 14 is a graph illustrating an example of repeatedly outputting a signal sound including product information by varying the amplitude characteristics of a refrigerator according to an embodiment of the present invention.

FIG. 14 is a graph illustrating an example of repeatedly outputting a signal sound including product information by varying the amplitude characteristics of a refrigerator according to an embodiment of the present invention.

When a user inputs a control command for the failure diagnosis through the selector 145, the control unit 160 controls the product information to be converted into a first sound signal 114 having predetermined frequency and amplitude signal characteristics.

The first sound signal 114 includes a plurality of unit signals 113. The plurality of unit signals 113 include first and second frequency signals that are included in the predetermined frequency band. The first and second frequency signals have different frequencies. Hereinafter, it will be assumed that the first sound signal 114 has a frequency band of about 2 kHz to about 3 kHz. Also, the first frequency signal is assumed to be a frequency signal of about 2.6 kHz, and the second frequency signal is assumed to be a frequency signal of about 2.8 kHz.

The product information includes digital data having a logic data combination of 0 or 1. That is, the product information is stored as digital data in the storage unit 174 provided in the refrigerator 1. The modulator 182 converts the digital data into an electrical signal having a certain frequency.

When the modulator 182 converts the digital data including the product information into a sound signal that is an analog signal, the modulator 182 converts data '0' into a first frequency signal, and converts data '1' into a second frequency signal. In this case, the control unit 160 retrieves data stored in the storage means. When data '0' is retrieved, the control unit 160 controls the modulator 182 to generate the first frequency signal having a frequency of about 2.6 kHz for a predetermined time t. When data '1' is retrieved, the control unit 160 controls the modulator 182 to generate the second frequency signal having a frequency of about 2.8 kHz for the predetermined time t. The time t may be set to about 100 ms.

When a user sets the amplitude using an amplitude control unit (not shown) that controls the amplitude of a sound outputted from the sound output unit 150 by the user, the control unit 160 controls the modulator 182 to convert the product information into a sound signal having the set amplitude, and the sound output unit 150 outputs a sound according to the set amplitude. That is, when a signal interference occurs due to the characteristics of an ambient environment or communication network, a user increases the volume of the sound by increasing the amplitude of the sound using the amplitude control unit. On the other hand, when a user desires a silent environment, the user reduces the volume of the sound by reducing the amplitude of the sound using the amplitude control unit.

As described above, the adjustment of the amplitude of the sound outputted from the sound output unit 150 is for increasing the accuracy of the product information transmitted to the service center 200, by outputting the product information using different amplitudes when there is an error in the product information transmitted to the service center 200 through the communication network, that is, there is a signal interference caused by the communication network or the ambient environment.

In order to set the amplitude of the sound outputted from the sound output unit 150, the input unit 142 may include a separate amplitude control unit. However, as described above, when a smart diagnosis is executed using a lock button and a freezer compartment temperature setting button, and then the freezer compartment temperature setting button is again pushed to perform the smart diagnosis, it is possible to vary the amplitude of a signal outputted according to a predetermined amplitude characteristic.

In either case where the amplitude is set through a separate amplitude control unit provided in the input unit 142, or where a smart diagnosis performance command is inputted once again after the entrance into the smart diagnosis, when a signal sound having a different amplitude is outputted through the sound output unit 150, the control unit 160 controls the modulator 182 to convert the product information into a second sound signal 116. The second sound signal 116 includes at least one of a third frequency signal having a frequency equal to and an amplitude different from those of the first frequency signal, and a fourth frequency signal having a frequency equal to and an amplitude different from those of the second frequency signal. That is, the first sound 114 and the second sound 116 have a frequency equal to and an amplitude different from each other.

Figure 15:
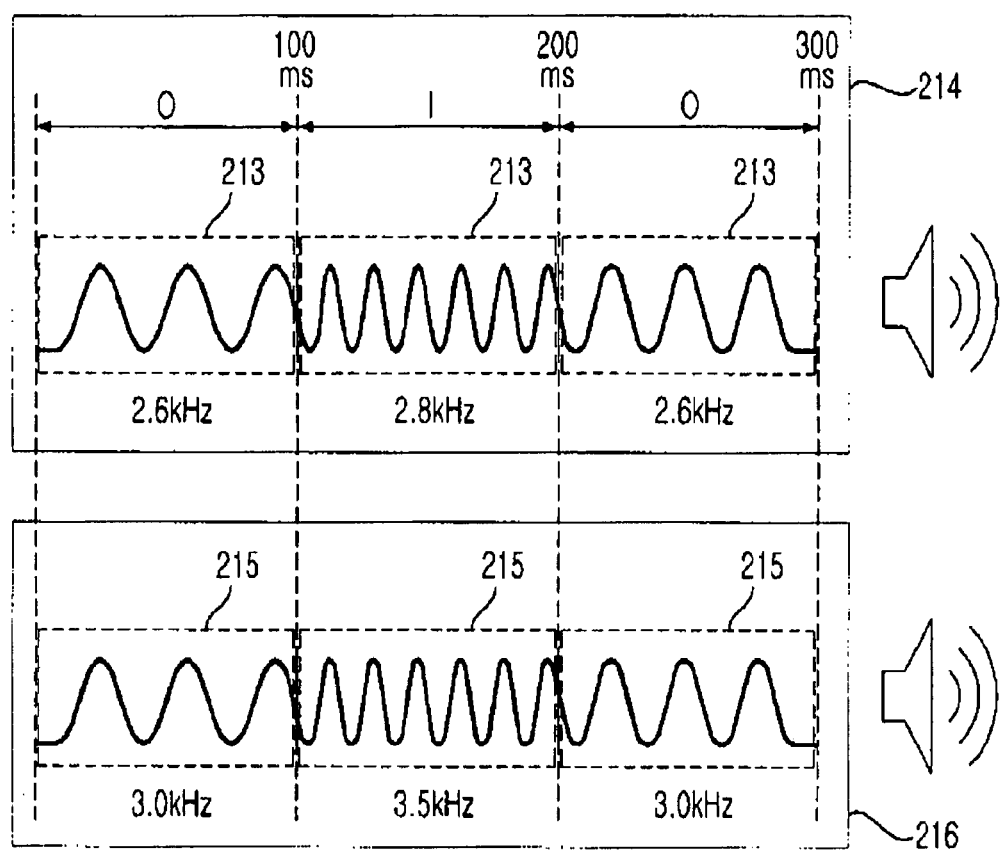
FIG. 15 is a graph illustrating an example of repeatedly outputting a signal sound including product information by varying the frequency characteristics of a refrigerator according to an embodiment of the present invention.

FIG. 15 is a graph illustrating an example of repeatedly outputting a signal sound including product information by varying the frequency characteristics of a refrigerator according to an embodiment of the present invention.

When a user inputs a control signal for failure diagnosis, the control unit 160 controls the modulator 182 to convert the product information into a first sound signal 214 that is a signal of a predetermined frequency band.

The first sound signal 214 includes a plurality of unit signals 213. The plurality of unit signals 213 include first and second frequency signals that are included in the predetermined frequency band. The first and second frequency signals have different frequencies. Hereinafter, the first sound signal 214 has a frequency band of about 2 kHz to about 3 kHz. The first frequency signal is a frequency signal of about 2.6 kHz, and the second frequency signal is a frequency signal of about 2.8 kHz.

The product information includes digital data having a logic data combination of 0 or 1. The product information may be stored as digital data in the storage unit 174 provided in the refrigerator 1. The modulator 182 converts the digital data into an electrical signal having a certain frequency.

When the modulator 182 converts the digital data including the product information into a sound signal that is an analog signal, the modulator 182 converts data '0' into a first frequency signal, and converts data '1' into a second frequency signal. In this case, the control unit 160 retrieves data stored in the storage unit 174. When data '0' is retrieved, the control unit 160 controls the modulator 182 to generate the first frequency signal having a frequency of about 2.6 kHz for a predetermined time t. When data '1' is retrieved, the control unit 160 controls the modulator 182 to generate the second frequency signal having a frequency of about 2.8 kHz for the predetermined time t. The time t may be set to about 100 ms.

In order to more exactly deliver the product information, the refrigerator 1 outputs sounds having the product information and different vibration characteristics multiple times. That is, the modulator 182 converts the product information into a plurality of sound signals having different frequency bands. The sound output unit 150 continuously outputs a plurality of sounds having different vibration characteristics corresponding to the plurality of sound signals. Hereinafter, it will be assumed that a first sound is outputted and then a second sound is outputted.

The modulator 182 converts the product information into the first sound signal 214, and then again converts the product information into the second sound signal 216. The second sound signal 216 differs from the first sound signal 214 in the frequency band. In this case, the second sound signal 216 includes a plurality of second unit signals 215, each of which is a third frequency signal included in the frequency band of the second sound signal 216, or a fourth frequency signal having a frequency different from that of the third frequency signal. Hereinafter, it will be assumed that the second sound signal 216 has a frequency band of about 3 kHz to about 4 kHz. Also, the third frequency signal is assumed to be a frequency signal of about 3.0 kHz, and the fourth frequency signal is assumed to be a frequency signal of about 3.5 kHz.

As described above, since the modulator 182 converts the product information into the first sound signal 214 and the second sound signal 216 having different frequency bands, the sound output unit 150 outputs a first sound corresponding to the first sound signal 214, and then again outputs a second sound corresponding to the second sound signal 216. In this case, the first sound and the second sound include the same product information, respectively.

Accordingly, even when a signal interference occurs due to the ambient environment of the refrigerator 1, since the refrigerator 1 continuously outputs sounds having different vibration characteristics and the same product information, the product information can be more exactly transmitted.

The control unit 160 may control the sound output unit 150 to continuously output sounds having different frequency chacteristics. Similarly to those described with reference FIG. 14, when the smart diagnosis is executed one time, and then a user inputs a product information output command, the control unit 160 may also control sounds having different frequency characteristics to be re-outputted.

Figure 16:
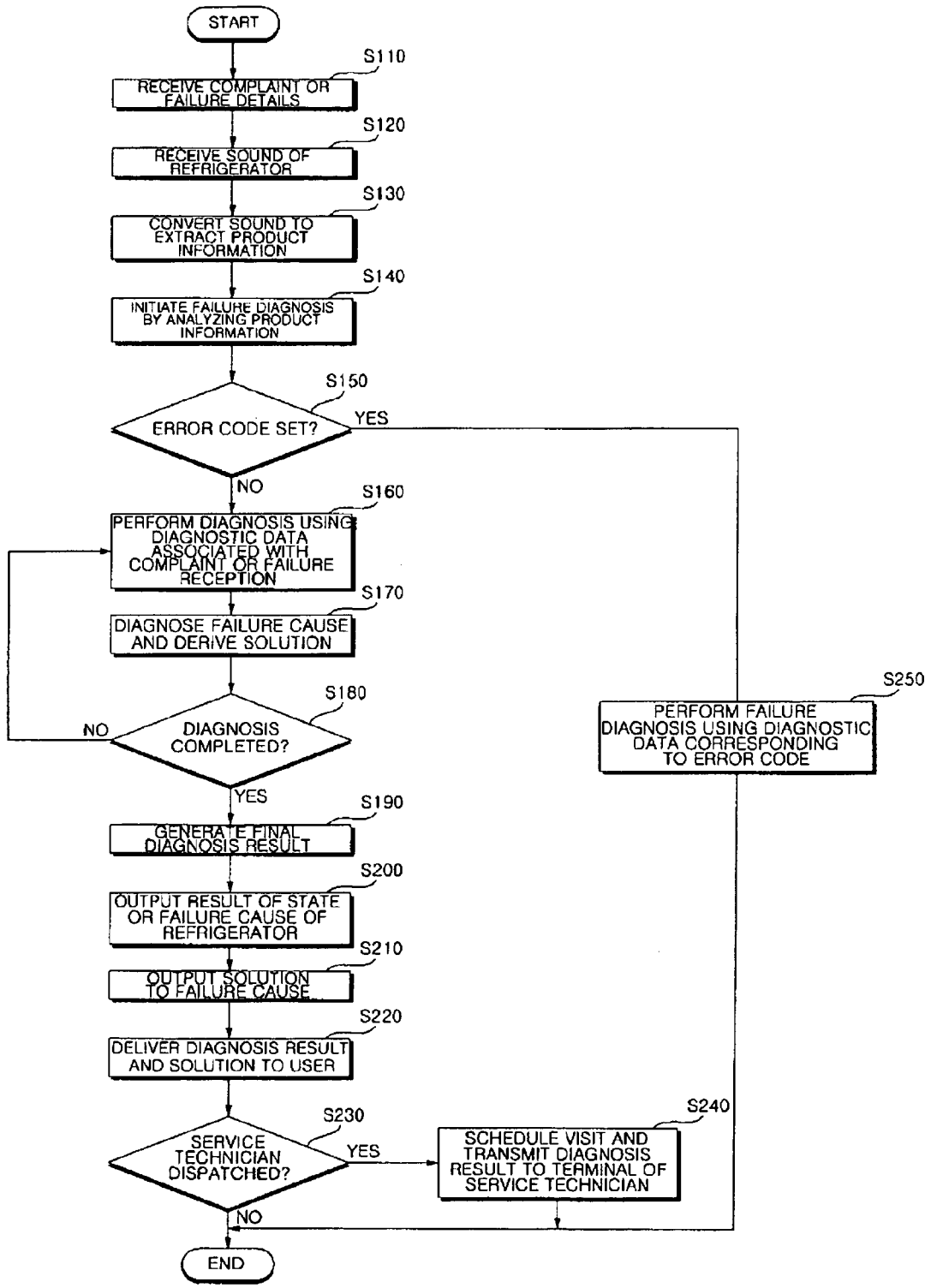
FIG. 16 is a flowchart illustrating a diagnosis method of a refrigerator diagnosis system according to an embodiment.

FIG. 16 is a flowchart illustrating a diagnosis method of a refrigerator diagnosis system according to an embodiment. Referring to FIG. 16, when the refrigerator 1 outputs product information as a certain sound signal, the sound signal is transmitted to the service center 200 over a communication network through which the user is connected to the service center 200.

The service center 200 receives complaints or failure details from a user (S110), and then the diagnostic server 280 of the service center 200 performs a failure diagnosis. The diagnostic server 280 of the service center 200 receives the sound signal outputted from the refrigerator 1 (S120), and converts the sound signal according to a certain scheme to extract the product information (S130). Then, the diagnostic server diagnoses the state, failure, and failure cause of the refrigerator 1 using a plurality of data included in the product information and starts the failure diagnosis to obtain a measure against the failure (S140).

The diagnosis unit 260 of the diagnostic server 280 then obtains version information of the refrigerator diagnostic system and model information of the refrigerator 1 through the plurality of data included in the product information and analyzes diagnosis data included in the product information to perform the failure diagnosis on the refrigerator 1.

The diagnosis unit 260 first analyzes state information or an error code included in the diagnosis data included in the product information and compares data associated with the state information or error code with failure diagnosis data 243 or reference data 241 to perform the failure diagnosis. Basically, the diagnosis unit 260 can use all diagnosis data included in the product information. However, the diagnosis unit 260 can use state information or an error code included in the diagnosis data to analyze data associated with the state information or error code, thereby checking the state of the refrigerator 1 and performing failure diagnosis more quickly. Here, the diagnosis unit 260 classifies diagnosis data included in the product information according to a certain criterion, i.e., according to the state information or error code, to find and diagnose a failure that is the most likely cause of malfunction of the refrigerator 1.

The diagnosis unit 260 checks whether error codes are set in the plurality of diagnosis data included in the product information (S150). When the error codes are set, the diagnosis unit 260 diagnoses a failure using the diagnosis data corresponding to the respective error codes (S250).

On the other hand, when the error codes are not set, i.e., an error code value is zero, the diagnosis unit 260 does not determines that there is an error in the refrigerator 1, but performs failure diagnosis using diagnosis data and state information included in the product information other than the error codes, as long as a user considers the refrigerator 1 is out of order, with respect to the complaints of the user (S160). In this case, when an error occurs but any error code is not generated in the refrigerator 1, or when an error that has not been registered occurs, the failure diagnosis as described above may also be performed.

When an error code is not set, as long as an error code is not generated or a failure diagnosis is needed with respect to the complaints of a user, a system associated with the failure reception may be checked, and diagnosis data associated therewith may be extracted to perform failure diagnosis on the refrigerator 1.

When failure diagnosis can not be performed using associated diagnosis data, the cause of the failure may be analyzed using all diagnosis data. When the cause of the failure can not be found using the diagnosis data, a service technician may be dispatched to solve the problem.

The diagnosis unit 260 diagnoses the failure causes, and derives a measure, i.e., a solution against the failure (S170). When the failure cause and solution are derived from the failure diagnosis, the diagnosis unit 260 stores the failure cause and solution as a diagnosis result (S180).

In this case, since there may be a plurality of failures, the diagnosis unit 270 may perform additional diagnosis using other related diagnosis data (S160 through S180).

When the diagnosis is completed, the diagnosis unit 260 applies the diagnosis result to the server control unit 210. The server control unit 210 generates a final diagnosis result using the diagnosis result applied from the diagnosis unit 260 (S200). Upon occurrence of one or more failures, since there are various causes and solutions to the failures, the server control unit 210 generalizes at least one diagnosis result applied from the diagnosis unit 260 to generate the final diagnosis result.

The server control unit 210 first outputs the state of the refrigerator or the result about occurrence of failures and failure causes of the refrigerator 1 through the server I/O unit 270 (S200). In this case, when there are one or more failure causes, the result may be displayed in a list. If any item of the result of the failure causes is selected, a solution thereto is outputted (S210). The server I/O unit 270 may include a server input unit and a server output unit. When there is a startup signal of a specific pattern in a signal sound transmitted through the communication network, a server-side consultant detects the startup signal to input a command through the server input unit. The command allows the signal sound to begin to enter the communication unit 220. The server output unit outputs the diagnosis result. The server output unit may simultaneously display the cause of the failure and the result of the diagnosis on one screen. The display pattern may be changed. An exemplary screen configuration of the server output unit will be described later with reference to FIG. 17.

The server control unit 210 may transmit the diagnosis result via an email or message using a registered email address or telephone number of the user (S220).

Here, a consultant of the service center 200 may check the diagnosis result displayed on the screen. When the consultant of the service center 200 selects one of items, a solution thereto may be displayed on the screen. The consultant of the server center 200 may also provide voice guidance on the displayed cause and solution to a user connected through a telephone. Also, the consultant of the service center 200 may also perform a procedure for scheduling an appointment for a service technician to visit the user's home according to the cause and solution. According to embodiments, the diagnosis result may be transmitted to the user via an E-mail or message.

When the solution includes dispatching of a service technician, the server control unit 210 may transmit the diagnosis result to the terminal of the service technician (S230 and S240).

On the other hand, a user may perform failure diagnosis using a separate diagnostic terminal having a failure diagnosis function. The diagnostic terminal may perform the failure diagnosis using a certain sound outputted from the refrigerator 1.

The diagnostic terminal may perform the failure diagnosis by analyzing a sound outputted from the refrigerator 1 using a database and a failure diagnosis program like the diagnostic server. The diagnostic terminal may use diagnosis data like the diagnostic server, and may output a diagnosis result. The diagnostic terminal may directly solve the failure cause according to the failure diagnosis result that is outputted, or may ask the server center 200 for dispatch of a service technician. In this case, a user may transmit the failure diagnosis result of the diagnostic terminal to the service center 200. Also, the service technician may directly use the diagnostic terminal.

Hereinafter, although it will be described as an example that the failure diagnosis is performed by the diagnostic server of the service center 200, but the failure diagnosis may also be performed by the diagnostic terminal.

Figure 17:
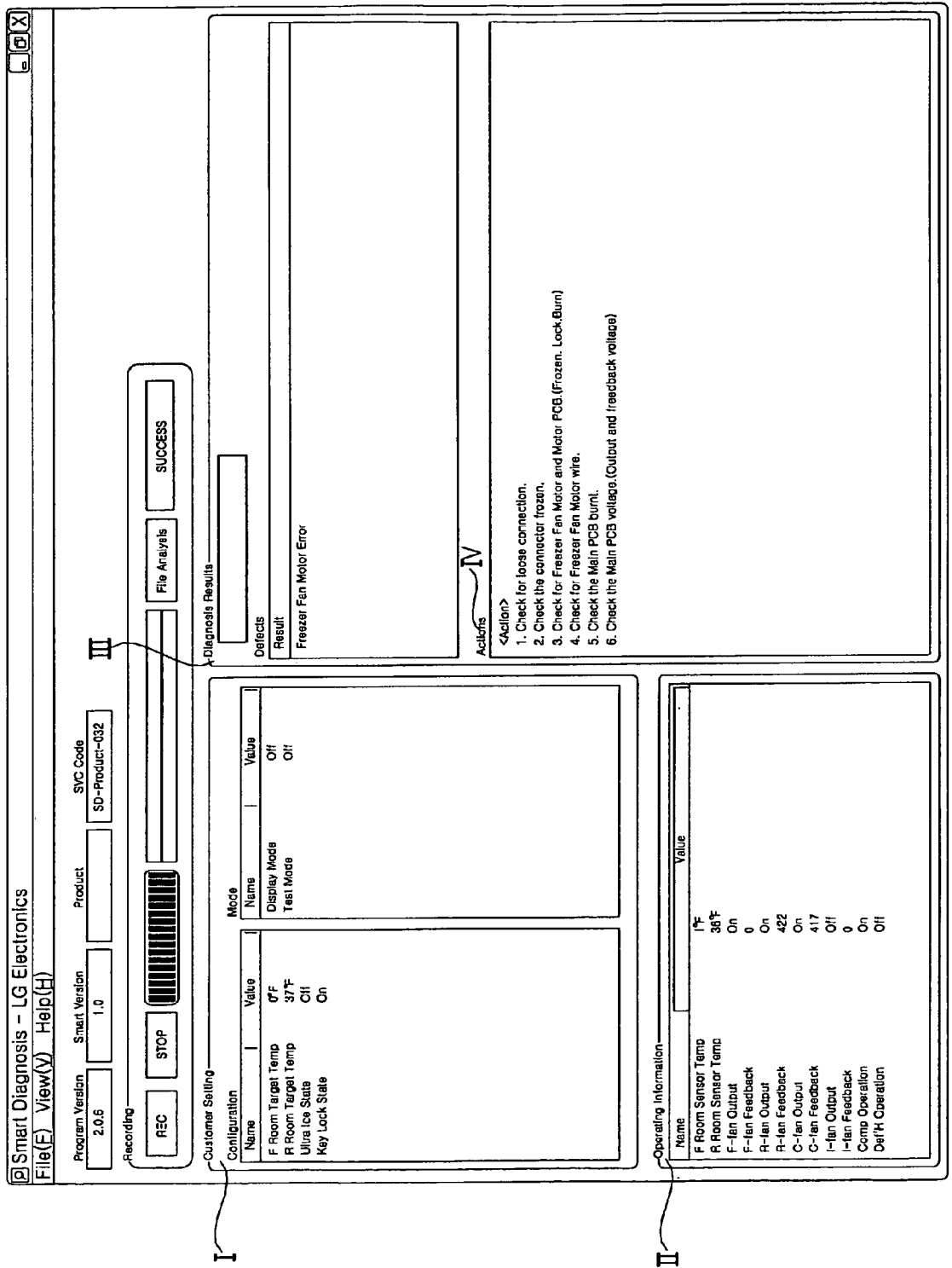
FIG. 17 is a diagram illustrating a screen of a server output unit of a service center outputting diagnosis information according to an embodiment of the present invention.

FIG. 17 is a diagram illustrating a screen of a server output unit of a service center outputting diagnosis information according to an embodiment of the present invention.

Various pieces of diagnosis information may be displayed on the screen of the server output unit such that a consultant of the service center can verify the diagnosis information. Specifically, the diagnosis information may include customer setting information I that is set by a user, operating information II of the refrigerator 1, diagnosis result III, and action information IV according to the diagnosis result.

Hereinafter, an exemplary process for performing failure diagnosis of the refrigerator 1 will be described in detail with reference to FIG. 17.

The customer setting information I includes configuration information including freezer compartment target temperature (F Room Target Temp), refrigeration compartment target temperature (R Room Target Temp), information on activation of the quick-freezing function (Ultra Ice State) and key-lock state of keys provided in the input unit 142, and mode information including a display mode showing whether the display mode is set for exhibition in a shop, and a test mode showing whether the test mode for a test in the release stage is set.

The operating information II includes sensing information (F Room Sensor Temp) of the freezer compartment temperature sensor 192, sensing information (R Room Sensor Temp) of the refrigeration compartment temperature sensor 191, operation setting information (F-fan Output) of a freezer compartment fan, response information (F-fan Feedback) of the freezer compartment fan, operation setting information (R-fan Output) of a refrigeration compartment fan, response information (R-fan Feedback) of the refrigeration compartment fan, operation setting information (C-fan output) of a condenser fan, response information (C-fan Feedback) of the condenser fan, operation setting information (I-fan Output) of an ice maker fan, response information (I-fan Feedback) of the ice maker fan, operation setting information (Comp Operation) of a compressor, and operation setting information (Def's Operation) of a defrost heater.

The diagnosis result III shows a failure diagnosis result of the refrigerator, based on the customer setting information I and/or operating information II. In FIG. 17, since the freezer compartment fan is set as operating (F-fan Output=On), but the response information of the freezer compartment fan is set to 0, the freezer compartment fan does not operate normally.

Accordingly, the diagnosis result III indicates that a freezer compartment fan motor does not operate normally (Freezer Fan Motor Error).

If the failure cause of the refrigerator 1 is diagnosed as the breakdown of the freezer compartment fan, the action information according to the diagnosis result shows further actions necessary for repair such as checking whether the connection of the freezer compartment fan motor is normal (Check for loose connection), checking whether a connector of the freezer compartment fan motor is frozen (Check the connector frozen), checking whether the motor is frozen (Frozen), whether the rotation of the motor is locked (Lock), or whether the motor is overheated (Burn) by verifying the freezer compartment fan motor and a PCB circuit-connected to the motor (Check for Freezer Fan Motor Wire), checking whether a main PCB constituting the control unit is overheated (Check for Main PCB burnt), and checking whether the voltage state of the main PCB is normal (Check the Main PCM Voltage) by measuring an output voltage (Output) and a response voltage (Feedback).

Accordingly, the consultant of the service center may instruct a user connected through a telephone or a service technician visiting the user of the further actions, or may transmit an E-mail or mobile phone message to the user and/or the service technician as described above.

Figures 18, 19:
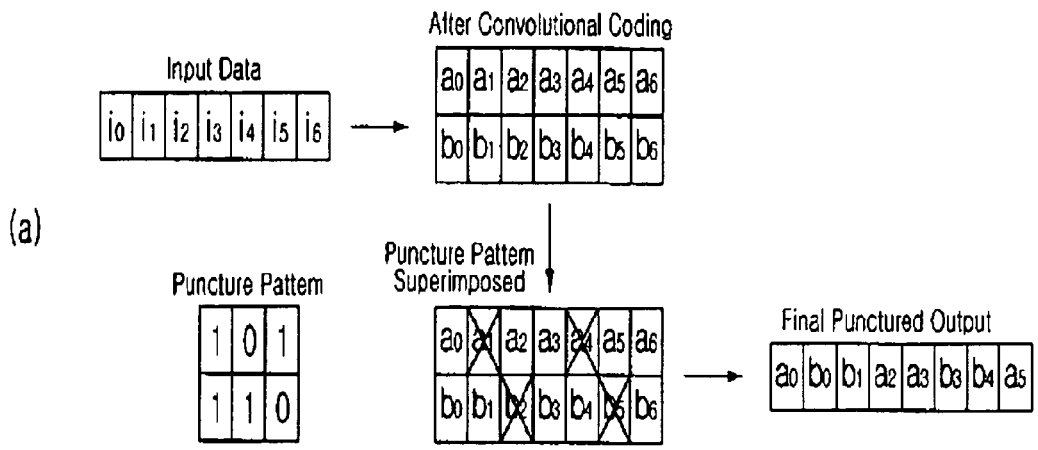
FIG. 18 is a diagram illustrating encoding of product information of a refrigerator according to an embodiment of the present invention.
FIG. 19 is a diagram illustrating encoding of product information of a refrigerator and the configuration of a control signal according thereto.

FIG. 18 is a diagram illustrating encoding of product information of a refrigerator according to an embodiment of the present invention.

Upon entrance into smart diagnostic mode, the control unit 160 fetches already-stored product information to encode it, and generates a control signal of a certain format.

The encoder 162 encodes the product information by applying an error coding method for recovering a bit error, in order to deal with a data loss that may occur in a course of transmitting the product information outputted as a sound through a communication network. For example, the encoder 162 may utilize a Forward Error Correction (FEC) encoding method.

In this case, the encoder 162 encodes the product information using a convolution code. Here, the diagnostic server of the service center performs decoding using a Viterbi decoding algorithm, corresponding to such an encoding method.

The encoder 162 performs encoding using a logic circuit consisting of a shift register and XOR gates, which is based on a ½ code rate outputting 2-bit in response to an input of 1-bit. Since the ½ code rate requires a lot of redundant bits, the number of redundant bits is reduced using a puncturing algorithm.

The puncturing algorithm is a method of deleting bits in a specific pattern from output values that are encoded using the ½ code rate. The deleting pattern is represented as a puncturing matrix. In the puncturing matrix, 1 indicates non-deleting, and 0 indicates deleting. When using the puncturing algorithm, since the amount of transmission data is reduced, a desired data rate can be satisfied. It is desirable to vary the puncturing matrix in consideration of the transmission rate.

For example, as described in FIG. 18A, if data i0, i1, i2, i3, i4, i5, and i6 are inputted in the convolution coding based on the ½ code rate, a0 through a6 and b0 through b6 are outputted. When the puncturing matrix (puncturing pattern) is applied to the coding value, a portion of 0 is deleted, and a portion of 1 remains according to the pattern of the puncturing matrix. Finally, a0, b0, b1, a2, a3, b3, b4, and a5 are outputted. FIG. 8 shows an example of a coding method, and the coding method of the present invention is not limited thereto.

The encoder 162 encodes the product information using the same method as described above.

Also, the encoder 172 performs a bit interleaving according to a burst error that may be generated during the data transmission. The bit interleaving is performed by reference bit unit on the overall data, for example, by 32-bit unit. That is, when there is data of about 60 bytes, the order thereof is mixed according to a certain rule by 4-byte unit.

For example, as described in FIG. 18, if data aaaabbbbc-cccddddeeeeffffgggg is bit-interleaved in the order of 0, 4, 8, 12, 16 and 20th data, and 1, 5, 9, 13, 17 and 21th data, the order of data is changed into abcdefgabcdefgabcdefgab-cdefg. Although a portion of bits is lost in the course of transmitting the interleaved data, the order of data may become aa_abbbbccccdddde_eef_ffg_gg due to de-interleaving. Accordingly, data may be recovered using ambient bits.

FIG. 19 is a diagram illustrating encoding of product information of a refrigerator and the configuration of a control signal according thereto.

As shown in FIG. 19A, the encoder 162 configures a packet with a plurality of frames.

The encoder 162 adds the product ID and version information to the product information that is diagnosis data. This is performed at an application layer.

In this case, the version information, which is a version of the smart diagnosis, relates to the smart diagnosis algorithm or the whole smart diagnosis system, and the version information of the smart diagnosis signifies protocol name information corresponding thereto. For example, as shown in FIG. 19B, when the version is expressed as 0x01, the protocol name signifies 'Smart Diagnosis for Refrigerator v1.0' The product ID is an identifier for identifying products, and the diagnosis data is product information for failure diagnosis of the refrigerator.

The version and the product ID are directly inputted into the control unit 160. On the other hand, the diagnosis data, i.e., the product information is stored in the memory 172 or the storage unit 174. Accordingly, if the smart diagnosis is executed, the control unit 160 loads data stored in the memory 172 and temporary data stored in the storage unit 174 as product information, that is, diagnosis data.

Figure 20:
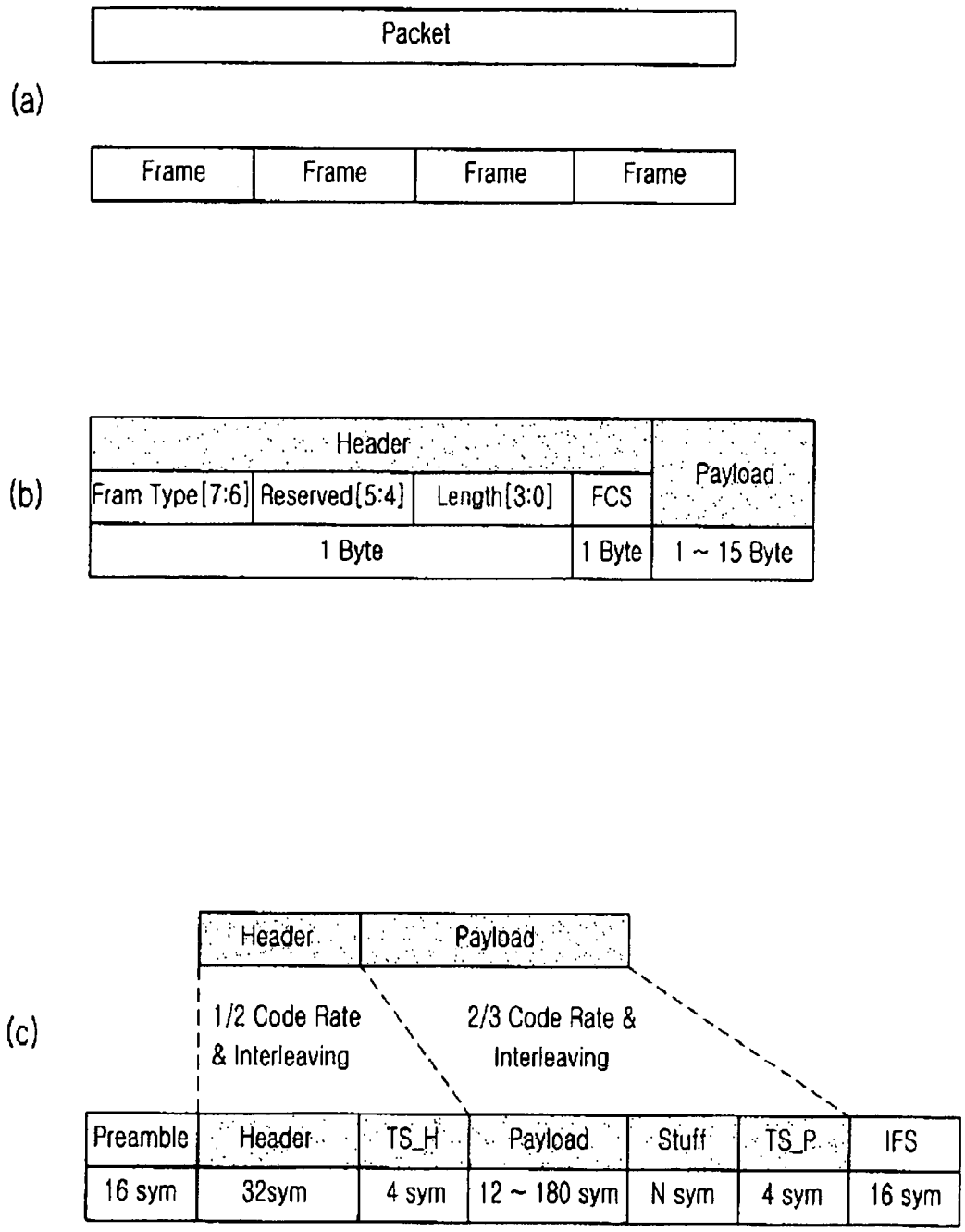
FIG. 20 is a diagram illustrating the configuration and encoding of a control signal.

FIG. 20 is a diagram illustrating the configuration and encoding of a control signal.

Referring to FIG. 20A, the encoder 162 partitions data including product ID and version information in addition to product information into certain units for framing. The encoder 162 utilizes Frame Check Sequence (FCS) to check an error by frame unit.

For example, when data of about 60 bytes is divided into 15-byte size, one frame includes about 15-byte data, and the packet includes about four frames. In this case, the number of frames may vary according to the division unit, and the number of frames constituting the packet may vary. The size of each frame may vary according to IFS, product information, and symbol time.

The encoder 162, as shown in FIG. 20B, configures the frame with a header and a payload.

The header of the frame includes frame type representing the format of the frame, reserved, length, and FCS. The payload is a field including data in which the product ID and the version information are added to the product information.

The size of the frame type, reserved, and length is 1-byte, and the size of FCS is 1-byte. Accordingly, the header is assigned with total 2-byte. The payload is assigned with about 1 to 15-byte. In this case, 2-bit, 2-bit, and 4-bit are assigned to the frame type, reserved, and length, respectively.

The frame type represents the format and order of the frame. The information of the frame type is stored in the sixth and seventh bits of the header other than FCS. For example, the frame type 00 indicates that the frame is a starting portion of the packet. The frame type 01 indicates that the frame is a middle portion of the packet. The frame type 11 indicates the frame is a final portion of the packet.

Accordingly, when the service cent 200 collects the plurality of frames, the service center 200 may distinguish the order of the frame using the frame type.

The length represents the length of the payload including in the frame by unit of byte. Since the size of the payload ranges from 1 byte to 15 bytes, the length field is represented as 3-bit, information of which is included in the 0, 1, and 2th bit of the header other than FCS.

For example, when the value of the length is 001, it means that the payload has a size of 1-byte. When the value of the length is 101, it means that the payload has a size of 5-byte.

FCS is for detecting an error of the frame. FCS may utilize Cyclic Redundancy Check (CRC)-8 to check whether there is an error in the frame.

Reserved may include contents necessary for design. Reserved is represented in 4 and 5th bit in the header other than FCS.

The payload is partitioned from the data shown in FIG. 9A. When a packet of about 60 bytes is partitioned into four frame of about 15 bytes, each frame includes a payload of about 15 bytes. A frame header is added to such a payload to form one frame.

The encoder 162 performs FEC encoding on the frame to restore a bit error as described in FIG. 8, and complies with convolution coding and puncturing method, and performs interleaving.

Since a sound outputted through the sound output unit 150 may be damaged by background noise or interference in the course of transmission through the communication network, the frame is encoded by the above method to be changed into a FEC code.

The encoder 162 encodes the header and the payload with different code rate, as shown in FIG. 20C. The encoder 162 codes the header of 2-byte based on the ½ cord rate, and performs interleaving. The encoder 162 codes the payload of 1 to 15 bytes based on a ⅔ code rate, and performs interleaving. That is, the header is outputted as a symbol of 2-bit with respect to an input of 1-bit, and the payload is outputted as a symbol of 3-bit with respect to an input of 2-bit. In this case, an increase length is reduced through the puncturing using the puncturing matrix. The encoder 162 performs bit-interleaving by unit of 32-bit after coding, in order to deal with a burst error during the transmission.

Upon performance of FEC encoding, additional tail symbols are generated two times because the header and the payload are encoded, respectively. Such tail symbols may be removed during the puncturing or the interleaving, but a stuff is added to meet a certain number of bits.

Also, the encoder 162 adds preambles to the encoded header and payload. An Inter Frame Spaces (IFS) is added between the frames.

The preamble indicates that one frame starts, and may be formed in various patterns. For example, the pattern of the preamble may be formed to have a pattern 0x0FF0.

IFS is a section in which a signal is not outputted between frames.

Accordingly, the encoder 162 encodes the product information, and partitions it into frames to generate a control signal consisting of the frames. In this case, the control signal includes a plurality of symbols.

One frame includes the header, payload, preamble, and IFS, which include a plurality of symbols and have a certain size, respectively. In the frame, the preamble, header, tail symbol, the preamble is configures with 16 symbols, the header is configured with 32 symbols, the tail symbol of the header is configured with 4 symbols, the payload is configured with 12 through 180 symbols, the tail symbol of the payload is configured with 4 symbols, and IFS is configured with 16 symbols. The stuff varies according to the number of bits according to the encoding result or the result of the modulation result. That is, when the result of alignment of 32 bits is 31 bits, 1 bit is added to the stuff.

That is, one packet is partitioned in the plurality of frames, and the frames include preambles, headers, and payloads, respectively. IFS intervenes between frames. Accordingly, one frame includes about 84 to 252 symbols from the preamble to IFS, and further includes a stuff symbol.

As described above, the encoder 162 generates a control signal for outputting a sound, by performing encoding and framing, and adding the preamble and IFS. The modulator 182 may modulate the control signal encoded as described above and including a plurality of symbols by frame unit. The modulator 150 receives the encoded control signal and modulates it into a frequency signal. The frequency signal is applied to the sound output unit 150 to be outputted as a sound including the product information.

FIG. 21 is a diagram illustrating Inter Frame Space (IFS) setting of a control signal. FIG. 21A is a diagram illustrating a process of recognizing noise from a terminal, and FIG.

21B is a diagram illustrating a frame including IFS to avoid a noise reduction like in FIG. 21.

Referring to FIG. 21A, a terminal 81 recognizes a varying signal like a first signal 87 among signals of audio frequency band as data, and recognizes a signal having a constant pattern in spite of time lapse like a second signal 88 as a noise.

The terminal 81 reduces a gain with respect to the second signal 88 recognized as a noise to transmit a waveform like a third signal 89.

The terminal 81 may attenuate a signal by recognizing a sound outputted from the refrigerator 1 as a noise according to the above characteristics. Accordingly, the sound of the refrigerator 1 may not be delivered to the service center 200, or may be distorted or lost during the transmission.

Accordingly, upon generation of the control signal as described in FIG. 21b, the encoder 162 of the refrigerator 1 partitions a packet into a plurality of frames, and sets IFS between frames such that the sound is not recognized as a noise in the terminal 81. IFS is a section where a signal is not outputted between frames.

Since the terminal 81 recognizes the sound of the refrigerator 1 as a typical voice signal due to an interrupted sound of IFS before the sound is recognized as a noise, the sound may be provided to the service center 200 without signal attenuation.

The interrupted sound may be generated due to IFS before the terminal 81 recognizes a sound outputted from the refrigerator 1 as a noise, in consideration of time necessary for the terminal 81 to recognize the noise.

The terminal 81 determines that a sound signal is a noise when the sound signal of a certain frequency continues for about 2.5 seconds to about 6 seconds, and determines that a sound signal having the same frequency for about 10 seconds or more is a noise.

Accordingly, the encoder 162 may set the size of the frame and the symbol time such that an output time per frame falls within about 2.5 to about 3 seconds, and does not exceed about 10 seconds. Here, the time for one frame to be outputted as a sound may vary according to the symbol time, the number of frequencies that are used, and the size of the frame.

In this case, since the terminal 81 may consider a silent interval of a certain time as a temporary phenomenon, and may recognize it as a state where a signal is continuously inputted, IFS may be set such that the terminal 81 recognizes it as a silent interval.

As the size of the IFS section is reduced, a transmittable amount of signal per unit time (e.g., about 1 second) increases, but the terminal 81 may determine it as a noise. On the other hand, as the size of the IFS section increases, the terminal 81 is unlikely to recognize a sound signal as a noise, but a transmittable amount of signal per unit time (e.g., about 1 second) is reduced.

Accordingly, the IFS section may be set to have a value of about 0.1 second to about 1 second.

For example, when the IFS section is set as about 16 symbols as described above, and the symbol time of 1 symbol is about 12 ms, IFS has a value of about 192 ms.

Figure 22:
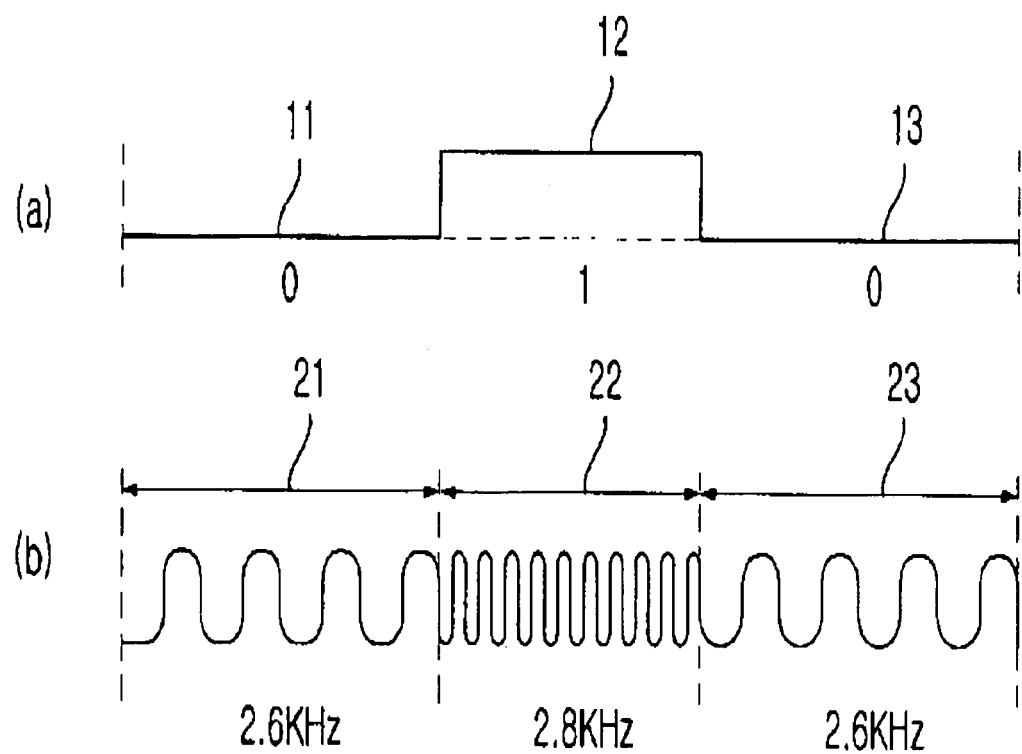
FIG. 22 is a diagram illustrating a frequency conversion of a modulator.

FIG. 22 is a diagram illustrating a frequency conversion of a modulator.

As described above, the frequency of the control signal encoded by the encoder 162 according to a certain method may be converted by the modulator 182 to be outputted as a sound through the sound output unit 150.

It will be assumed that the modulator 182 uses a Frequency-Shift Keying (FSK), and uses two frequencies of about 2.6 kHz and about 2.8 kHz. The modulator 182 allows the frequency of about 2.6 kHz to be outputted in response to a logic value 0, and allows the frequency of about 2.8 kHz to be outputted in response to a logic value 1.

When the control signal is 010, the modulator 182 converts a first bit 11 having a value of 0 into a signal 21 having a frequency of about 2.6 kHz, and converts a second bit 12 having a value of 1 into a signal 22 having a frequency of about 2.8 kHz. Also, the modulator 182 converts a third bit 13 having a value of 0 into a signal 23 having a frequency of about 2.6 kHz.

In this case, assuming that bits of the control signal denote one symbol, respectively, the length of the symbol denotes a symbol time, and one frequency signal is outputted in response to one symbol, the length of the basic unit of the frequency signal constituting the outputted sound may become the symbol time.

Figure 23:
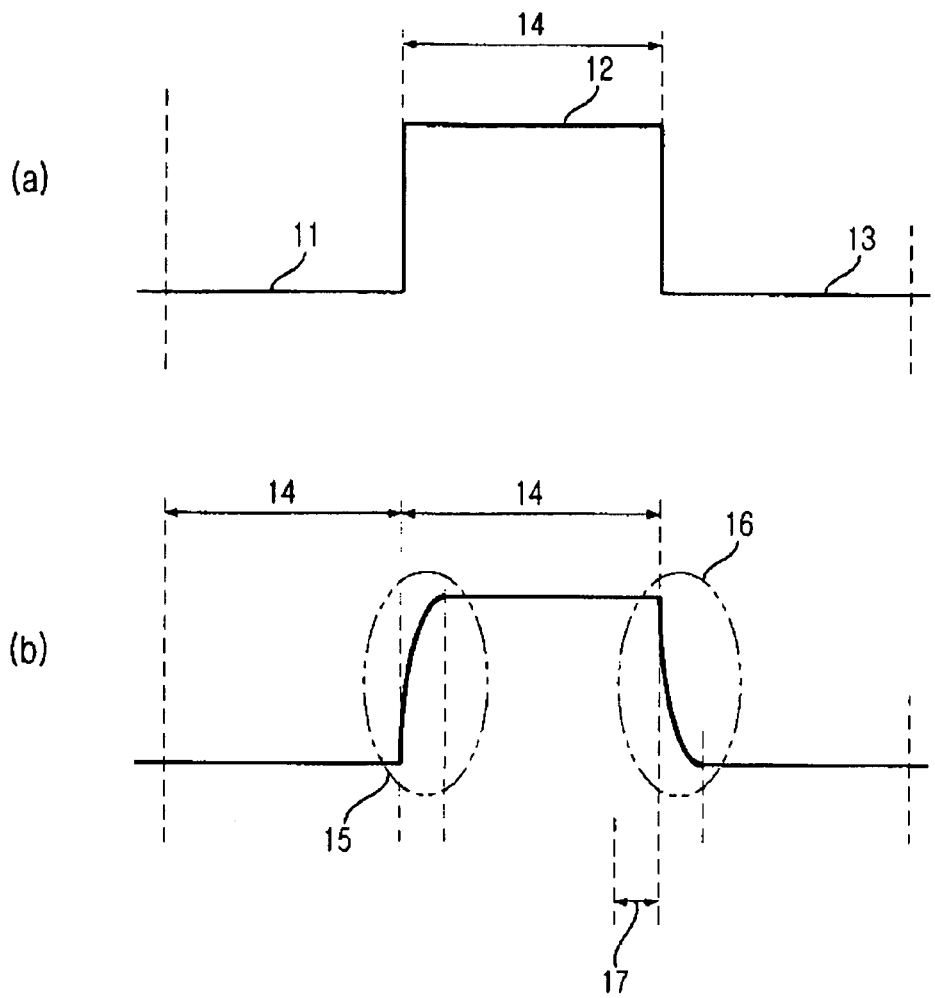
FIG. 23 is a diagram illustrating a dead time.

FIG. 23 is a diagram illustrating a dead time.

Referring to FIG. 23, the encoder 162 sets a dead time in the course of encoding the product information, and upon signal conversion, the modulator 182 switches off a resonant frequency for the frequency conversion in a section where the dead time is set, and stops the signal conversion.

This is for removing a reverb effect that affects a next signal conversion due to the principle of charging and discharging of a capacitor. In a section where a value is changed due to the reverb effect, two frequencies may be shown, and an unnecessary signal may be added to the sound signal. Alternatively, this is because an influence according to a change from one frequency signal to another frequency signal while a data value is being changed may remain and continue beyond a specified time.

Here, IFS is set between frames, whereas the dead time is set by symbol unit of the control signal.

Upon signal conversion, the control signal as shown in FIG. 23A does not suddenly change, but gradually change in a section where a value changes from 0 to 1 or vice versa as shown in FIG. 23B.

Particularly, when the value changes from 1 to 0 (12 and 13), the preceding signal value affects the following signal 13. Accordingly, a dead time is set based on a symbol. For example, the dead time per symbol is set according to 1-bit of the control signal, that is, one symbol. However, when the value is not changed but maintained, the dead time may not be set. That is, only when the value is changed, the dead time may be set.

Since the signal value gradually changes, the dead time 17 is set in the symbol time. In this case, if the dead time is too long, symbol recognition rate is reduced, and if the dead time is too short, the preceding signal affects the following signal. Accordingly, the dead time has to be set according to the size of the symbol, i.e., the symbol time.

When the dead time is set in the control signal, the modulator 182 stops modulating a signal in a section where the dead time is set. In this case, when the signal is modulated using Pulse-Width Modulation (PWM), the modulator 182 switches off a resonant frequency for modulation in the section where the dead time is set to temporarily stop the frequency signal modulation for the dead time. Accordingly, a sound outputted from the sound output unit 150 is outputted in a state where a reverb effect between symbols is removed.

FIG. 24 is a diagram illustrating an exemplary output signal form when a signal is converted without a dead time.

As shown in FIG. 24A, upon control signal conversion of the modulator 182, when a control signal is converted into a certain frequency signal without a dead time, a frequency by PWM is generated together with a synchronous signal 41 for synchronization of signal conversion.

In this case, frequencies as many as the number of frequency used in the frequency conversion are generated from a frequency oscillator. Output signals from the respective frequencies are combined to be outputted as one sound through the sound output unit 150.

The modulator 182 modulates the control signal by a frequency conversion method. The modulated signal is shown as a spectrum 43 for convenience of explanation. That is, when the control signal is converted into a sound signal without a dead time as described above, the signal becomes longer than the symbol time at the corresponding section, generating an error 45 affecting the following symbol time.

Accordingly, a waveform 46 as shown in FIG. 24B may be shown.

This may be applied to the case where a signal is converted in the service center 200, as well as the case where a sound is outputted from the refrigerator 1. In this case, reverberation in a section where a data bit changes affects the following symbol.

FIG. 25 is a diagram illustrating an exemplary signal form when a sound signal of a control signal is converted by applying a dead time in a refrigerator.

Upon signal conversion using a synchronous signal 51 and a resonant frequency 52, the modulator 182 stops the resonant frequency by PWM in a section where a dead time is set, according to the control signal of the control unit 160 (54).

As shown in FIG. 25A, if an oscillation frequency switches off in a dead time section 17 (54), a converted signal is generated in a specified symbol time section (55).

When the control signal set with a dead time as described above is converted into a sound signal, as shown in FIG. 25B, the signal is converted in the size of the symbol time.

The generated sound signal is applied to the sound output unit 150 to be outputted as a certain sound.

In this case, the symbol time is determined as follows.

Figure 26:
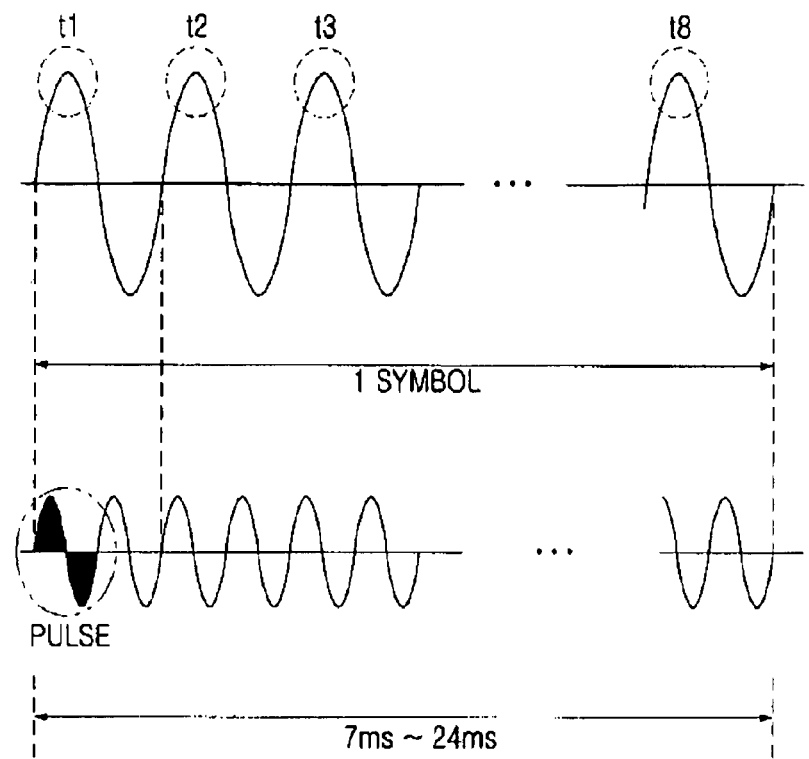
FIG. 26 is a diagram illustrating a sound structure as an example of symbol time setting in a refrigerator.

FIG. 26 is a diagram illustrating a sound structure as an example of symbol time setting in a refrigerator.

Referring to FIG. 26, by the frequency conversion of the modulator 182, the sound output unit 150 outputs a sound that is a combination of at least two frequency signals. It will be assumed that frequencies of about 2.6 kHz and about 2.8 kHz are used.

In this case, the frequency of the outputted sound may change according to available frequency band of the sound output unit 150. If the frequency response of the sound output unit 150 is higher or lower than about 2.6 kHz or about 2.8 kHz, the frequency of a pulse constituting the sound signal may also become higher or lower.

The symbol is the data unit constituting the control signal. When one frequency signal is outputted according to one symbol, a sound outputted from the sound output unit 150*b* may be used as a basic unit representing a piece of information. That is, one symbol may correspond to one frequency signal in the outputted sound. However, the number of symbols corresponding to the frequency signals may vary according to the number of frequencies used in the modulator 182.

The frequency signal outputted according to the symbol includes a plurality of pulses. The period of each pulse is determined according to the frequency used in the modulator 182.

When a sound signal is outputted as a sound to be transmitted through a telephone network or a mobile communication network, the data transmission rate vary according to the size of the symbol. When the symbol time is about 30 ms, it takes about 30 seconds to transmit data of about 100 bytes.

Accordingly, the size of the symbol, the symbol time has to be reduced to increase the transmission rate. This means that the number of pulses in each frequency signal outputted according to the symbol is reduced.

Assuming that the basic unit of the frequency signal of the outputted sound is a symbol, when each symbol is converted to be replayed at an audio frequency range, the replay time becomes short. Accordingly, a sound may not be exactly outputted from the sound output unit 150, and an outputted sound may be attenuated or distorted in the course of transmission through a telephone network or a mobile communication network. This may cause diagnosis impossibility or wrong diagnosis upon refrigerator diagnosis of the service center 200 using a sound.

Accordingly, the symbol time may be set by determining the number of pulses included in one frequency signal outputted according to one symbol, so that the size of data regarding a sound and the transmission rate according thereto can be reduced, and exact output and transmission of the sound can be achieved.

The symbol size, i.e., symbol time is set by considering whether a certain sound can be actually outputted and whether transmission through a communication network is possible, as well as the total length of the control signal to be outputted as a sound, the total length of an outputted sound, and the transmission rate. The dead time and IFS may be determined according to the symbol time that is set.

Particularly, since the output of a sound from the sound output unit 150 and transmission through a communication network are affected by the number of pulses in a symbol, the symbol time may be set in consideration of the number of pulses per symbol and the frequency components that are used.

As described above, when the symbol time becomes smaller, the replay time of the symbol at the sound output unit 150 becomes extremely short, causing problems with the output and recognition of the sound. On the other hand, when the number of the pulses per symbol and the size of the symbol increase, the recognition of the sound is facilitated, but the transmission time of the outputted sound including the product information increases. Accordingly, the size of the symbol, i.e., the symbol time may be determined within a recognizable range according to the characteristics of a telephone, mobile terminal, telephone network, and mobile communication network.

The period of the pulse constituting the frequency signal corresponding to the symbol is determined by the frequency response of the sound output unit 150, for example, about 2.6 kHz and about 2.8 kHz. Accordingly, the number of pulses disposed at the same time slot with respect to the same frequency is constant. In this case, since a portable terminal receiving a signal of an audio frequency range receives a sound signal, and then performs sampling, the size of the symbol must not be reduced below a certain level.

Accordingly, the number of pulses per symbol is allowed to be about eight or more, and the symbol time is allowed to be about 3 ms or more.

The number of pulses per symbol may range from about 8 to about 67.

One symbol including about 8 to about 32 pulses may have few errors and realize the highest transmission rate when the refrigerator 1 transmits data to the portable terminal 81 using a sound signal.

When the symbol time is shorter than about 7 ms, a recognition error may occur in that the portable terminal 81 can not exactly obtain a replayed sound of the sound output unit 150. When the symbol time exceeds about 24 ms, the transmission rate of a sound signal transmitted from the refrigerator 1 to the portable terminal 81 is reduced.

Figure 27:
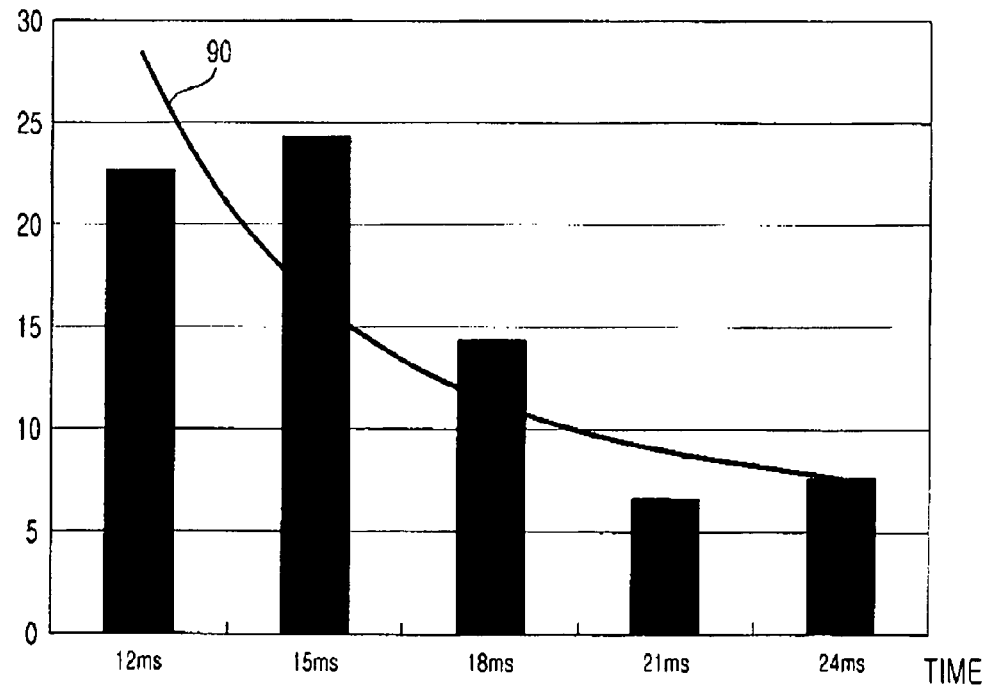
FIG. 27 is a diagram illustrating a relation between an error rate and a transmission rate according to a change of the size of a symbol time in a refrigerator.

FIG. 27 is a diagram illustrating a relation between an error rate and a transmission rate according to a change of the size of a symbol time in a refrigerator.

As described above, the time necessary to output a sound and the transmission rate of the outputted sound through a communication network vary according to the symbol time.

Referring to FIG. 27, when the sound outputted from the refrigerator is transmitted to the service center through a portable terminal, if the symbol time varies from about 12 ms to about 30 ms while satisfying a certain error rate, the transmission rate varies. In FIG. 27, the horizontal axis indicates symbol time, and the vertical axis indicates transmission rate. Also, the, inversely proportional curve 90 indicates error rate. In this case, the error rate curve 90 denotes an error rate in which an error of about 30 bits occurs per 1216 bits.

As the symbol time increases, the size of data to be transmitted increases. Accordingly, the transmission time varies, and the transmission error rate varies according to the increase of the transmission time.

When the symbol time is about 21 ms and 24 ms, the transmission rate is reduced to about 7 and 8, respectively. When the symbol time is about 15 ms, the transmission rate is highest, about 24, but the error rate is beyond about 30/1216 bits, with the error rate condition unsatisfied.

When the symbol time is about 12 ms and 15 ms, the transmission rate is high, but an error rate at the symbol time of about 15 ms increases. Accordingly, it is desirable to set the symbol time to about 12 ms in which the error rate is relatively low and the transmission rate is high.

Accordingly, the number of pulses per symbol may be set to at least eight or more, and the symbol time may be set within a range of about 3 ms to about 24 ms.

In this case, in consideration of the recognition rate, the symbol time may be set within a range of about 7 ms to about 24 ms. In addition, considering the error rate and the transmission rate, the symbol time may be set to about 12 ms.

Figure 28:
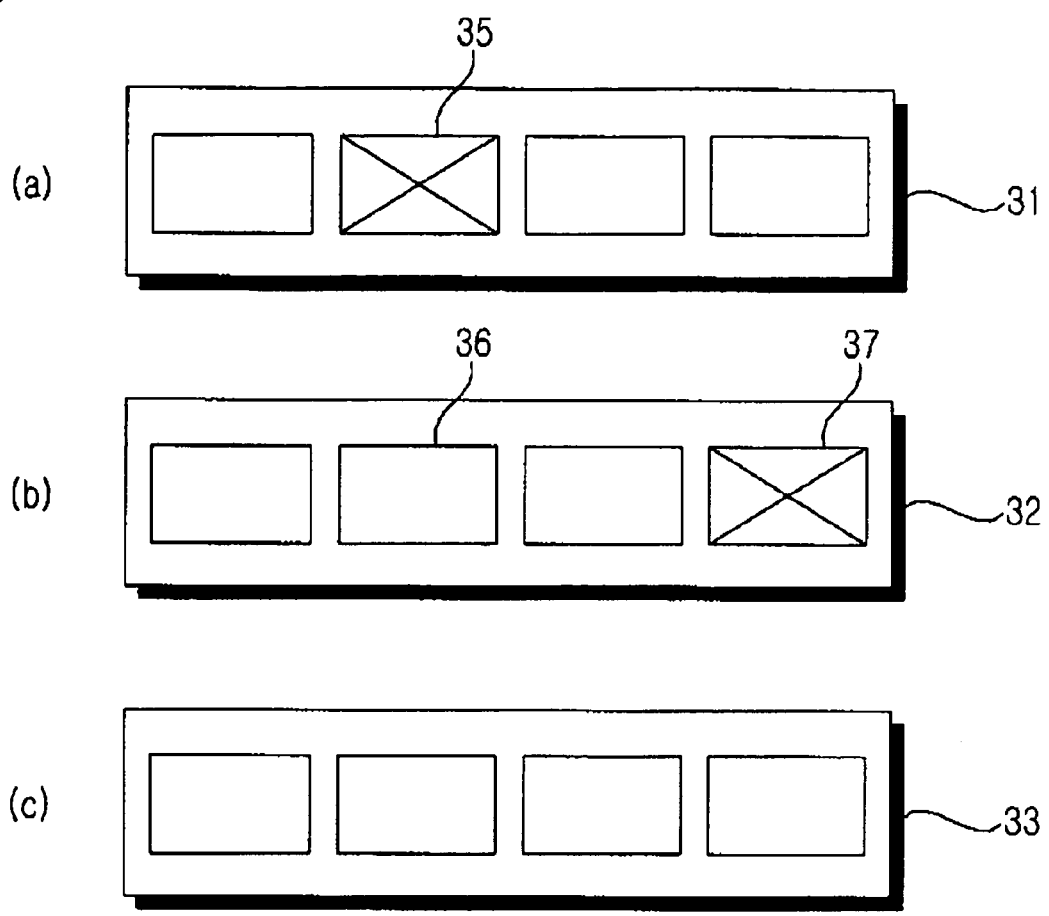
FIG. 28 is a diagram illustrating a frame and an error check code of the frame in processing a sound including product information of a refrigerator.

FIG. 28 is a diagram illustrating a frame and an error check code of the frame in processing a sound including product information of a refrigerator.

The product information of the refrigerator is framed to be modulated including a preamble and an error check and is outputted as a sound to be transmitted to the service center 200.

In this case, the service center performs an inverse conversion and decoding on the received sound to extract the product information therefrom. It is possible to distinguish the frames using the preamble, and determine whether the frame is normal or abnormal through error check.

The diagnostic server of the service center checks whether an error exists in each frame. In this case, the error check may be performed using Cyclic Redundancy Check (CRC), parity check method, checksum method, and Adler-32 algorithm.

The server control unit 210 of the diagnostic server determines whether an erroneous frame exists. If there is no erroneous frame, the product information may be extracted through the signal processing unit 230, and the diagnosis unit 260 performs failure diagnosis on the refrigerator.

When there is an erroneous frame among the received frames, the server control unit 210 may temporarily store the received frame, and may request re-transmission from the refrigerator.

In this case, since the server control unit 210, as described above, can know the order of the erroneous frame due to the frame type included in the frame, the failure diagnosis is performed by comparing a plurality of frames 31, which are primarily transmitted and temporarily stored, with a plurality of frames 32 that are secondarily transmitted, respectively, and combining normal frames. Also, the server control unit 210 may request re-transmission of only erroneous frames 35 and 27, not all frames.

Figure 29:
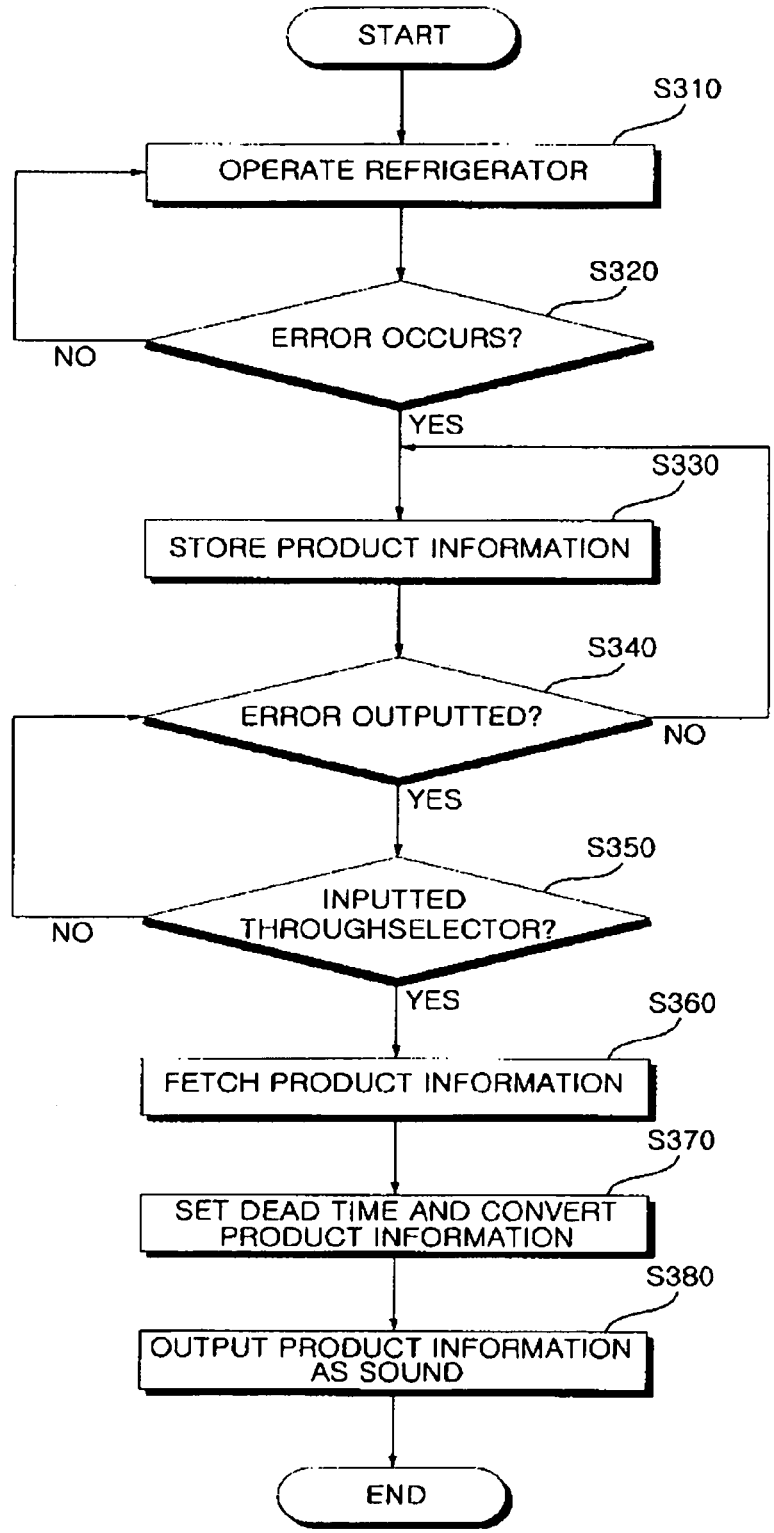
FIG. 29 is a flowchart illustrating a signal output method of a refrigerator according to an embodiment of the present invention.

FIG. 29 is a flowchart illustrating a signal output method of a refrigerator according to an embodiment of the present invention.

Referring to FIG. 29, the refrigerator operates according to setting inputted through a manipulator 144 (S110). In this case, the setting information on the operation of the refrigerator is stored as operation information.

If an error occurs during the operation (S320), the control unit 160 stores error occurrence information according to a malfunction of the refrigerator as failure information. Here, the failure information and the operation information are stored in the memory 172 as product information (S330).

The control unit 160 outputs the error on the display unit 141. If entrance into smart diagnostic mode is selected by the selector 145 (S350), the control unit 160 fetches the product information including the failure information and the operation information from the memory 172 (S360), and generates the product information as a control signal of a certain format.

The control unit 160 applies the generated control signal to the modulator 182, and applies a control command to the sound output unit 150 such that the sound output unit 150 operates.

In this case, the control unit 160 sets a dead time in a section where data values of the product information change, that is, a section between symbols, and the modulator 182 modulates the control signal including the product information into a sound signal of a certain frequency band in consideration of the dead time (S370).

The sound output unit 150 receives the outputted sound signal that is modulated by the modulator 182, and output a certain sound (S380).

Figure 30:
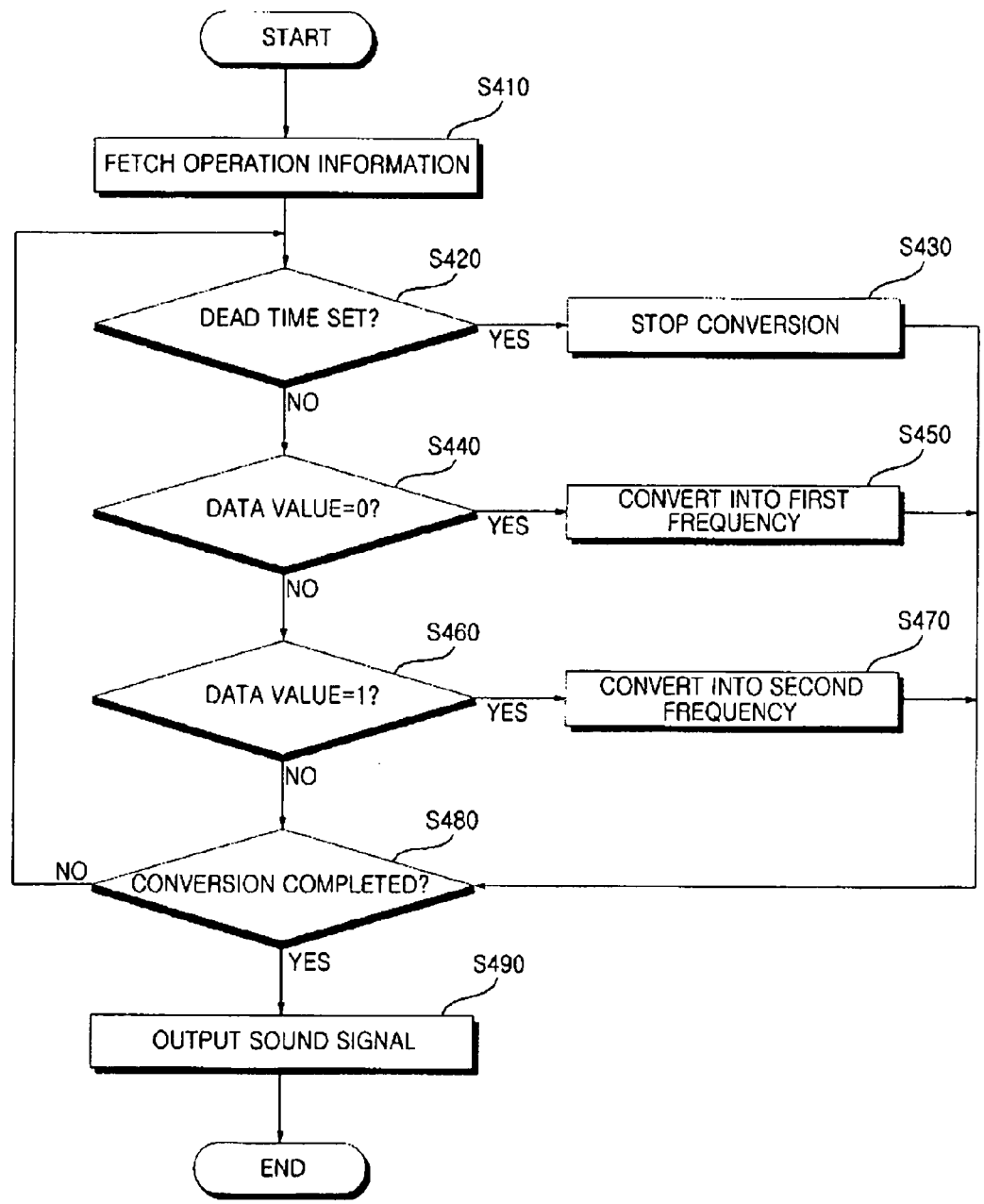
FIG. 30 is a flowchart illustrating a signal conversion method of a refrigerator according to an embodiment of the present invention.

FIG. 30 is a flowchart illustrating a signal conversion method of a refrigerator according to an embodiment of the present invention.

As described above, when the refrigerator outputs a certain sound, a process of generating a control signal including the product information, and converting the control signal into a sound signal to be outputted as a sound is as follows. It will be described as an example that the modulator 182 modulates a signal according to Frequency-Shift Keying (FSK), but embodiments are not limited thereto.

Referring to FIG. 30, if the control unit 160 fetches the product information from the memory 172 (S410), the control unit 160, as described above, sets a dead time according to data values of the product information.

The control unit 160 divides the product information into certain sizes, or combines them, and sets the dead time between symbols to generate a control signal of a certain format.

In this case, the modulator 182 modulates the control signal into a sound signal of a certain frequency band. In a section of the control signal where the dead time is set (S420), the signal conversion temporarily stops (S430). After the dead time section is passed, the signal conversion resumes.

If a data value of the control signal is 0 (S440), the modulator 182 performs signal conversion into a first frequency (S450). If the data value of the control signal is 1 (S460), the modulator 182 performs signal conversion into a second frequency (S470). That is, when the data value is 0, the modulator 182 converts the control signal into a signal having a frequency of about 2.6 kHz. When the data value is 1, the modulator 182 converts the control signal into a signal having a frequency of about 2.8 kHz. In a dead time section where the data value changes, the signal conversion temporarily stops.

In this case, a resonant frequency signal of PWM switches off to stop the signal conversion in the dead time section. If the resonant frequency switches off in the dead time section, a sound signal is formed in the symbol time in spite of an influence of a reverberation signal according to the characteristics of a capacitor.

Upon signal conversion, the modulator 182 modulates the signal by unit of symbol time, based on the symbol time that is a unit time in which the product information has one data value.

If the signal conversion is performed by unit of symbol time as described above (S420 through S470), and is completed with respect to the product information (S480), each signal converted by unit of symbol time is outputted as a sound signal.

The sound output unit 150 receives the sound signal from the modulator 182, and outputs a certain sound (S490).

Accordingly, a user hears the sound including the product information of the refrigerator, and transmits the sound to the service center through a communication network to which the user is connected, as described in FIGS. 1 and 2.

A refrigerator and a signal output method thereof according to an embodiment of the present invention can prevent signal noise and distortion in a section where a data value changes, and can achieve efficient signal processing, by setting a dead time between symbols of a control signal including product information to stop signal conversion in the dead time section, in outputting the product information including operation information such as failure information generated during the operation of the refrigerator and setting information for the operation of the refrigerator.

Also, stable output and transmission of the sound can be achieved, and the transmission rate can be improved, by setting the dead time in consideration of the number of pulses per symbol in a sound signal, in generating the control signal.

Figure 31:
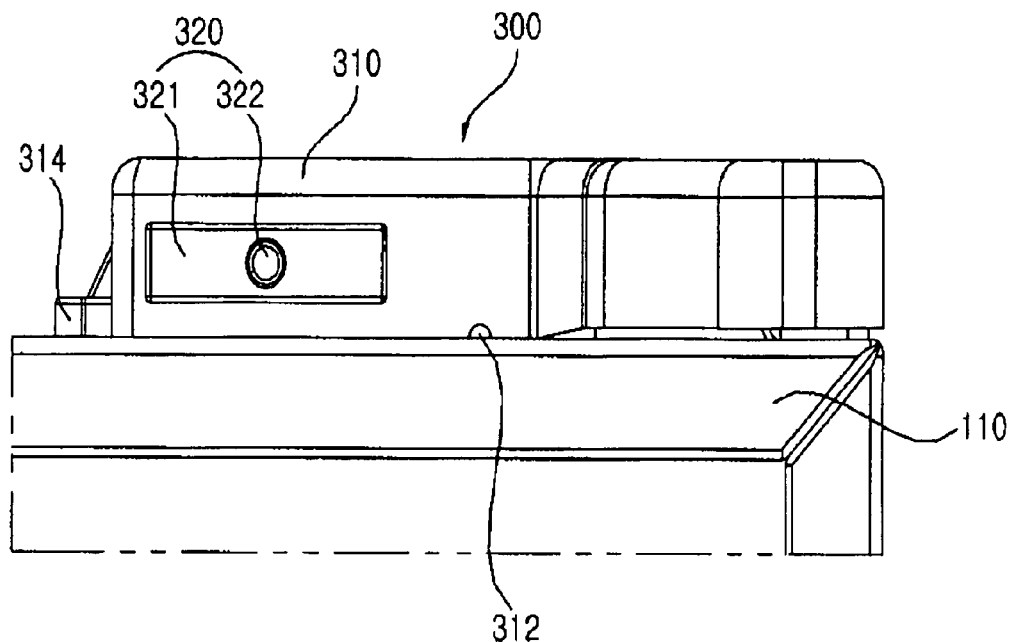
FIG. 31 is a magnified view of a hinge unit shown in FIG. 3.
Figure 32:
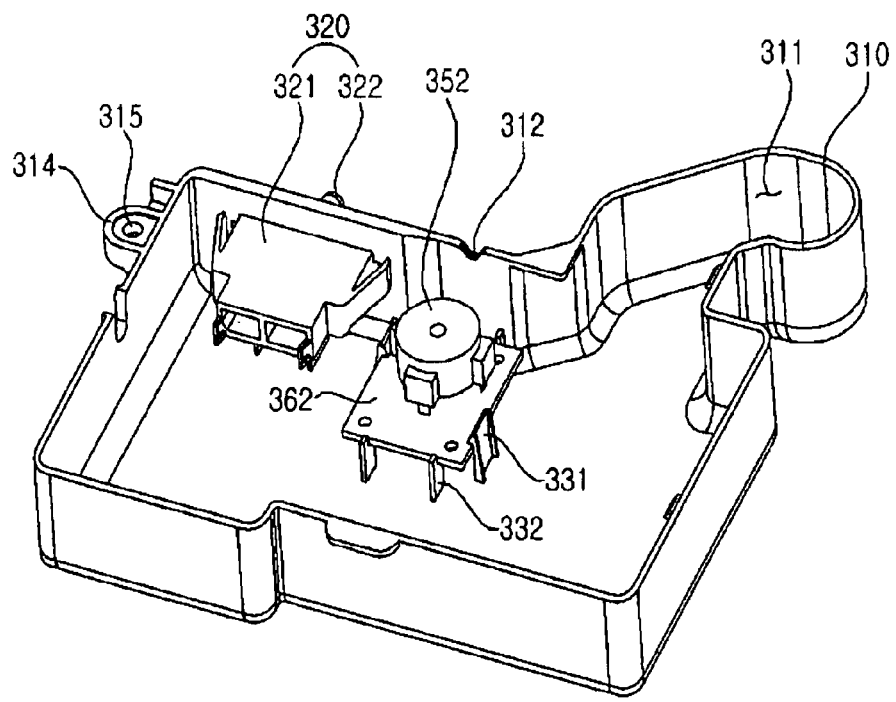
FIG. 32 is a perspective view illustrating an internal configuration of the hinge unit of FIG. 31.
Figure 33:
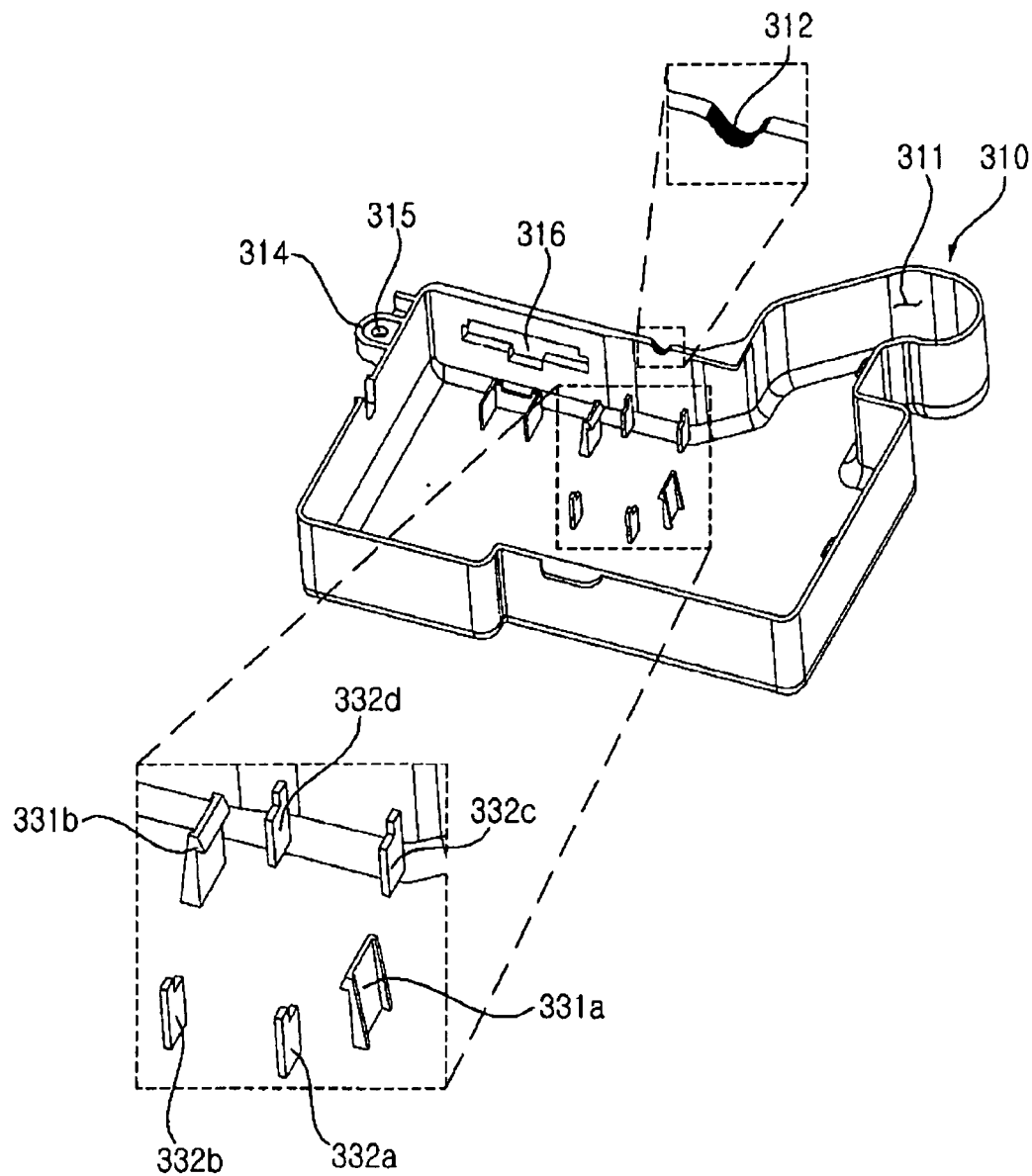
FIG. 33 is a diagram illustrating the inside of a housing of a hinge unit to explain a structure in which a second PCB is seated on the hinge unit.

FIG. 31 is a magnified view of a hinge unit shown in FIG. 3. FIG. 32 is a perspective view illustrating an internal configuration of the hinge unit of FIG. 31. FIG. 33 is a diagram illustrating the inside of a housing of a hinge unit to explain a structure in which a sub PCB is seated on the hinge unit Referring to FIGS. 31 through 33, the hinge unit allows the refrigeration compartment doors 121 and 122 of the refrigerator 1 to be pivotably connected to the case 110. The hinge unit may include a hinge unit 302 connecting the left refrigeration compartment door 121 to the case 110, and a hinge unit 300 connecting the right refrigeration compartment door 122 to the case 110. Since the hinge unit 302 connected to the left refrigeration compartment door 121 has the same structure as the hinge unit 300 connected to the right refrigeration compartment door 122, only the hinge unit 300 connected to the right refrigeration compartment door 122 will be described herein.

The hinge unit 300 is provided on the right top surface of the case 110 to allow the right refrigeration compartment door 122 to be opened and closed. Also, a door switch 320 is provided in the hinge unit 300. The door switch 320 turns on/off a lamp (not shown) lighting the refrigeration compartment 120 by being contacted when the right refrigeration compartment door 122 is opened and closed. The door switch 320 switches off the lamp when the right refrigeration compartment door 122 is closed, and turns on the lamp when the right refrigeration compartment door 122 is opened.

The hinge unit 300 includes a hinge housing 310 defining the external appearance thereof. The hinge housing 310 has a pivot insertion portion 311 into which a pivot (not shown) of the refrigeration compartment door 122 is inserted, and a coupling mount 314 having a coupling hole through which coupling members such as a screw and a bolt penetrate. The coupling member penetrates the coupling hole 315 to be coupled to the case 110.

Also, the hinge house 310 has a door switch coupling hole 316 to which the door switch 320 may be coupled. The door switch 320 includes a door switch connector 321 and a switching member 322. The door switch connector 321 is inserted into the door switch coupling hole 316 to be fixed. The switching member 322 retracts into the inside of the door switch connector 321 by a pushing force of the right refrigeration compartment door 122 when the right refrigeration compartment door 122 is closed, and elastically protrudes out of the door switch connector 321 by removal of the pushing force of the right refrigeration compartment door 122 when the right refrigeration compartment door 122 is opened.

The door switch connector 321 is electrically connected to the control unit 160 and the switching member 322 to allow the control unit 160 to sense whether the refrigeration compartment 120 is opened or closed according to the switching operation of the switching member 322.

An sound output unit is provided in the hinge housing 310 for outputting the product information as a sound upon smart diagnostic mode. The sound output unit may include one of a buzzer and a speaker. Hereinafter, it will be assumed that the sound output unit is a buzzer 352.

A Printed Circuit Board (PCB) 362 is fixed in the hinge housing 310. The buzzer 352 is mounted on the PCB 362. To this end, support members 332*a*, 332*b*, 332*c* and 332*d* for supporting the PCB 362 and fixing members 331*a* and 331*b* for fixing the PCB 362 on the support members 332*a*, 332*b*, 332*c* and 332*d* are provided in the hinge housing 310.

Particularly, considering the hinge housing 310 is shown upside down in FIGS. 32 and 33, the PCB 362 seems to be suspended by the fixing members 331*a* and 331*b* in the hinge housing 310 when the hinge housing 310 is coupled to the case 110. Accordingly, the PCB 362 is spaced from the surface of the case 110, so that the PCB 362 can be protected from water condensing or permeating on the case 110.

On the other hand, in a state where the PCB 362 is spaced from the surface of the case 110, the buzzer 352 may be mounted on the PCB while being also spaced from the surface of the case 110. As described above, the buzzer can also be protected from water gathering in the hinge housing 310.

A sound output hole 312, which is a passage of a signal sound outputted from the buzzer 352, is formed in the hinge housing 310. The sound output hole 312 may be formed in an output direction of the buzzer 352 to minimize the attenuation of the signal sound. The buzzer 352 shown in FIG. 32 is formed to have a substantially cylindrical shape, and is mounted to extend from the PCB 362 in a longitudinal direction. The buzzer 352 may output a sound in a radial direction through an output terminal provided on the outer circumference of the cylindrical shape thereof.

The sound output hole 312 is formed by cutting an edge portion of the hinge house 310. When the hinge housing 310 is coupled to the case 110, a hole is formed between the hinge housing 310 and the surface of the case 110. As described above, since the sound output hole 312 is formed at the edge of the hinge housing 310, water gathering in the hinge housing 310 may smoothly flow out through the sound output hole 312.

Also, the sound output hole 312 may be opened in the forward direction of the refrigerator 1. Considering the refrigerator may be installed in a house by a built-in method, if the sound output hole 312 is opened in the lateral or backward of the refrigerator 1, it is inconvenient for a user to place a portable terminal close to the sound output hole 312.

Since the refrigerator 1 can be installed by a built-in method as well as a stand-alone method, in either case, the sound output hole 312 may be opened in the forward direction of the refrigerator 1 to allow a user to conveniently perform smart diagnosis.

The refrigerator may include various types of refrigeration compartments and freezer compartment. Door for opening and closing the refrigeration compartment and the freezer compartment may also be configured by various methods. For example, the case may be partitioned into upper and lower sides. One side may be provided with a refrigeration compartment, and the other side may be provided with a freezer compartment. In this case, two doors may be vertically provided on the case to open and close the refrigeration compartment and the freezer compartment, respectively.

Otherwise, the case may be partitioned into right and left sides. One side may be provided with a refrigeration compartment, and the other side may be provided with a freezer compartment. In this case, two doors may be horizontally provided on the case to open and close the refrigeration compartment and the freezer compartment, respectively.

Also, as described in the present embodiment, the case 110 may be vertically partitioned into upper and lower sides. One is provided with the refrigeration compartment 120, and the other is provided with the freezer compartment 130. The refrigerator 1 may be a three-door type in which two refrigeration compartment doors 121 and 122 are provided on the right and left sides of the case 110 to open and close the refrigeration compartment 120, and one freezer compartment door 131 of a sliding type is provided to open and close the freezer compartment 130. Also, the refrigerator 1 may be a four-door type in which an additional door of a sliding type is further provided based on the three-door type.

The hinge unit according to an embodiment of the present invention may be applied to any type of refrigerators described above. Space opened and closed by a door using the hinge unit is not limited to a refrigeration compartment as described in the present invention. The hinge unit may be applied to various types of the above refrigerator doors, in consideration of the arrangement of a refrigeration compartment and a freezer compartment, and the configuration of doors for opening and closing the refrigeration compartment and the freezer compartment.

Referring to FIGS. 3 and 4, the front surface of the hinge unit 300 is covered by the right refrigeration compartment door 122 in a state where the right refrigeration compartment door 122 is closed. Accordingly, an entire esthetic feeling on the appearance of the product can be improved, and foreign substances such as dust and water can be prevented from entering the sound output hole 312 in the front side of the hinge unit 300.

Figure 34:
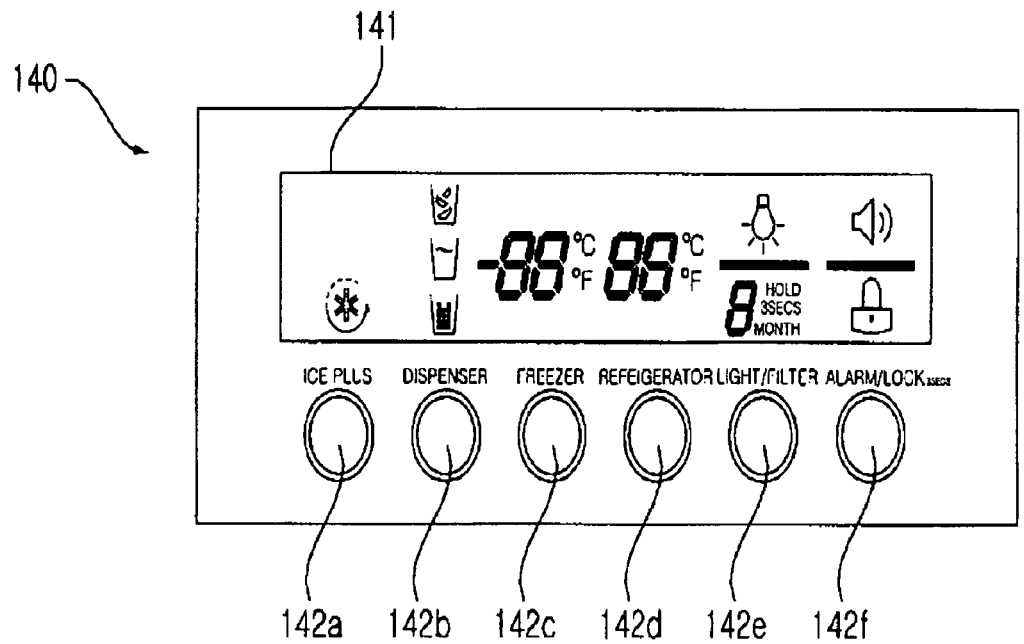
FIG. 34 is a diagram illustrating a control panel shown in FIG. 3.

FIG. 34 is a diagram illustrating a control panel shown in FIG. 3.

Referring to FIGS. 31 through 34, entrance into smart diagnostic mode of a refrigerator according to an embodiment of the present invention will be described.

Referring to FIG. 34, as described with reference to FIG. 3, the control panel 140 includes a display unit 141 for visually displaying various state information of the refrigerator 1, and the input unit 142 for receiving various control commands from a user.

The input unit 142 may include various manipulation keys for performing functions set by the manipulation of a user. For example, the input unit 142 may include an ice plus button 142a for increasing the amount of ice that can be made in the ice maker, a dispenser button 142b for selecting one of ice cube, water, or crushed ice provided from the dispenser 125, a freezer button 142c for setting the temperature of the freezer compartment, a refrigerator button 142d for setting the temperature of the refrigeration compartment, a light/filter button 143e for control the operation of a lamp (not shown) provided on the dispenser 125 or initializing a filter replacement-indicating lamp (not shown) after a filter is replaced, and an alarm/lock button 142f for setting an alarm for door opening or locking the manipulation keys.

The refrigerator 1 according to the present embodiment enters smart diagnostic mode by a combination of the above manipulation keys, not a separate selection key for the smart diagnosis. For example, when a user opens the right refrigeration compartment door 122, locks the manipulation keys by pushing the alarm/lock button 142f, and pushes the freezer button 142c for a predetermined duration (e.g. 3 seconds), the smart diagnosis may be performed, and a sound including product information may be outputted through the buzzer 352.

Since the smart diagnosis can be performed by a combination of the manipulation keys provided in the control panel without a separate selection key for the smart diagnosis, it is not necessary to include a selection key that is less frequently used. Accordingly, manufacturing cost can be saved, and the smart diagnosis can be performed only when the intention of a user to enter smart diagnostic mode is clear.

In the present embodiment, since the control panel 140 is provided on the left refrigeration compartment door 121, entrance into smart diagnostic mode is premised on the assumption that the right refrigeration compartment door 122 is opened. Accordingly, when a user opens the right refrigeration compartment door 122, and then manipulates the manipulation buttons provided in the control panel 140 in a state where the left refrigeration compartment door 121 is closed, the refrigerator 1 may enter smart diagnostic mode. Accordingly, the usability can be improved.

Figure 35:
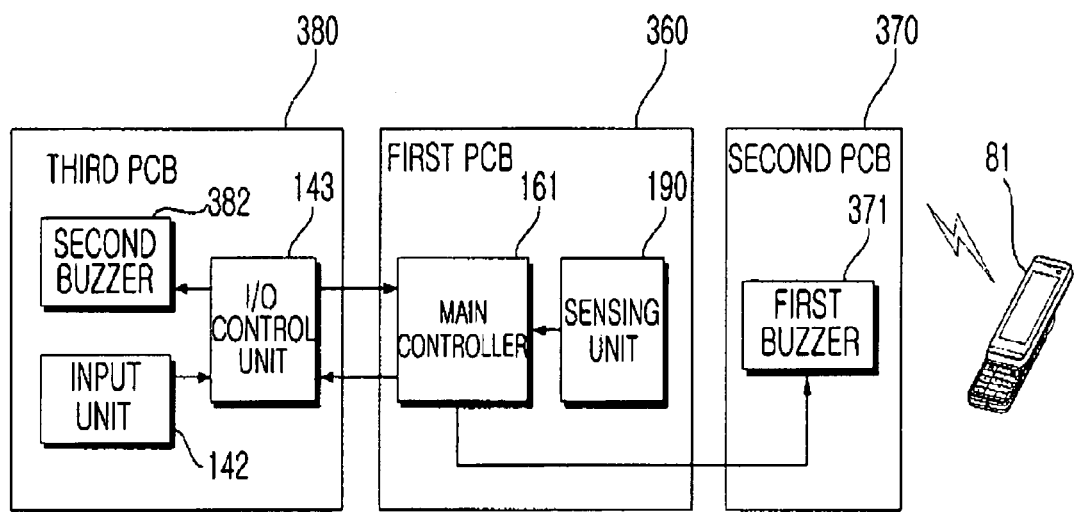
FIG. 35 is a diagram illustrating an exemplary buzzer output configuration provided in a refrigerator according to an embodiment of the present invention.

FIG. 35 is a diagram illustrating an exemplary buzzer output configuration provided in a refrigerator according to an embodiment of the present invention.

Referring to FIG. 35, the refrigerator 1 according to the present embodiment includes a first PCB 360 mounted with a main controller 161 constituting a control unit 160, a second PCB 370 mounted with a first buzzer 371 for outputting a signal sound including product information, and a third PCB 380 mounted with an I/O control unit 143.

The first PCB 360 includes the main controller 161 for controlling overall operations of the refrigerator 1, and a sensing unit 190 for processing sensed information. The first PCB 360 may be usually provided in the case 110.

The second PCB 370 is mounted with the first buzzer 371 outputting a signal sound including the product information, and is fixed in the hinge housing 310 as described with reference to FIGS. 31 through 33.

The third PCB 380 is mounted with an I/O control unit 143, the input unit 142, and a second buzzer 382. The second buzzer 382 outputs sounds such as alarm sounds, input sounds, and/or warning sounds that include various operation information directly recognizable by a user in addition to failure information. The third PCB 380 may be provided in the left refrigeration compartment door 121 on which the control panel 140 is provided.

The above configuration has an advantage in entrance into smart diagnostic mode through operations of the manipulation keys provided in the control panel 140 and output of a sound including the product information through the buzzer 371 provided in the refrigeration compartment door 122.

Figure 36:
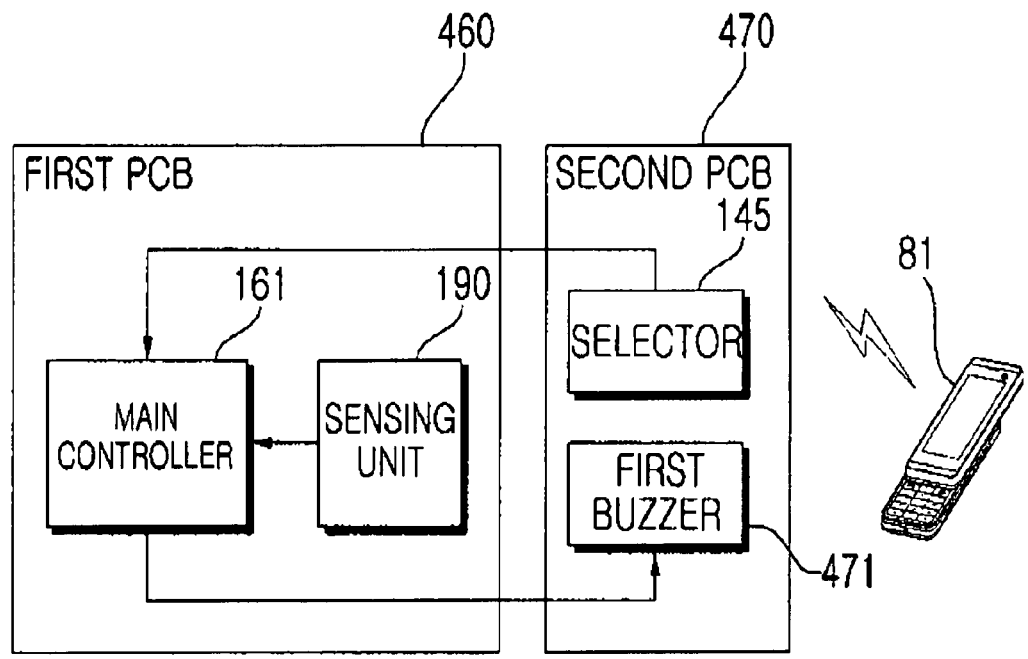
FIG. 36 is a diagram illustrating another exemplary buzzer output configuration provided in a refrigerator according to an embodiment of the present invention.

FIG. 36 is a diagram illustrating another exemplary buzzer output configuration provided in a refrigerator according to an embodiment of the present invention.

Referring to FIG. 36, the refrigerator 1 according to the present embodiment includes a first PCB 460 mounted with a main controller 161 and a sensing unit 190, and a second PCB 470 mounted with a first buzzer 471 outputting a signal sound including product information and a selector 145 for entering smart diagnostic mode. The first PCB is usually provided in the case 110.

The second PCB 470, which is mounted with the first buzzer 471 outputting a signal sound including the product information, is fixed in the hinge housing 310 as described with reference to FIGS. 31 through 33.

Accordingly, in order to enter smart diagnostic mode in the configuration as shown inn FIG. 36, when a smart diagnostic mode entrance signal is applied to the selector 145 mounted in the second PCB 470, the applied signal is sensed by the main controller 161, and the smart diagnosis is performed.

The above configuration has an advantage compared to a configuration in which a separate selection key is provided to perform smart diagnosis. Hereinafter, an exemplary configuration in which a separate selection key is provided on the hinge unit 300 will be described in detail with reference to the accompanying drawing.

Figure 37:
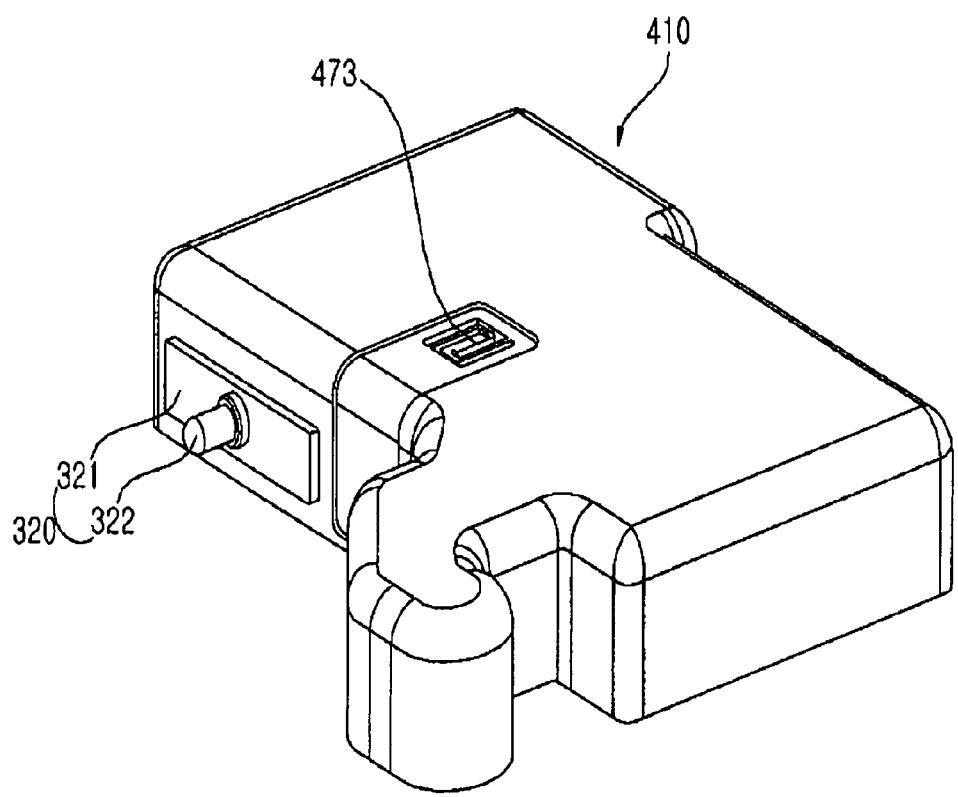
FIG. 37 is a diagram illustrating another exemplary hinge unit applicable to a refrigerator according to an embodiment of the present invention.

FIG. 37 is a diagram illustrating another exemplary hinge unit applicable to a refrigerator according to an embodiment of the present invention.

Hereinafter, the hinge unit shown in FIG. 37 is configured similarly to that described with reference to FIGS. 31 through 33, but has a difference in that a selection switch 473 is provided on a hinge housing 410 for entrance into smart diagnostic mode. The selection switch 473 may be implemented with various types of switches including push switch, toggle switch, slide switch, touch switch, and so forth. In the present embodiment, it will be assumed that the selection switch 473 is configured with a tact switch in consideration of manufacturing cost and operability.

Entrance into smart diagnostic mode is performed when a user manipulates the selection switch 473 provided in the hinge housing 410. In this case, the flow of a signal is similar to those described with reference to FIG. 36. Such a configuration has an effect of improving usability in that smart diagnosis can be easily performed by manipulation of the selection switch 473 that is separately provided.

Figure 38:
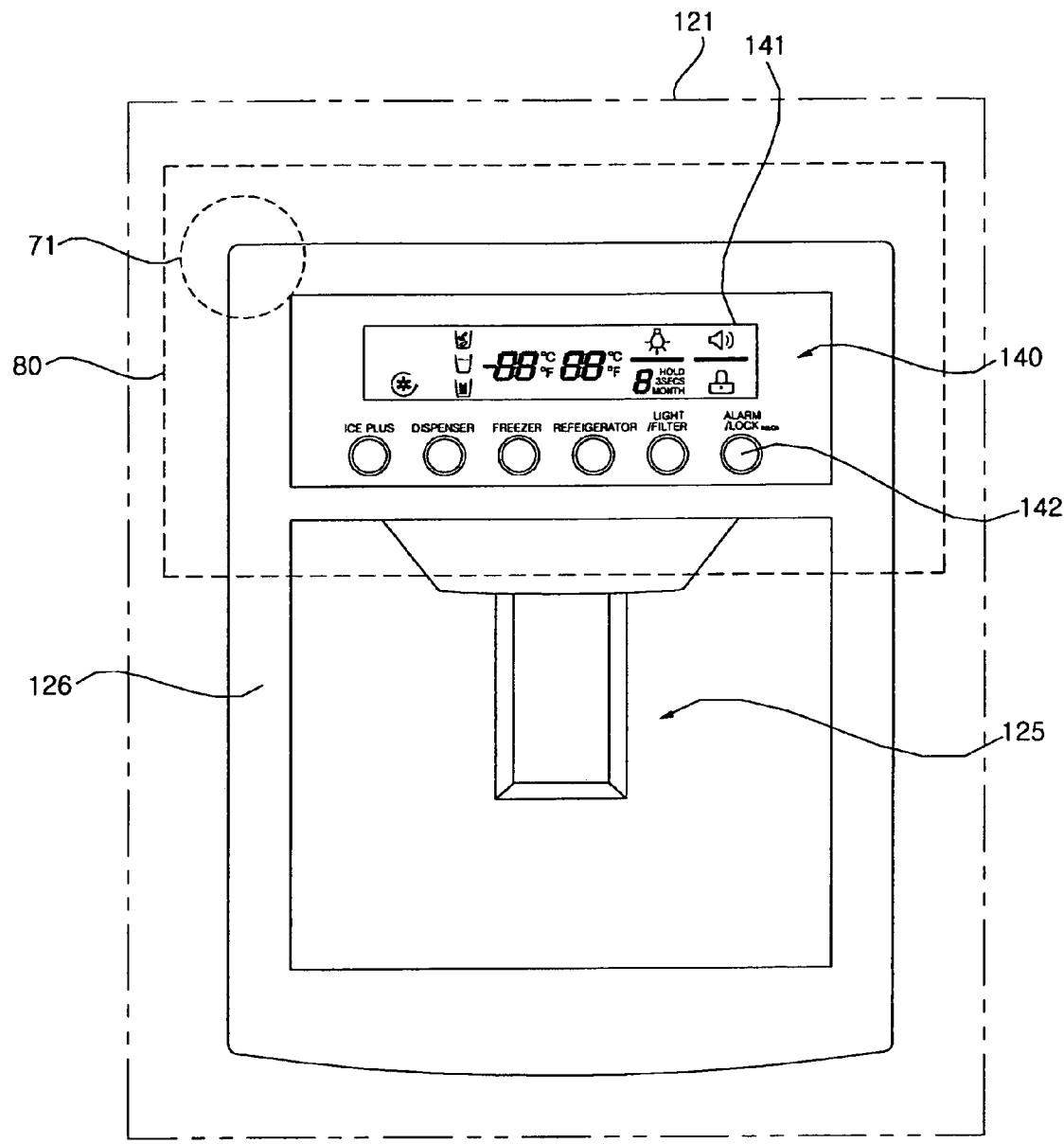
FIG. 38 is a magnified view illustrating a portion of the refrigerator of FIG. 3 in which a dispenser and a control panel are provided, and illustrates an exemplary sound passage configuration for the output of a signal sound.

FIG. 38 is a magnified view illustrating a portion of the refrigerator of FIG. 3 in which a dispenser and a control panel are provided, and illustrates an exemplary sound passage configuration for the output of a signal sound.

Referring to FIG. 38, a buzzer 71 outputting a signal sound including product information and a PCB 80 mounted with the buzzer 71 are provided in left refrigeration compartment door 121. In this case, a sound passage may be formed in the left refrigeration compartment door 121 to pass a signal sound outputted from the buzzer 71. The signal sound outputted from the buzzer 71 may be outputted to the outside of the refrigerator 1 with signal attenuation minimized.

In the present embodiment, a frame 126 in which a dispenser 125 and a control panel 140 are mounted may be mounted in the left refrigeration compartment door 121. In this case, a gap between the frame 126 and the left refrigeration compartment door 121 may serve as a sound passage. The buzzer 7 may be provided to face the gap between the frame 126 and the left refrigeration compartment door 121 and output the signal sound.

The configuration as shown in FIG. 38 has an advantage of using a gap formed by the structural feature of the refrigerator 1 as a sound passage without forming a separate sound passage for the output of the signal sound. Also, since the signal sound is outputted near the control panel 140, a movement distance of a user becomes shorter when a user places a terminal such as a mobile phone close to the control panel 140 after the refrigerator 1 enters smart diagnostic mode by manipulating manipulation keys of the control panel 140.

Figure 39:
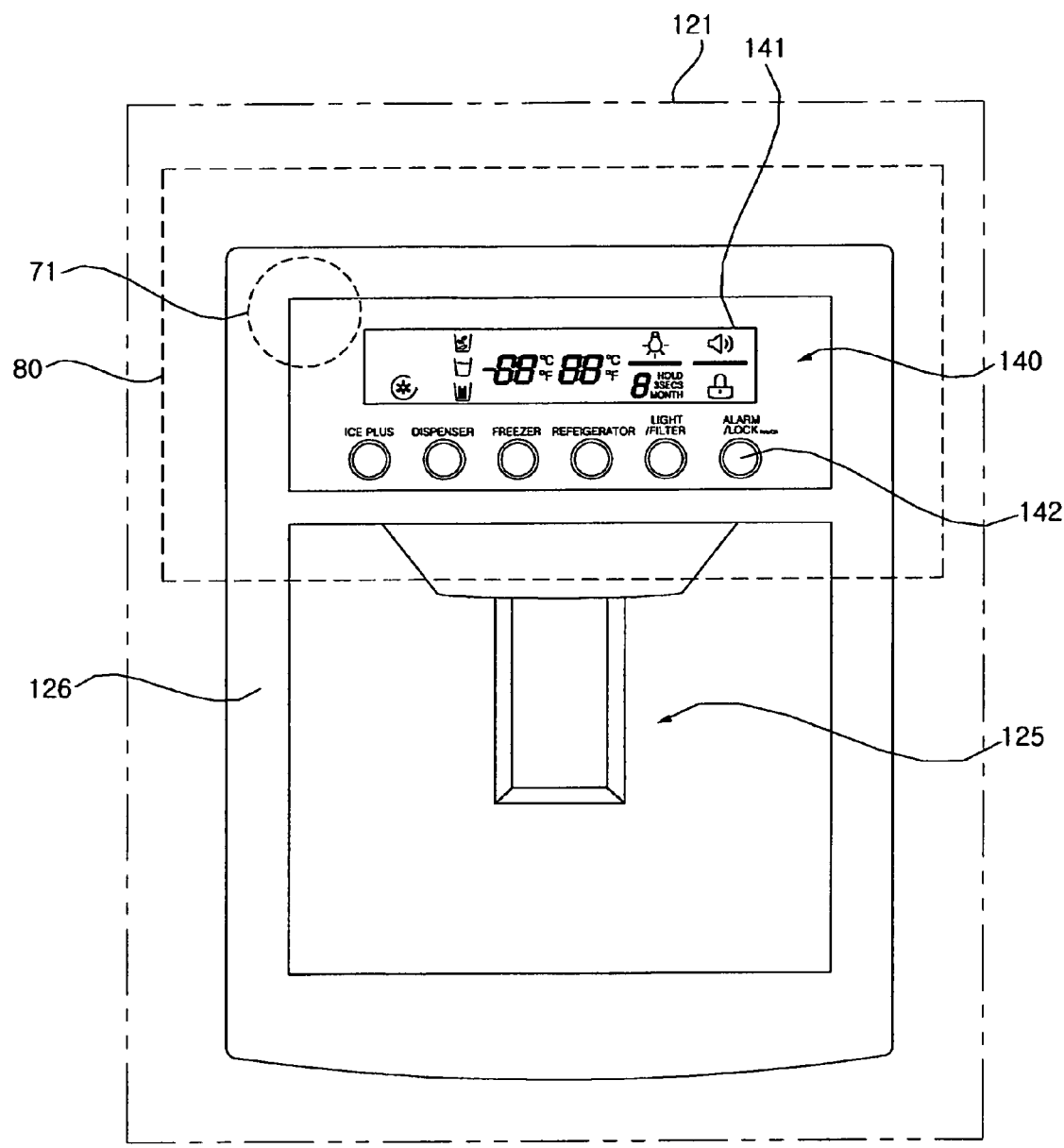
FIG. 39 is a magnified view illustrating a portion of the refrigerator of FIG. 3 in which a dispenser and a control panel are provided, and illustrates another exemplary sound passage configuration for the output of a signal sound.

FIG. 39 is a magnified view illustrating a portion of the refrigerator of FIG. 3 in which a dispenser and a control panel are provided, and illustrates another exemplary sound passage configuration for the output of a signal sound.

Referring to FIG. 39, the configuration of the sound passage of FIG. 39 is similar to that of FIG. 38 except that a buzzer 71 is disposed to face a gap between a frame 126 and a control panel 140. Accordingly, a detailed description thereof will be omitted herein.

Figure 40:
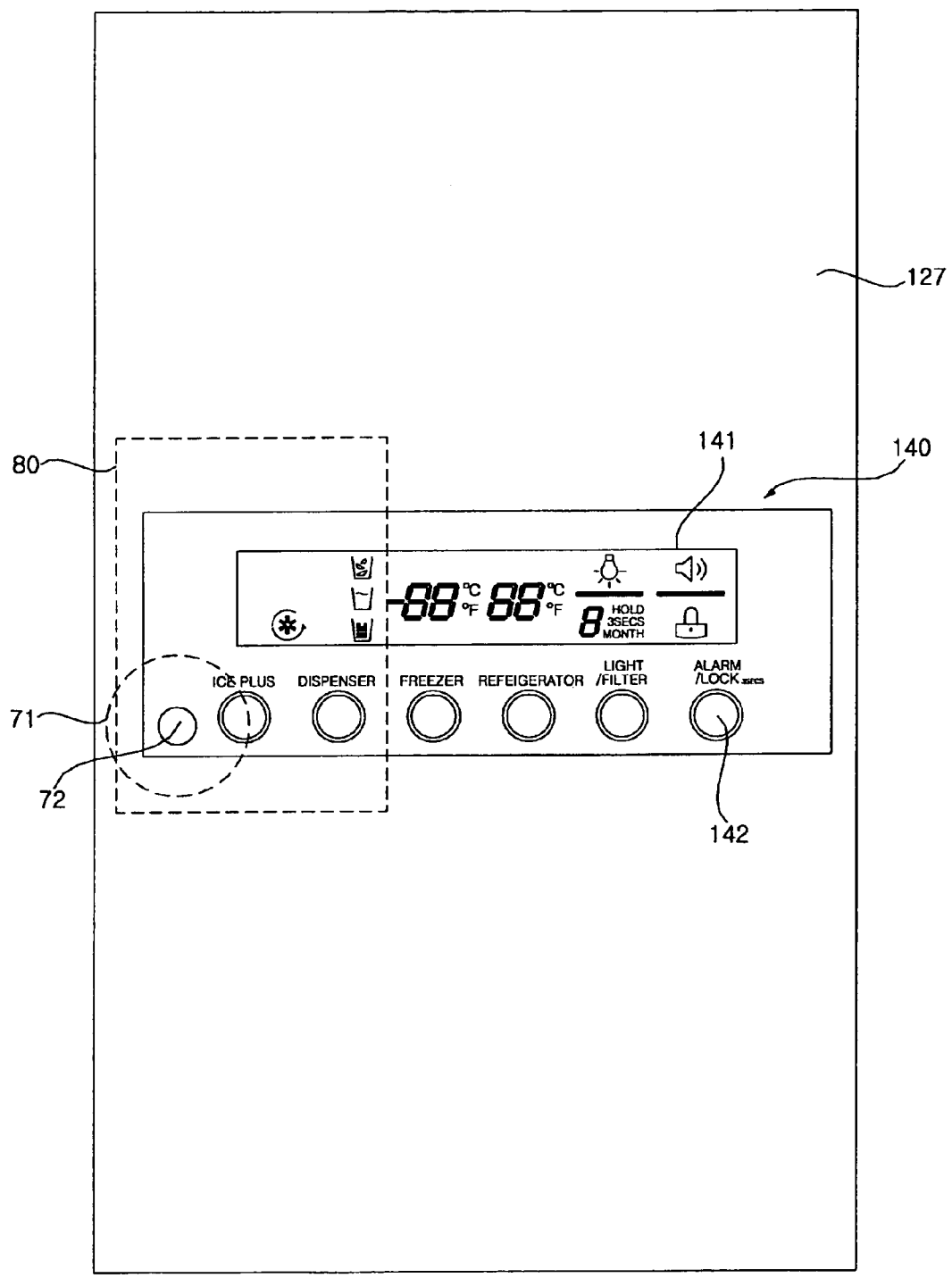
FIG. 40 is a diagram illustrating a door panel constituting a left refrigeration compartment door shown in FIG. 3.

FIG. 40 is a diagram illustrating a door panel constituting a left refrigeration compartment door shown in FIG. 3.

Referring to FIG. 40, a door panel 127 defines the exterior of a left refrigeration compartment door 121, and is attached to a left refrigeration compartment door frame (not shown) formed of plastic molding by an adhesive member such as Pressure Sensitive Adhesives (PSA) and double-sided tapes. Recently, in order to improve esthetic feeling or cubic effect, door panels formed of transparent or translucent materials are being widely uses. Particularly, when an input unit 142 of a control panel 140 is implemented as a touch type, the door panel 127 may be attached to the whole surface of the door including the input unit 142.

As described above, when a buzzer 71 is disposed inside the refrigeration compartment door 121, a sound passage may be separately formed to pass a signal sound including product information, outputted from the buzzer 71. A hole 72 is formed in the door panel 127 shown in FIG. 40 to serve as a sound passage. A hole may also be formed in a door frame according to the hole 72 in the door panel 127, so that a signal sound outputted from the buzzer 71 may be outputted to the outside of the refrigerator 1 while the signal attenuation is minimized. Also, the buzzer 71 may be disposed such that the output direction of the signal sound faces the hole 72 as described in the previous embodiments.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A refrigerator, comprising:
a selector configured to receive a command;
a controller that, upon receipt of the command through the selector, generates a control signal including product information;
a modulator that generates a frequency signal according to the control signal;
a sound output that outputs a sound including the product information according to the frequency signal;
a case that forms a refrigeration compartment and a freezer compartment;
a hinge provided at an upper side of the case; and
a door that opens and closes at least one of the refrigeration compartment or the freezer compartment, the door rotatably supported by the hinge, wherein the hinge includes a hinge housing that defines a space over the upper side of the case, wherein the sound output is provided in the space of the hinge housing, and wherein a sound output hole, through which the sound output from the sound output passes, is formed at a front surface of the hinge housing wherein the hinge includes an upper surface that extends from the front surface and is spaced apart from the upper side of the case, and wherein the sound output is suspended from the upper surface.

2. The refrigerator of claim 1, wherein the selector is provided at the hinge housing.

3. A refrigerator, comprising:
a selector configured to receive a command;
a controller that, upon receipt of the command through the selector, generates a control signal including product information;
a modulator that generates a frequency signal according to the control signal;
a sound output that outputs a sound including the product information according to the frequency signal;
a case that forms a refrigeration compartment and a freezer compartment;
a first door and a second door that open and close the refrigeration compartment or the freezer compartment;
a first hinge that supports the first door rotating thereon; and
a second hinge that supports the second door rotating thereon, wherein the selector is provided on a front side of the first door, wherein the first hinge is behind the first door when the first door is at a closed position, wherein the sound output is provided in the second hinge, and wherein a sound output hole, through which the sound output from the sound output passes, is formed at the second hinge and opened in a frontward direction.

4. The refrigerator of claim 3, wherein the second hinge is exposed from a front view, when the second door is at an opened position.

5. A refrigerator diagnostic system comprising:
a refrigerator according to claim 1;
a portable terminal that receives the sound output from the sound output of the refrigerator by the medium of air, and transmits the received sound through a communication network; and
a diagnostic server that receives the sound transmitted from the portable terminal and extracts the product information from the received sound to perform a diagnosis of the refrigerator.

6. The refrigerator diagnostic system of claim 5, wherein the diagnostic server includes a server output that outputs at least one of user setting information of the refrigerator, operation state information of the refrigerator, diagnosis result information of the refrigerator based on the user setting information and the operation state information, or solution information according to the diagnosis result information of the refrigerator.

7. The refrigerator diagnostic system of claim 6, wherein the user setting information includes at least one of a freezer compartment temperature set by a user, a refrigeration compartment temperature set by a user, setting of a quick-freezing function, or setting of a key-lock function.

8. The refrigerator diagnostic system of claim 6, wherein the operation state information includes at least one of sensing information of a freezer compartment temperature sensor, sensing information of a refrigeration compartment temperature sensor, operation setting information of a freezer compartment fan, response information of the freezer compartment fan, operation setting information of a refrigeration compartment fan, response information of the refrigeration compartment fan, operation setting information of an ice maker fan, response information of the ice maker fan, operation setting information of a compressor, or operation setting information of a defrost heater.

9. The refrigerator of claim 1, wherein the sound output includes a buzzer having a cylindrical shape that extends in a vertical direction, the buzzer having an output terminal that outputs the sound in a radial direction.

10. The refrigerator of claim 1, wherein the sound output hole is formed by cutting an edge of the front surface at a point at which the front surface meets the upper side of the case.

11. The refrigerator of claim 1, further including a printed circuit board on which the sound output is mounted, wherein the hinge housing includes:
a support that extends from the upper surface in a downward direction and is in a contact with an upper side of the printed circuit board; and
a fixing member that extends from the upper surface in a downward direction and secures the printed circuit board on the support member.

12. A refrigerator diagnostic system comprising:
a refrigerator according to claim 3;
a portable terminal that receives the sound output from the sound output of the refrigerator by the medium of air, and transmits the received sound through a communication network; and
a diagnostic server that receives the sound transmitted from the portable terminal and extracts the product information from the received sound to perform a diagnosis of the refrigerator.

13. A refrigerator comprising:
a selector configured to receive a command;
a controller that, upon receipt of the command through the selector, generates a control signal including product information;
a modulator that generates a frequency signal according to the control signal;
a sound output that outputs a sound including the product information according to the frequency signal;
a case that forms a refrigeration compartment and a freezer compartment;
a first door and second door that open and close the refrigeration compartment or the freezer compartment;

a plurality of manipulation keys provided on the first door, wherein one of the plurality of manipulation keys is for locking the others of the plurality of manipulation keys, wherein the receipt of the command through the selector is implemented as the manipulation key for locking is pushed while the second door is opened and a predetermined manipulation key among the others of the plurality of manipulation keys is maintained being pushed for a predetermined duration.

* * * * *